(12) United States Patent
Majima et al.

(10) Patent No.: US 11,385,065 B2
(45) Date of Patent: Jul. 12, 2022

(54) ROUTE RETRIEVAL APPARATUS, ROUTE RETRIEVAL METHOD, AND NON-TRANSITORY STORAGE MEDIUM STORING ROUTE RETRIEVAL PROGRAM

(71) Applicant: TOYOTA JIDOSHA KABUSHIKI KAISHA, Toyota (JP)

(72) Inventors: Hiroshi Majima, Tokyo (JP); Nariaki Amano, Nagoya (JP); Yukiya Yamane, Tokyo (JP); Kazuki Kato, Kawaguchi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 133 days.

(21) Appl. No.: 16/654,188

(22) Filed: Oct. 16, 2019

(65) Prior Publication Data

US 2020/0132480 A1 Apr. 30, 2020

(30) Foreign Application Priority Data

Oct. 30, 2018 (JP) .............................. JP2018-204542

(51) Int. Cl.
*G01C 21/34* (2006.01)
*G01C 21/36* (2006.01)

(52) U.S. Cl.
CPC ..... *G01C 21/3423* (2013.01); *G01C 21/3438* (2013.01); *G01C 21/3476* (2013.01); *G01C 21/3614* (2013.01)

(58) Field of Classification Search
CPC ...... G01C 21/00; G01C 21/005; G01C 21/10; G01C 21/12; G01C 21/14; G01C 21/16; G01C 21/26; G01C 21/28; G01C 21/34; G01C 21/3407; G01C 21/3415; G01C 21/3423; G01C 21/3438; G01C 21/3476; G01C 21/36; G01C 21/3605; G01C 21/3614; G09B 29/00; G09B 29/10;
(Continued)

(56) References Cited

U.S. PATENT DOCUMENTS

| 10,648,822 | B2* | 5/2020 | Newlin | ............... | G01C 21/3676 |
| 2007/0276595 | A1* | 11/2007 | Lewinson | .......... | G01C 21/3484 |
| | | | | | 701/533 |

(Continued)

FOREIGN PATENT DOCUMENTS

| JP | 2003-323694 A | 11/2003 |
| JP | 2012-048308 A | 3/2012 |
| JP | 2012-167994 A | 9/2012 |

*Primary Examiner* — Anthony R Jimenez
(74) *Attorney, Agent, or Firm* — Oliff PLC

(57) ABSTRACT

A route retrieval apparatus includes a route retrieval unit configured to perform route retrieval from a departure place to a destination, the route retrieval retrieving a route using one or two or more pieces of moving means among a plurality of pieces of moving means including sharing type moving means in which a vehicle with a relatively small riding capacity is used by unspecified people, and perform the route retrieval from the departure place to the destination, the route retrieval retrieving a route including usage of the sharing type moving means, such that the usage of the sharing type moving means is restricted to at least one of usage from the departure place or a periphery of the departure place and usage for reaching the destination or a periphery of the destination.

18 Claims, 29 Drawing Sheets

(58) Field of Classification Search
CPC . G08G 1/137; B60L 2240/00; B60L 2240/60; B60L 2240/622
USPC ......................................................... 701/533
See application file for complete search history.

(56) References Cited

U.S. PATENT DOCUMENTS

| | | | |
|---|---|---|---|
| 2014/0266588 A1* | 9/2014 | Majzoobi | G07B 15/00 340/5.61 |
| 2015/0204684 A1* | 7/2015 | Rostamian | G06Q 10/101 701/537 |
| 2016/0298974 A1* | 10/2016 | Newlin | G08G 1/0141 |

* cited by examiner

| × TRANSPORT MEANS | COMPLETE |

WALK

🚶 WALKING SPEED — NORMAL >

PUBLIC TRANSPORTATION

🚆 TRAIN

🚌 PUBLIC BUS — ⬤

⛴ SHIP/WATER-BUS — ⬤

🚄 LIMITED EXPRESS SHINKANSEN — ⬤

🚍 EXPRESS BUS — ⬤

✈ AIRPLANE — ⬤

TAXI

🚗 TAXI — ❔ ⬤

SELF-DRIVING

🚲 CYCLE SHARING — ❔ ⬤

🚲 BICYCLE — ⬤

⤳ GIVING PRIORITY TO TOLL ROAD OR HIGHWAY — ⬤

🚙 VEHICLE — ⬤

🚗 RENTAL CAR — ❔ ⬤

🚘 CAR SHARING — ❔ ⬤

FIG. 8A

800 | < DEPARTURE: 8/10 14:05

| ORDER OF FAST ARRIVAL | ORDER OF LOW FARE | ORDER IN WHICH NUMBER OF TIMES OF TRANSFER IS SMALL |

801
- 801A: CYCLE SHARING
- 801B: 14:05 TO 17:11 — 3 HOURS 6 MINUTES
- 801C: □□ LINE XX STATION 14:36 DEPARTURE
- 801D: → 🚶 > 🚴 > 🚇 > 🚇 > 🚶
- 801E: TRANSFER 3 TIMES — ¥ xxxx

802
- 802A: TAXI
- 802B: 14:05 TO 17:15 — 3 HOURS 10 MINUTES
- 802C: ○○ LINE △△ STATION 14:24 DEPARTURE
- 802D: → 🚕 > 🚇 > 🚇 > 🚇 > 🚶
- 802E: TRANSFER 3 TIMES — ¥ xxxx

803
- 803A: TRAIN
- 803B: 14:05 TO 17:20 — 3 HOURS 15 MINUTES
- 803C: ○○ LINE XX STATION 14:10 DEPARTURE
- 803D: → 🚶 > 🚇 > 🚇 > 🚇 > 🚶
- 803E: TRANSFER 3 TIMES — ¥ xxxx

804
- 804A: BUS
- 804B: 14:05 TO 17:21 — 3 HOURS 16 MINUTES
- 804C: ○○ LINE △△ STOP 14:09 DEPARTURE
- 804D: → 🚶 > 🚌 > 🚇 > 🚇 > 🚇 > 🚶
- 804E: TRANSFER 4 TIMES — ¥ xxxx

805
- 805A: RENTAL CAR
- 805B: 14:05 TO 18:02 — 3 HOURS 57 MINUTES
- 805C:
- 805D: → 🚶 > 🚗
- 805E: NO TRANSFER — ¥ xxxx

806
- 806A: CAR SHARING
- 806B: 14:05 TO 18:02 — 3 HOURS 57 MINUTES
- 806C:
- 806D: → 🚶 > 🚗
- 806E: NO TRANSFER — ¥ xxxx

807
- 807A: VEHICLE
- 807B: 14:05 TO 18:02 — 3 HOURS 47 MINUTES
- 807C:
- 807D: 🚗
- 807E: NO TRANSFER — ¥ xxxx

808
- 808A: BICYCLE
- 808B: 14:05 TO 21:28 — 7 HOURS 23 MINUTES
- 808C:
- 808D: 🚲
- 808E: NO TRANSFER — ¥ 0

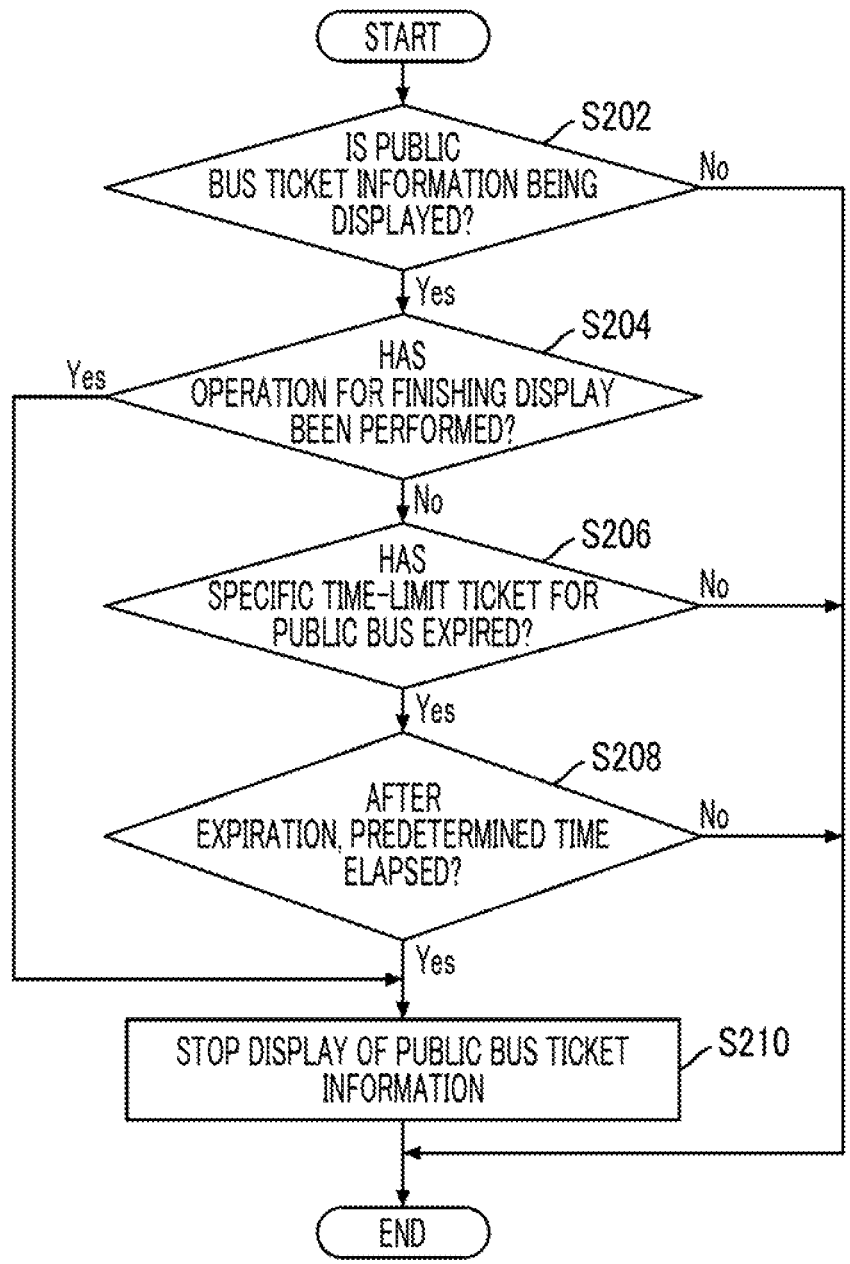

FIG. 15A

| USER ID | DATE AND TIME | DEPARTURE PLACE | TRANSIT PLACE | DESTINATION | VIA EVENT SPOT INFORMATION | CANDIDATE ROUTE | | | | | | | | | |
|---|---|---|---|---|---|---|---|---|---|---|---|---|---|---|---|
| | | | | | | BUS | TRAIN | SUBWAY | TAXI | CYCLE SHARING | VEHICLE | RENTAL CAR | WALKING | BUS | TRAIN |
| | | | | | | HIGH CONVENIENCE | | | | | | | | WITHOUT CONVENIENCE CONDITION | |
| aaaaaa | ... | ... | ... | ... | ○ | ○ | ○ | ○ | ○ | × | × | × | ○ | ○ | ○ |
| bbbbb | ... | ... | ... | ... | × | ○ | ○ | ○ | ○ | ○ | × | × | × | ○ | ○ |
| ... | ... | ... | ... | ... | ... | ... | ... | ... | ... | ... | ... | ... | ... | ... | ... |

FIG. 15B

| USER ID | SELECTION ROUTE | | | USAGE/PRECHECK | | | | | |
|---|---|---|---|---|---|---|---|---|---|
| | BUS | TRAIN | ... | BUS LOCATION | FREE PASS | TAXI RESERVATION | CYCLE SHARING USE | UNOCCUPIED CYCLE INFORMATION | ... |
| aaaaaa | O | O | ... | O | O | X | X | X | ... |
| bbbbbb | O | O | ... | O | X | O | X | X | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |
| ... | ... | ... | ... | ... | ... | ... | ... | ... | ... |

ROUTE RETRIEVAL APPARATUS, ROUTE RETRIEVAL METHOD, AND NON-TRANSITORY STORAGE MEDIUM STORING ROUTE RETRIEVAL PROGRAM

INCORPORATION BY REFERENCE

The disclosure of Japanese Patent Application No. 2018-204542 filed on Oct. 30, 2018 including the specification, drawings and abstract is incorporated herein by reference in its entirety.

BACKGROUND

1. Technical Field

The present disclosure relates to a route retrieval apparatus, a route retrieval method, and a non-transitory storage medium storing a route retrieval program.

2. Description of Related Art

In the related art, there is a navigation apparatus which performs multimodal route retrieval from a departure place to a destination by using one or a combination of two or more of a plurality of pieces of moving means such as an automobile, walking, a bicycle, and a public transportation. (For example, refer to Japanese Unexamined Patent Application Publication No. 2012-167994 (JP 2012-167994 A))

SUMMARY

Meanwhile, there is sharing type moving means that a vehicle with a relatively small riding capacity is used (shared) by unspecified people, such as a rental car, car sharing, cycle sharing, ride sharing, and a taxi. Therefore, such sharing type moving means may be incorporated into route retrieval.

However, the sharing type moving means has a relatively high degree of freedom in usage selection in route retrieval. For example, in a case of route retrieval based on movement using an automobile or a bicycle for private use, a car parking lot or a bicycle parking lot is needed to be secured, and, thus, fundamentally, route retrieval for movement using the automobile or the bicycle from a departure place to a destination is frequently performed. On the other hand, in the sharing type moving means, generally, an access point to a vehicle (for example, a rental car office and a station for car sharing) is set to various places, or a user can get on and off at a favorite place (for example, a taxi or ride sharing). Thus, such a usage pattern of partially using the sharing type moving means between a departure place and a destination is easily realizable. In the sharing type moving means such as a bus or an electric train of which the riding capacity is relatively large, a movement route is not defined in advance, and the degree of freedom of movement increases. Therefore, in a case where the sharing type moving means is included in moving means that is a route retrieval target in multimodal route retrieval, rotatable may not be completed within a realistic period of time.

The present disclosure provides a route retrieval apparatus, a route retrieval method, and a non-transitory storage medium storing a route retrieval program capable of completing, within a realistic period of time, multimodal route retrieval using a plurality of pieces of moving means including sharing type moving means.

A first aspect of the present disclosure relates to a route retrieval apparatus including a route retrieval unit. The route retrieval unit is configured to perform route retrieval from a departure place to a destination, using one or two or more pieces of moving means among a plurality of pieces of moving means including sharing type moving means in which a vehicle with a relatively small riding capacity is used by unspecified people, and perform the route retrieval from the departure place to the destination, including usage of the sharing type moving means such that the usage of the sharing type moving means is restricted to at least one of usage from the departure place or a periphery of the departure place and usage for reaching the destination or a periphery of the destination.

According to the first aspect, since a portion using sharing type moving means on a route from a departure place to a destination is restricted, it is possible to suppress an increase in a pattern of a combination including other moving means such as a public transportation. One of a start point and an end point of the sharing type moving means is restricted to a departure place or the departure place periphery, or a distribution or the destination periphery, the degree of freedom of a movement route can be reduced more than in a form in which there is the degree of freedom in both of a start point and an end point. Therefore, the route retrieval apparatus can suppress an increase in a portion of a combination including other moving means such as a public transportation and can thus perform multimodal route retrieval within a realistic time.

In the route retrieval apparatus according to the first aspect, the sharing type moving means may include at least one of a rental car, car sharing, cycle sharing, ride sharing, and a taxi.

According to the first aspect, the route retrieval apparatus can complete multimodal route retrieval including a rental car, car sharing, cycle sharing, ride sharing, or a taxi as specific sharing type moving means within a realistic time.

In the route retrieval apparatus according to the first aspect, the route retrieval unit may perform the route retrieval from the departure place to the destination, including the usage of the sharing type moving means such that usage of the rental car, the car sharing, and the cycle sharing is restricted to at least one of usage from an access point to a corresponding vehicle in the periphery of the departure place and usage to the access point in the periphery of the destination.

According to the first aspect, the route retrieval apparatus can perform multimodal route retrieval including usage of sharing type moving means in accordance with characteristics of the sharing type moving means such as a rental car, car sharing, and cycle sharing which a user is needed to get on and off at access points.

In the route retrieval apparatus according to the first aspect, the route retrieval unit may perform the route retrieval from the departure place to the destination, including the usage of the sharing type moving means such that usage of the ride sharing and the taxi is restricted to at least one of usage from the departure place and usage to the destination.

According to the first aspect, the route retrieval apparatus can perform multimodal route retrieval including usage of sharing type moving means in accordance with characteristics of the sharing type moving means such as ride sharing or a taxi for which a user easily accesses a getting-on/off place.

A second aspect of the present disclosure relates to a route retrieval method executed by a route retrieval apparatus. The route retrieval method includes performing route retrieval from a departure place to a destination, the route retrieval retrieving a route using one or two or more pieces of moving means among a plurality of pieces of moving means including sharing type moving means in which a vehicle with a relatively small riding capacity is used by unspecified people, wherein, in the route retrieval, the route retrieval from the departure place to the destination, the route retrieval retrieving the route including usage of the sharing type moving means, is performed such that the usage of the sharing type moving means is restricted to at least one of usage from the departure place or a periphery of the departure place and usage for reaching the destination or a periphery of the destination.

A third aspect of the present disclosure relates to a non-transitory storage medium storing a route retrieval program causing a route retrieval apparatus to execute performing route retrieval from a departure place to a destination, the route retrieval retrieving a route using one or two or more pieces of moving means among a plurality of pieces of moving means including sharing type moving means in which a vehicle with a relatively small riding capacity is used by unspecified people, wherein, in the route retrieval, the route retrieval from the departure place to the destination, the route retrieval retrieving the route including usage of the sharing type moving means, is performed such that the usage of the sharing type moving means is restricted to at least one of usage from the departure place or a periphery of the departure place and usage for reaching the destination or a periphery of the destination.

According to each aspect of the present disclosure, it is possible to provide a route retrieval apparatus, a route retrieval method, and a non-transitory storage medium storing a route retrieval program capable of completing, within a realistic period of time, multimodal route retrieval using a plurality of pieces of moving means including sharing type moving means.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 7 is a diagram illustrating an example of a setting screen for setting target moving means in the multimodal route retrieval;

FIG. 8A is a diagram illustrating an example of a display screen for a multimodal route retrieval result;

FIG. 14B is a flowchart schematically illustrating an example of a public bus ticket information display process performed by the portable terminal (public bus ticket usage support processing unit);

FIG. 15A is a diagram illustrating an example of history data regarding a multimodal route retrieval result;

FIG. 15B is a diagram illustrating an example of history data regarding a multimodal route retrieval result;

FIG. 16C is a diagram for describing the macro data generation method; and

FIG. 16D is a diagram for describing the macro data generation method.

DETAILED DESCRIPTION OF EMBODIMENTS

Hereinafter, an embodiment of the present disclosure will be described with reference to the drawings.

Summary of System

First, with reference to FIG. 1, a description will be made of a summary of a multimodal route providing system 1 according to the present embodiment.

Figure 1:
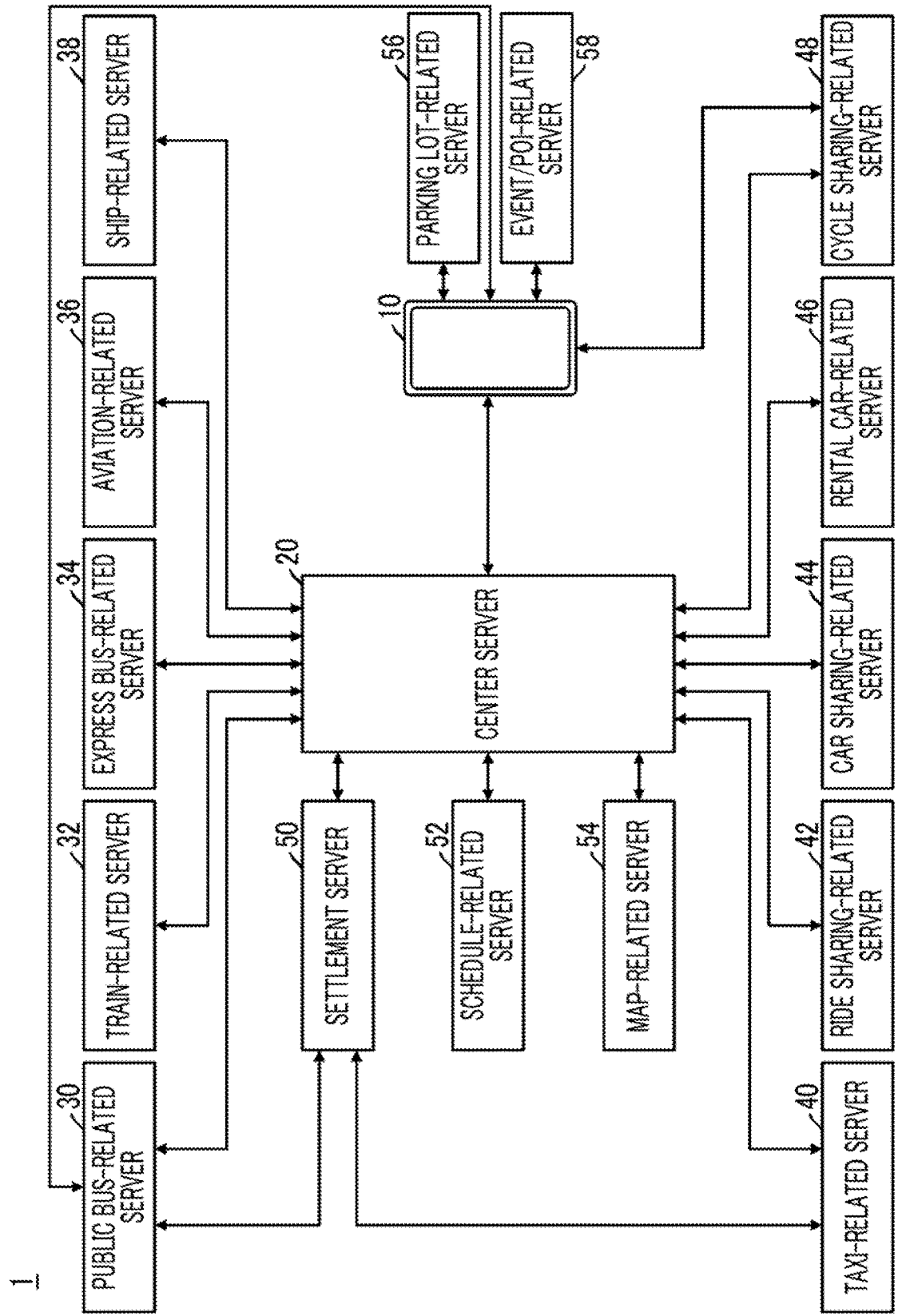
FIG. 1 is a schematic diagram illustrating an example of a configuration of a multimodal route providing system according to an embodiment.

FIG. 1 is a schematic diagram illustrating an example of a configuration of the multimodal route providing system 1 according to the present embodiment.

The multimodal route providing system 1 according to the present embodiment includes a portable terminal 10 and a center server 20.

In the multimodal route providing system 1, the center server 20 performs multimodal route retrieval from a departure place to a destination in response to a route retrieval request including the departure place and the destination, transmitted from the portable terminal 10 to the center server 20, according to a user's operation. The multimodal route providing system 1 provides a route retrieval result (hereinafter, referred to as a "multimodal route retrieval result") to the user via the portable terminal 10 (specifically, a display device 16 which will be described later). A plurality of users may receive provision of a multimodal route retrieval result from the multimodal route providing system 1, and there is a plurality of portable terminals 10 respectively corresponding to the users. In this case, the users may perform user registration via a route retrieval application which will be described later of the portable terminals 10, or a home page regarding multimodal route retrieval, published by the center server 20, and may thus receive service provision regarding the multimodal route retrieval. User identification information (for example, a user identifier (ID)) and user authentication information (for example, a password) for access to the center server 20, corresponding to the user identification information, are issued to each of the users subjected to the user registration. The user identification information may be in an aspect of being changeable by a user. Consequently, specifically, the user can receive service provision regarding multimodal route retrieval by using the route retrieval application which will be described later based on the user identification information and the user authentication information.

The multimodal route retrieval is route retrieval using a plurality of pieces of moving means from a departure place to a destination, and may be realized according to a known method. According to the multimodal route retrieval, one or a plurality of route candidates using one or two or more of a plurality of pieces of target moving means are retrieved. The target moving means may include public transportations such as a public bus, a train, an express bus, an airplane, and a ship. The target moving means may include moving means (hereinafter, referred to as "sharing type moving means") in which a vehicle with a relatively small riding capacity is shared by unspecified people, such as a taxi, ride sharing, car sharing, a rental car, and cycle sharing. The sharing type moving means is a moving means in which a vehicle with a relatively small riding capacity compared with the target moving means is shared by unspecified people. The target moving means may include moving means owned by a user or a family thereof, such as a bicycle for private use (hereinafter, simply referred to as a bicycle) or an automobile for private use (hereinafter, simply referred to as an "automobile"). The "ship" as the target moving means may include any water vehicle such as a water bus, and the water bus may be set as single target moving means separately from the "ship". As will be described later, the target moving means may be selected by a user from among a plurality of pieces of predefined moving means (target moving means candidates) (refer to FIG. 7). A departure place and a destination are set in a target area (hereinafter, referred to as a "retrieval target area") in the multimodal route retrieval. The retrieval target area may be set to any region such as a region across a plurality of countries, an entire country, a single district across a plurality of prefectures or a plurality of provinces of one country, a single prefecture, a single province, a single city, a single town, and a single village.

Constituent elements related to the multimodal route providing system 1 according to the present embodiment includes a public bus-related server 30, a train-related server 32, an express bus-related server 34, an aviation-related server 36, a ship-related server 38, a taxi-related server 40, a ride sharing-related server 42, a car sharing-related server 44, a rental car-related server 46, a cycle sharing-related server 48, a settlement server 50, a schedule-related server 52, a map-related server 54, a parking lot-related server 56, and an event/point of interest (POI)-related server 58.

The portable terminal 10 is a user terminal used for a user to receive provision of one or a plurality of route candidates corresponding to a multimodal route retrieval result. The portable terminal 10 includes, for example, a mobile phone, a smart phone, a tablet terminal, a laptop computer, and a portable navigation apparatus.

The portable terminal 10 is communicably connected to the center server 20 via a predetermined communication network (hereinafter, simply referred to as a "communication network") such as a mobile communication network having a base station as an end, a satellite communication network using a communication satellite, and the Internet, and transmits a route retrieval request to the center server 20 in response to an operation from a user. The portable terminal 10 displays a multimodal route retrieval result delivered from the center server 20 on the display device 16, so as to provide the multimodal route retrieval result to the user.

The portable terminal 10 is an example of a user terminal used for a user to receive provision of a multimodal route retrieval result, and the multimodal route providing system 1 may include other user terminals (for example, a desktop computer and a navigation apparatus fixed to a vehicle) instead of or in addition to the portable terminal 10.

The portable terminal 10 is communicably connected to the public bus-related server 30, the cycle sharing-related server 48, the parking lot-related server 56, and the event/POI-related server 58. The public bus-related server 30 is operated by, for example, an operation company of a public bus as target moving means or a related company thereof, and manages information (for example, a schedule, an operation status including a delay, and the current position of each vehicle) regarding an operation and the like of the public bus. The cycle sharing-related server 48 is operated by, for example, a service providing company of cycle sharing as target moving means or a related company thereof, and manages various pieces of information (for example, the number of cycles providable in each of a plurality of cycle ports providing shared cycles, and the number of currently unoccupied cycles) regarding a cycle sharing service. The parking lot-related server 56 manages facility information (for example, an address or a parking capacity) of each of a plurality of parking lots registered in advance or information (for example, the number of vacant spaces of each parking lot) regarding a usage status. The event/POI-related server 58 manages information (hereinafter, referred to as "event information") regarding an event performed in a route retrieval target area or information (hereinafter, referred to as "POI information") regarding a POI (for example, a facility or a store) in a predetermined area in the latest state. Consequently, the portable terminal 10 can acquire various pieces of information such as information regarding a public bus or cycle sharing as target moving means, information regarding a parking lot in a case of using car sharing, a rental car, or an automobile as target moving means, and information regarding an event and a POI which motivate a user to move. Details of transmission and reception of information between the portable terminal 10 and each of the public bus-related server 30, the cycle sharing-related server 48, the parking lot-related server 56, and the event/POI-related server 58 will be described later (refer to FIGS. 5A, 5B, 6A to 6C, and 11A to 13B).

The portable terminal 10 may be communicably connected to the train-related server 32, the express bus-related server 34, the aviation-related server 36, the ship-related server 38, the taxi-related server 40, the ride sharing-related server 42, the car sharing-related server 44, and the rental car-related server 46, and may acquire various pieces of information therefrom. For example, the portable terminal 10 may acquire various pieces of information from each server via a home page operated by the server.

The center server 20 (an example of a route retrieval apparatus) is communicably connected to the portable terminal 10 via the communication network, performs multimodal route retrieval in response to a route retrieval request from the portable terminal 10, and transmits (delivers) a multimodal route retrieval result to the portable terminal 10.

The center server 20 is communicably connected to the public bus-related server 30, the train-related server 32, the express bus-related server 34, the aviation-related server 36, the ship-related server 38, the taxi-related server 40, the ride sharing-related server 42, the car sharing-related server 44, the rental car-related server 46, and the cycle sharing-related server 48 via the communication network. The train-related server 32 is operated by, for example, an operation company of a train as target moving means or a related company thereof, and manages information (for example, a schedule, an operation status including a delay, and a reservable unoccupied seat state of each train) regarding an operation and the like of the train. The express bus-related server 34 manages information (for example, a schedule, an operation status including a delay, and a reservable unoccupied seat state of each train) regarding an operation and the like of an express bus as target moving means. The aviation-related server 36 is operated by, for example, an operation company of an airplane as target moving means or a related company thereof, and manages information (for example, a schedule, an operation status including a delay, and a reservable unoccupied seat state of each airplane) regarding an operation and the like of the airplane. The ship-related server 38 is operated by, for example, an operation company of a ship as target moving means or a related company thereof, and manages information (for example, a schedule, an operation status including a delay, and a reservable unoccupied seat state of each ship) regarding an operation and the like of the ship. The taxi-related server 40 is operated by, for example, a service providing company of a taxi as target moving means or a related company thereof, and manages various pieces of information (for example, position information of each vehicle or an operation status including the distinction between for hire and in service) regarding a service of the taxi. The ride sharing-related server 42 is operated by, for example, a service providing company of ride sharing as target moving means or a related company thereof, and manages various pieces of information (for example, the current position of each vehicle operated in the ride sharing, or whether or not the vehicle can be allocated) regarding a service of the ride sharing. The car sharing-related server 44 is operated by, for example, a service providing company of car sharing as target moving means or a related company thereof, and manages various pieces of information (for example, the number of parking spaces in each station providing shared cars, the number of currently available cars, and the number of returnable cars) regarding a service of the car sharing. The rental car-related server 46 is operated by, for example, a service providing company of a rental car as target moving means or a related company thereof, and manages various pieces of information (for example, a vehicle model of a vehicle available in each business office renting a rental car, or the number of currently available cars for each vehicle model in each business office) regarding a service of the rental car. In other words, the servers 30 to 48 respectively correspond to pieces of target moving means in multimodal route retrieval. Consequently, the center server 20 can acquire various pieces of information related to the target moving means in the multimodal route retrieval from the respective servers 30 to 48.

Schedule information of moving means (for example, a public bus, a train, an express bus, an airplane, and a ship) of which an operation plan including an operation route and operation time is defined in advance may be acquired from the schedule-related server 52 as will be described later. A service of each type of target moving means may be provided by a plurality of companies. Thus, each of the public bus-related server 30, the train-related server 32, the express bus-related server 34, the aviation-related server 36, the ship-related server 38, the taxi-related server 40, the ride sharing-related server 42, the car sharing-related server 44, the rental car-related server 46, and the cycle sharing-related server 48 may be provided in a plurality of companies providing a service of a corresponding type of target moving means. There may be a case where a single company or a single group company provides services of a plurality of types of target moving means. Thus, some of the public bus-related server 30, the train-related server 32, the express bus-related server 34, the aviation-related server 36, the ship-related server 38, the taxi-related server 40, the ride sharing-related server 42, the car sharing-related server 44, the rental car-related server 46, and the cycle sharing-related server 48 may be realized by a single server corresponding to a single company or a single group company.

The center server 20 is communicably connected to the settlement server 50 via the communication network. The settlement server 50 is operated by, for example, a settlement business agent company, and substitutionally performs a settlement process regarding the user's use of target moving means, for example, a settlement process between the user and a card company corresponding to a credit card (hereinafter, referred to as a "registered credit card") registered in advance in the center server 20 by the user. For example, the settlement server 50 temporarily secures a credit limit of the credit card to a temporary fare according to taxi reservation of the user in response to a request from the center server 20. In response to a request from the center server 20 having received a notification of a fixed fare from the taxi-related server 40, the settlement server 50 secures a credit limit of the credit card to the fixed fare again, and appropriates the sales. For example, in response to a request from the center server 20, the settlement server 50 secures a credit limit of the credit card according to a public bus ticket purchase request from the user, and appropriates the sales. Consequently, the center server 20 can uniquely cause the settlement server 50 to execute various settlement processes regarding the user's use of target moving means.

The center server 20 is communicably connected to the schedule-related server 52 and the map-related server 54. The schedule-related server 52 manages information regarding a schedule of target moving means of which an operation plan including an operation route and operation time is defined in advance. The map-related server 54 manages map information including road information in a retrieval target area. Consequently, the center server 20 can acquire information regarding a schedule or map information needed for multimodal route retrieval from the schedule-related server 52 and the map-related server 54, or can update information regarding an old schedule or old map information.

Configuration of Multimodal Route Providing System

Next, details of a configuration of the multimodal route providing system 1 will be described with reference to FIGS. 2 and 3 in addition to FIG. 1.

Figure 2:
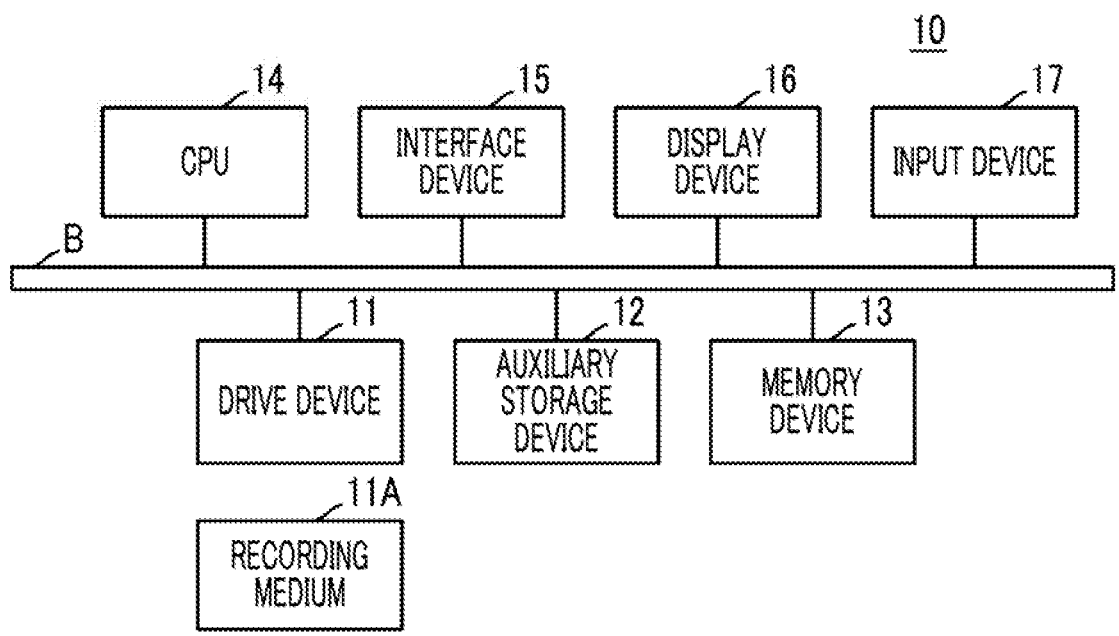
FIG. 2 is a configuration diagram illustrating an example of a hardware configuration of a center server.

FIG. 2 is a diagram illustrating an example of a hardware configuration of the portable terminal 10. FIG. 3 is a functional block diagram illustrating an example of a functional configuration of the multimodal route providing system 1.

A hardware configuration of the center server 20 is substantially the same as that of the portable terminal 10, and thus is not illustrated by referring to FIG. 2 in the following description. Hereinafter, in a description of the center server 20, the reference numerals "11", "11A", "12", "13", "14", "15", "16", "17" in FIG. 2 are respectively replaced with "21", "21A", "22", "23", "24", "25", "26", "27", and the description will be made.

Configuration of Portable Terminal

As illustrated in FIG. 2, the portable terminal 10 includes a drive device 11, an auxiliary storage device 12, a memory device 13, a central processing unit (CPU) 14, an interface device 15, the display device 16, and an input device 17 which are connected to each other via a bus B.

A program for realizing various functions of the portable terminal 10 is provided by, for example, a recording medium 11A. The recording medium 11A is a portable recording medium such as a compact disc read only memory (CD-ROM), a digital versatile disc read only memory (DVD-ROM), a Universal Serial Bus (USB), or a secure digital (SD) memory card. Both of the recording medium 11A and the auxiliary storage device 12 correspond to computer readable recording media. In a case where the recording medium 11A recording a program is set in the drive device 11, the program is installed into the auxiliary storage device 12 from the recording medium 11A via the drive device 11. The program may be downloaded from another computer (for example, the center server 20) via the communication network, so as to be installed into the auxiliary storage device 12.

The auxiliary storage device 12 stores the installed program, and also stores a needed file or data. The auxiliary storage device 12 is, for example, a hard disk drive (HDD) or a flash memory.

In a case where there is an instruction for starting the program, the memory device 13 reads the program the auxiliary storage device 12, and stores the program thereinto.

The CPU 14 executes the program stored in the memory device 13, and realizes various functions of the portable terminal 10 according to the program.

The interface device 15 is used as an interface used for connection to, for example, the communication network.

The display device 16 displays, for example, a graphical user interface (GUI) such as an application screen of a route retrieval application which will be described later according to the program executed by the CPU 14. The display device 16 is, for example, a liquid crystal display or an organic electroluminescence (EL) display.

The input device 17 includes, for example, a keyboard, a mouse, a touch panel, and buttons, and is used for a user to input various operation instructions regarding the portable terminal 10.

Figure 3:
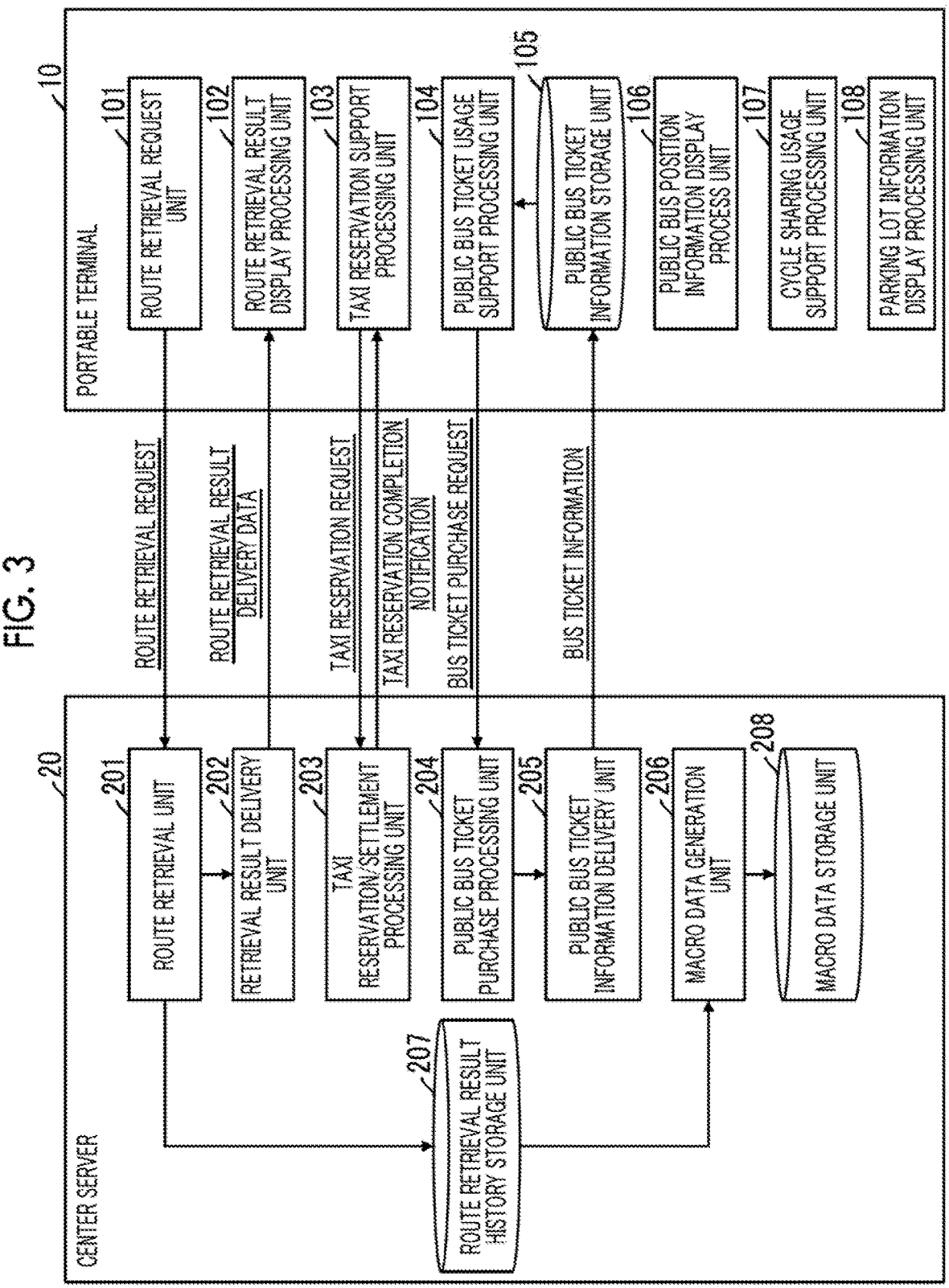
FIG. 3 is a functional block diagram illustrating examples of functional configurations of the center server and a portable terminal.

As illustrated in FIG. 3, the portable terminal 10 includes a route retrieval request unit 101, a route retrieval result display processing unit 102, a taxi reservation support processing unit 103, a public bus ticket usage support processing unit 104, a public bus position information display processing unit 106, a cycle sharing usage support processing unit 107, and a parking lot information display processing unit 108, as functional units that are realized by the CPU 14 executing one or more programs installed in the auxiliary storage device 12, for example, an application for receiving provision of a multimodal route retrieval result. The portable terminal 10 uses a public bus ticket information storage unit 105 and the like. The public bus ticket information storage unit 105 may be realized by using, for example, the auxiliary storage device 12.

The route retrieval request unit 101 displays an application screen related to route retrieval in the route retrieval application, and also transmits, to the center server 20, user identification information, a route retrieval request including user authentication information, information regarding a departure place and a destination, and information regarding a departure time, in response to a user's operation on the application screen. The route retrieval request may include information regarding a transit place as will be described later (refer to FIGS. 4, and 6A to 6C). An application screen for a user making a request for multimodal route retrieval, that is, for transmitting a route retrieval request to the center server 20 from the portable terminal 10 or a method of operating the application screen will be described later (refer to FIGS. 4 to 7).

The route retrieval result display processing unit 102 displays a multimodal route retrieval result on the display device 16 based on delivery data (hereinafter, referred to as "route retrieval result delivery data") of the multimodal route retrieval result returned (delivered) from the center server 20. Specific contents of the multimodal route retrieval result displayed on the display device 16 will be described later (refer to FIGS. 8A, 8B, and 9).

The taxi reservation support processing unit 103 external scenery a process of supporting a user's reservation for allocation of a taxi as target moving means in response to a predetermined operation on a predetermined application screen of the route retrieval application. Specifically, the taxi reservation support processing unit 103 transmits a taxi reservation request including information regarding a desired taxi allocation place or a desired taxi allocation time to the center server 20 in response to the user's predetermined operation on the predetermined application screen of the route retrieval application. The taxi reservation support processing unit 103 may notify the user of completion of the taxi allocation reservation based on a taxi reservation completion notification received from the center server 20, and may also display a content of the taxi allocation reservation on the application screen. An application screen for a user performing taxi allocation reservation or a method of operating the application screen will be described later (refer to FIGS. 10A and 10B).

Similarly, the portable terminal 10 may perform allocation reservation of ride sharing in response to a user's operation instead of or in addition to a taxi.

The public bus ticket usage support processing unit 104 supports purchase and usage of a predetermined ticket for a public bus as target moving means in response to a predetermined operation on a predetermined application screen of the route retrieval application. The predetermined ticket is a ticket (hereinafter, referred to as a "time-limit ticket") such as a "one-day free ticket" in a form of being able to use a public bus within a predetermined period. The time-limit ticket includes a time-limit ticket (hereinafter, referred to as a "specific time-limit ticket") such as a "six-hour free ticket" witch which a public bus is only available during an operation thereof in a day. The time-limit ticket may be further limited in valid geographical range, such as "OO city limited" or "XX line limited". The predetermined ticket may be a ticket (hereinafter, referred to as a "section ticket") in an aspect of limiting a section, such as "OO stop to XX stop". Specifically, the public bus ticket usage support processing unit 104 transmits a request (hereinafter, referred to as a "bus ticket purchase request") for purchasing a predetermined ticket for a public bus to the center server 20 in response to a user's predetermined operation on an application screen of the route retrieval application. The public bus ticket usage support processing unit 104 displays bus ticket information that is received (delivered) from the center server 20 and is stored into the public bus ticket information storage unit 105, on the display device 16. The bus ticket information corresponds to the purchased predetermined ticket for the public bus, and the user can use the public bus by visually presenting the bus ticket information displayed on the display device 16 to a crew of the public bus. An application screen for a user purchasing a predetermined ticket for a public bus, a method of operating the application screen, and a specific example of public bus ticket information will be described later (refer to FIGS. 13A and 13B).

The public bus ticket usage support processing unit 104 may directly transmit a bus ticket purchase request to the public bus-related server 30 without using the center server 20. In this case, the portable terminal 10 may directly acquire bus ticket information from the public bus-related server 30. Instead of or in addition to a public bus, in the same manner as in a public bus, the portable terminal 10 may support purchase and usage of a boarding pass (for example, a ticket for a train or an express bus, a boarding pass for an airplane, or a passage ticket for a ship) for another target moving means, for example, a public transportation of which an operation plan including an operation route and operation time is defined in advance.

The public bus ticket information storage unit 105 stores the public bus ticket information delivered from the center server 20 as described above.

The public bus position information display processing unit 106 displays a public bus as target moving means, specifically, position information of each public bus on the display device 16. Specifically, the public bus position information display processing unit 106 may acquire information regarding the current position of each public bus in real time from the public bus-related server 30, and may display the current position on the display device 16, in response to a user's predetermined operation on an application screen of the route retrieval application. In addition to the current position information of each public bus, the public bus position information display processing unit 106 may acquire information (hereinafter, referred to as "expected position information") regarding an expected position of a public bus in a case where the public bus is operated according to an operation plan, that is, according to a schedule, from the public bus-related server 30, and may display the expected position information on the display device 16. In this case, the public bus position information display processing unit 106 may acquire the current position information or expected position information of each public bus via, for example, a predetermined web application programming interface (API) published by the public bus-related server 30. Consequently, a user may examine whether or not a route candidate using a public bus is selected from among a plurality of route candidates in a multimodal route retrieval result while checking, for example, the current position of the public bus or a difference (that is, a delay status) between the current position and an expected position. An application screen for a user displaying position information of a public bus on the display device 16 or a method of operating the application screen will be described later (refer to FIGS. 13A and 13B).

The public bus position information display processing unit 106 may acquire position information of each public bus via the center server 20. Instead of or in addition to position information of a public bus, the portable terminal 10 may display position information (for example, position information of each train or position information of each express bus) of another piece of target moving means, for example, a public transportation of which an operation plan including an operation route and operation time is defined in advance, on the display device 16.

The cycle sharing usage support processing unit 107 supports a user's usage of cycle sharing as target moving means. For example, the cycle sharing usage support processing unit 107 starts an application (for example, an application delivered by a cycle sharing service providing company) for using cycle sharing, and causes a display content on the display device 16 to transition to an application screen of the application, in response to a user's predetermined operation on a predetermined application screen of the route retrieval application. The cycle sharing usage support processing unit 107 may start a browser, and may cause the browser to access a home page for sharing cycle sharing. Consequently, for example, the user can check the number of unoccupied cycles in a cycle port corresponding to the cycle sharing or make a reservation for actual use in selecting a route candidate using the cycle sharing from among a plurality of route candidates in a multimodal route retrieval result. An application screen for a user using cycle sharing or a method of operating the application screen will be described later (refer to FIGS. 12A and 12B).

The portable terminal 10 may support usage of car sharing in the same method as described above instead of or in addition to cycle sharing.

The parking lot information display processing unit 108 displays information (hereinafter, referred to as "parking lot information") regarding a plurality of parking lots managed by the parking lot-related server 56 on the display device 16. The parking lot information includes facility information (for example, the name, an address, a parking fare, and a parking capacity of a parking lot) of each parking lot or information regarding the number of vacant spaces. For example, the parking lot information display processing unit 108 acquires parking lot information from the parking lot-related server 56, and displays the parking lot information on the display device 16, in response to a user's predetermined operation on a predetermined application screen of the route retrieval application. In this case, the parking lot information display processing unit 108 may acquire the parking lot information via, for example, a predetermined web API published by the parking lot-related server 56. Consequently, a user can check a vacant space status of a parking lot in selecting a route candidate using an automobile for private use or a rental car needing the parking lot from among a plurality of route candidates in a multimodal route retrieval result. An application screen for a user viewing parking lot information or a method of operating the application screen will be described later (refer to FIGS. 11A and 11B).

The parking lot information display processing unit 108 may acquire parking lot information via the center server 20. In this case, the parking lot-related server 56 is communicably connected to the center server 20.

Configuration of Center Server

As illustrated in FIG. 2, the center server 20 includes a drive device 21, an auxiliary storage device 22, a memory device 23, a CPU 24, an interface device 25, the display device 26, and an input device 27 which are connected to each other via a bus B. Hereinafter, with respect to a hardware configuration of the center server 20, differences from the drive device 11, the auxiliary storage device 12, the memory device 13, the CPU 14, the interface device 15, the display device 16, and the input device 17 of the portable terminal 10 will be focused.

A program for realizing various functions of the center server 20 is provided by, for example, a recording medium 21A. In a case where the recording medium 21A recording a program is set in the drive device 21, the program is installed into the auxiliary storage device 22 from the recording medium 21A via the drive device 21. The program may be downloaded from another computer (for example, the center server 20) via the communication network, so as to be installed into the auxiliary storage device 22.

The auxiliary storage device 22 stores the installed program, and also stores a needed file or data.

In a case where there is an instruction for starting the program, the memory device 23 reads the program the auxiliary storage device 22, and stores the program thereinto.

The CPU 24 executes the program stored in the memory device 23, and realizes various functions of the center server 20 according to the program.

The interface device 25 is used as an interface used for connection to, for example, the communication network.

The display device 26 displays a GUI according to the program executed by the CPU 24.

The input device 27 is used for a worker or a manager of the center server 20 to input various operation instructions regarding the center server 20.

As illustrated in FIG. 3, the center server 20 includes a route retrieval unit 201, a retrieval result delivery unit 202, a taxi reservation/settlement processing unit 203, a public bus ticket purchase processing unit 204, a public bus ticket information delivery unit 205, and a macro data generation unit 206, as functional units that are realized by the CPU 24 executing one or more programs installed in the auxiliary storage device 22. The center server 20 uses a route retrieval result history storage unit 207 and a macro data storage unit 208. The route retrieval result history storage unit 207 and the macro data storage unit 208 may be realized by using, for example, the auxiliary storage device 22, or an external storage device communicably connected to the center server 20.

The route retrieval unit 201 performs multimodal route retrieval using one or two or more of a plurality of pieces of target moving means from a departure place to a distribution designated in a route retrieval request in response to the route retrieval request received from the portable terminal 10. The route retrieval unit 201 outputs one or a plurality of route candidates using one or two or more of the plurality of pieces of target moving means. The route candidates output from the route retrieval unit 201 may include two or more route candidates differing in a single piece of used target moving means or a combination of two or more pieces of used target moving means. Details of a specification of multimodal route retrieval in the route retrieval unit 201 will be described later.

The function of the route retrieval unit 201 may be transferred to the portable terminal 10 (an example of a route retrieval apparatus). In this case, the portable terminal 10 may acquire, for example, resource information needed for multimodal route retrieval from the center server 20. The portable terminal 10 may be communicably connected to the public bus-related server 30, the train-related server 32, the express bus-related server 34, the aviation-related server 36, the ship-related server 38, the taxi-related server 40, the ride sharing-related server 42, the car sharing-related server 44, the rental car-related server 46, the cycle sharing-related server 48, the schedule-related server 52, and the map-related server 54, and may acquire resource information needed for multimodal route retrieval from the servers.

The retrieval result delivery unit 202 generates delivery data (hereinafter, referred to as "route retrieval result delivery data") for displaying a multimodal route retrieval result on the display device 16 of the portable terminal 10 based on the multimodal route retrieval result including one or a plurality of route candidates output from the route retrieval unit 201, and delivers the route retrieval result delivery data to the portable terminal 10. In other words, the retrieval result delivery unit 202 transmits the delivery data in which a display specification for displaying the multimodal route retrieval result on the display device 16 of the portable terminal 10 is defined, to the portable terminal 10, and thus displays the multimodal route retrieval result in the route retrieval unit 201 on the display device 16 of the portable terminal 10.

The display specification for displaying the multimodal route retrieval result on the display device 16 of the portable terminal 10 may be controlled by the portable terminal 10, for example, the route retrieval result display processing unit 102. In this case, information regarding a display specification is not included in route retrieval result delivery data delivered from the retrieval result delivery unit 202 to the portable terminal 10. As described above, in a case where the function of the route retrieval unit 201 is transferred to the portable terminal 10, a display specification for displaying a multimodal route retrieval result on the display device 16 of the portable terminal 10 is naturally controlled by the portable terminal 10.

The taxi reservation/settlement processing unit 203 makes a reservation for a taxi and performs a settlement process regarding usage of the taxi corresponding to the taxi reservation in response to a taxi reservation request received from the portable terminal 10. Specifically, the taxi reservation/settlement processing unit 203 requests the taxi-related server 40 to make a reservation for a taxi based on a content (for example, a desired allocation place or a desired allocation time) regarding a desire for a taxi allocation designated in a taxi reservation request. The taxi reservation/settlement processing unit 203 requests the settlement server 50 to perform a settlement process regarding the usage of the taxi based on a fixed taxi fare appropriated by the taxi-related server 40 after the usage corresponding to the reservation for the taxi.

The public bus ticket purchase processing unit 204 performs a process of purchasing a predetermined ticket for a public bus via the settlement server 50 based on a user's credit card information registered in advance in response to a public bus ticket purchase request received from the portable terminal 10.

The public bus ticket purchase processing unit 204 may transmit a public bus ticket purchase request from a user to the public bus-related server 30, so as to perform a process of purchasing a predetermined ticket for a public bus. In this case, a settlement process regarding purchase of the predetermined ticket for the public bus is performed via the public bus-related server 30 or the like.

After the public bus ticket purchase processing unit 204 completes a process of purchasing a ticket for a public bus, the public bus ticket information delivery unit 205 issues public bus ticket information corresponding to the ticket, and delivers (transmits) the public bus ticket information to the portable terminal 10.

As described above, the public bus ticket information delivery unit 205 may acquire public bus ticket information issued from the public bus-related server 30, and deliver the acquired public bus ticket information to the portable terminal 10.

The macro data generation unit 206 generates output data (hereinafter, referred to as "macro data") for recognizing various tendencies regarding movement of a user at the macro time based on history data of multimodal route retrieval results in the route retrieval unit 201, accumulated in the route retrieval result history storage unit 207, in response to route retrieval requests from a plurality of users, that is, a record group of the past multimodal route retrieval results. Details of a macro data generation method will be described later (refer to FIGS. 15A, 15B, and 16A to 16D).

The macro data generation unit 206 may be provided in other servers, such as a server dedicated to generation of macro data, that are communicably connected to the center server 20 having the multimodal route retrieval function.

The route retrieval result history storage unit 207 accumulates multimodal route retrieval results in the route retrieval unit 201 as described above. Specifically, whenever the route retrieval unit 201 outputs a multimodal route retrieval result in response to a route retrieval request, the route retrieval result history storage unit 207 stores a record corresponding to the multimodal route retrieval result. Thus, the route retrieval result history storage unit 207 holds a record group (that is, a database) of the past multimodal route retrieval results.

The route retrieval result history storage unit 207 may be provided in other servers, such as a server dedicated to accumulation of history data of a multimodal route retrieval result or the server dedicated to generation of macro data, that are communicably connected to the center server 20 having the multimodal route retrieval function. Hereinafter, this will also be the same for the macro data storage unit 208 which will be described later.

The macro data storage unit 208 stores macro data generated by the macro data generation unit 206.

Details of Route Retrieval Request Method

Next, with reference to FIGS. 4, 5A, 5B, 6A, 6B, and 6C, a description will be made of details of a method in which a user requests the center server 20 to perform multimodal route retrieval by using the portable terminal 10.

Figure 4:
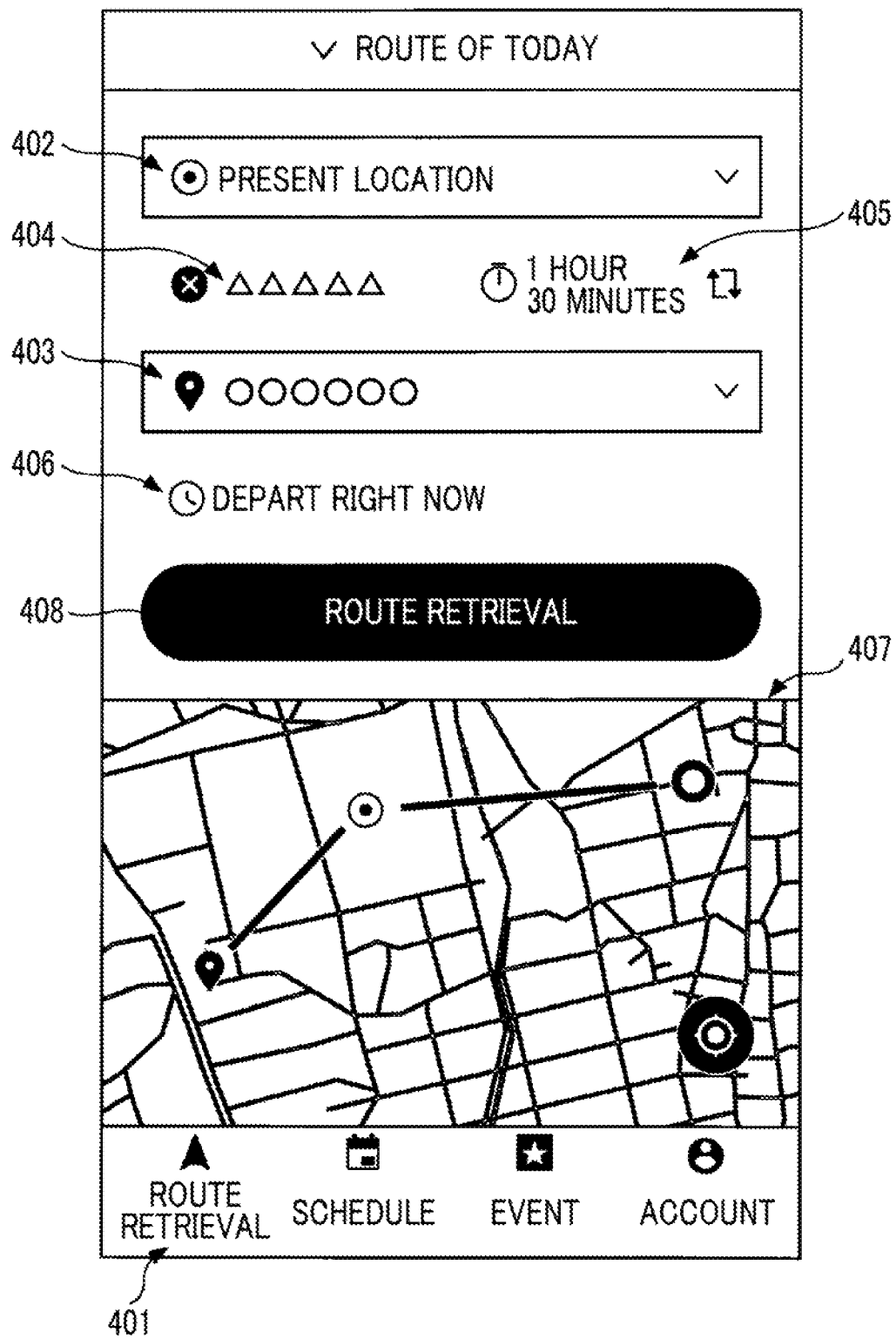
FIG. 4 is a diagram for describing an example of a user operation method of requesting multimodal route retrieval.

First, FIG. 4 is a diagram for describing an example of a user operation method of requesting multimodal route retrieval. Specifically, FIG. 4 is a diagram illustrating an example (application screen 400) of an application screen for transmitting a route retrieval request in the route retrieval application from the portable terminal 10 to the center server 20.

As illustrated in FIG. 4, the application screen 400 displayed on the display device 16 of the portable terminal 10 includes a route retrieval button 401, a departure place box 402, a destination box 403, a transit place box 404, a stay time setting menu 405, a departure time setting menu 406, a map display region 407, and a route retrieval execution button 408.

The route retrieval button 401 is disposed on the leftmost side in a button group provided in a fixed display region that is horizontally set at a lower end position of the entire application screen of the route retrieval application. A user may perform an operation (for example, a touch operation on a corresponding position in a touch panel) of designating and deciding the route retrieval button 401 on any application screen of the route retrieval application, so as to display the application screen 400 on the display device 16.

The departure place box 402 is used to set a departure place in multimodal route retrieval. The user may set a desired departure place in the departure place box 402. For example, the current place may be set as default setting, that is, the current position of the portable terminal 10 measured by a global navigation satellite system (GNSS) device such as a global positioning system (GPS) device mounted on the portable terminal 10 may be set in the departure place box 402 (refer to FIG. 4). There may be an aspect in which a facility name or a keyword corresponding to any departure place is input into the departure place box 402, destination candidates corresponding to the input facility name or keyword are displayed in a list form, and thus the user can select (set) a desired destination from the displayed list. Hereinafter, this will also be the same for setting of the destination box 403 and the transit place box 404.

The destination box 403 is used to set a destination in the multimodal route retrieval. The user may set a desired destination in the destination box 403.

The transit place box 404 is used to set a transit place in the multimodal route retrieval. The user may set a desired transit place in the transit place box 404.

A transit place may not be set.

The stay time setting menu 405 is used to set a stay time in the transit place in the multimodal route retrieval. For example, the user performs an operation of designating and deciding the stay time setting menu 405 such that a drum type setting menu for setting a stay time is displayed to be superimposed on the application screen. Therefore, the user can a stay time in the transit place set in the transit place box 404 by using the drum type setting menu. Hereinafter, this will also be the same for the departure time setting menu 406. In the example illustrated in FIG. 4, a stay time is set to "one hour thirty minutes" in the stay time setting menu 405.

A stay time in a transit place may not be set.

The departure time setting menu 406 is used to set the departure time from the departure place in the multimodal route retrieval. Consequently, the user can set the departure time from the departure place set in the departure place box 402. In the example illustrated in FIG. 4, the departure time is set to "depart now" corresponding to the current time.

A map image of an area including the departure place, the distribution, and the transit place respectively set in the departure place box 402, the destination box 403, and the transit place box 404 is displayed in the map display region 407. Mark images are displayed to be superimposed at positions on the map image respectively corresponding to the departure place, the destination, and the transit place on the map image in the map display region 407. Consequently, the user can understand a relationship among the departure place, the destination, and the transit place on the map.

The route retrieval execution button 408 is used to execute the multimodal route retrieval according to the contents set in the departure place box 402, the destination box 403, the transit place box 404, the stay time setting menu 405, the departure time setting menu 406. Specifically, the user performs an operation of designating and deciding the route retrieval execution button 408, and can thus transmit a route retrieval request including the contents set in the departure place box 402, the destination box 403, the transit place box 404, the stay time setting menu 405, the departure time setting menu 406, from the portable terminal 10 to the center server 20.

As mentioned above, the user can set a retrieval specification for the multimodal route retrieval via the application screen 400, and can cause the center server 20 to perform the multimodal route retrieval according to the set retrieval specification.

Figure 5A:
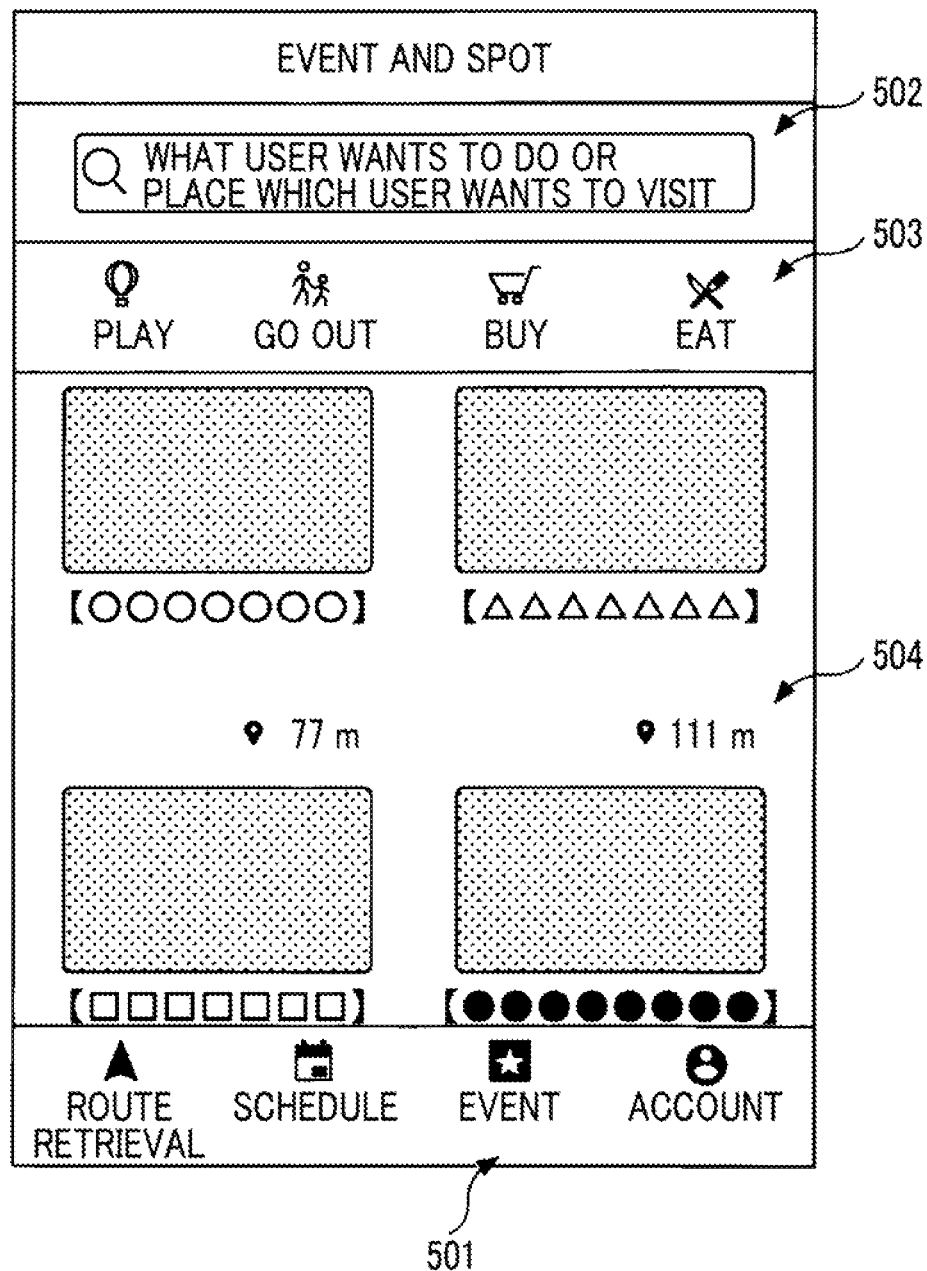
FIG. 5A is a diagram for describing another example of a user operation method of requesting multimodal route retrieval.
Figure 5B:
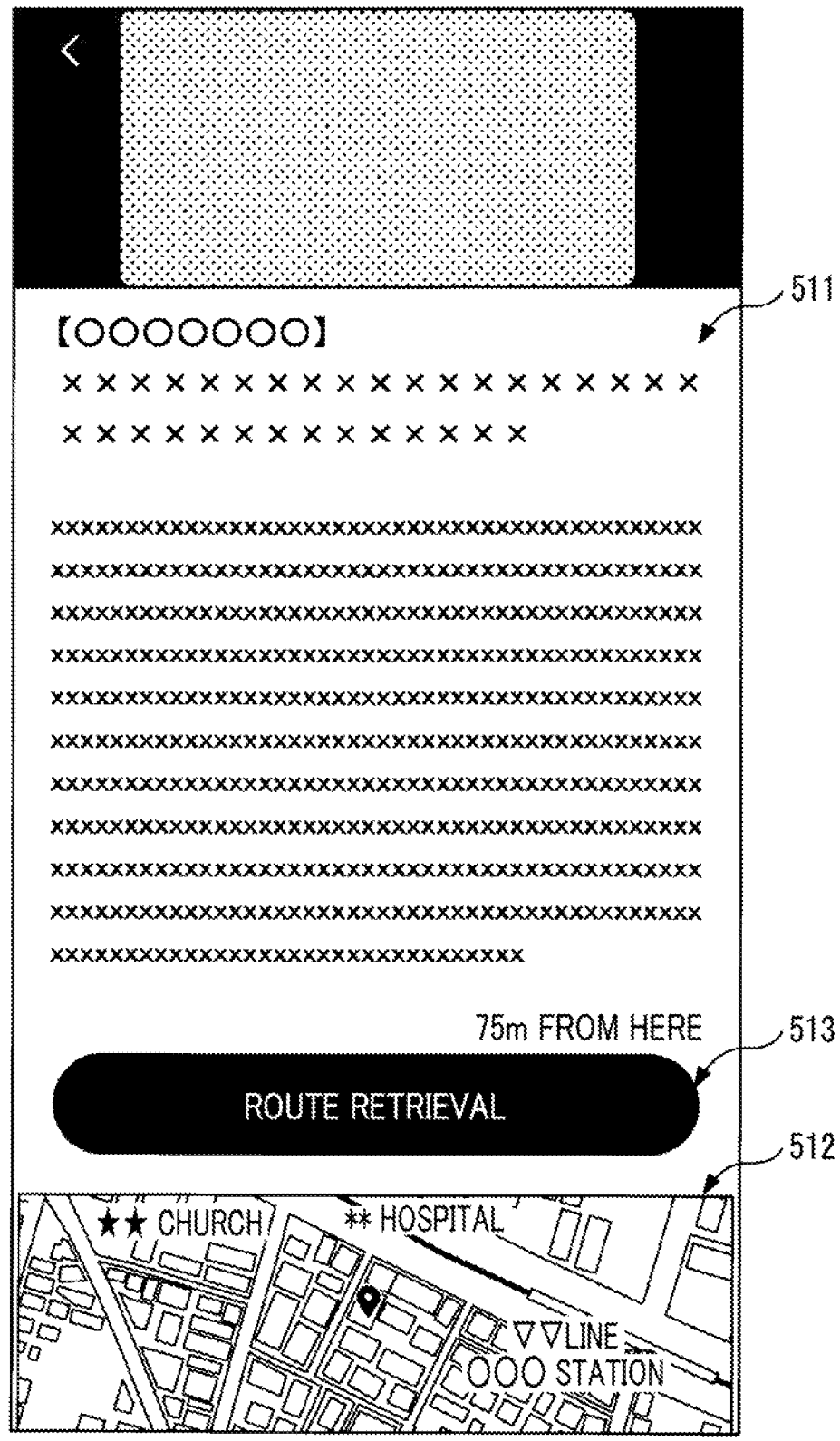
FIG. 5B is a diagram for describing another example of a user operation method of requesting multimodal route retrieval.

Next, FIGS. 5A and 5B are diagrams for describing another example of a user operation method of requesting multimodal route retrieval. Specifically, FIG. 5A is a diagram illustrating a specific example (application screen 500) of an application screen for retrieval (hereinafter, referred to as "event/spot retrieval") of an event or a POI (spot) in the route retrieval application. FIG. 5B illustrates a specific example of an application screen displaying details of an event or a spot selected from retrieval results on the application screen 500, and illustrates another example (application screen 510) of an application screen for transmitting a route retrieval request in the route retrieval application from the portable terminal 10 to the center server 20.

The application screen 510 in FIG. 5B displays the whole region displayable on the display device 16 through a scroll operation on the input device 17 of the portable terminal 10, but a part of the application screen 510 in the upward-downward direction is displayed on the actual display device 16.

As illustrated in FIG. 5A, the application screen 500 displayed on the display device 16 of the portable terminal 10 includes an event/spot retrieval button 501, an event/spot retrieval box 502, a retrieval category selection button group 503, and a retrieval result display region 504.

In the same manner as the route retrieval button 401 in FIG. 4, the event/spot retrieval button 501 is provided in a fixed display region of the entire application screen of the route retrieval application, and is disposed second from the right in a button group of the region. The user performs an operation of designating and deciding the event/spot retrieval button 501 on any application screen of the route retrieval application, and can thus display the application screen 500 on the display device 16.

The event/spot retrieval box 502 is used to input a keyword such as a place which the user wants to visit or what the user wants to do, in order for the user to cause the portable terminal 10 to perform event/spot retrieval.

The retrieval category selection button group 503 is used to select a category condition of when event/spot retrieval is performed according to the keyword input to the event/spot retrieval box 502. In the example illustrated in FIG. 5A, four retrieval category selection buttons respectively corresponding to categories such as "play", "go out", "buy", and "eat" are provided. The user inputs the keyword into the event/spot retrieval box 502, then performs an operation of designating and deciding any one of the four retrieval category selection buttons, and can thus cause the portable terminal 10 to perform event/spot retrieval based on a category condition corresponding to the input keyword and the operated retrieval category selection button. In this case, the portable terminal 10 may perform event/spot retrieval via, for example, a web API for event/POI retrieval published by the event/POI-related server 58.

An event/spot retrieval result is displayed in the retrieval result display region 504. Specifically, summary information (for example, an image of an event or a spot, the name of the event or the spot, and information regarding an opening place for the event or a location of the spot) of the event or the spot picked up in the event/spot retrieval may be displayed in an icon form in the retrieval result display region 504. A display content in the retrieval result display region 504 may be scrolled in the upward-downward direction through the user's scroll operation using the input device 17. Consequently, the user can check a summary of a retrieval result, that is, at least one of a plurality of events and spots that are output through the event/spot retrieval, while performing the scroll operation. Hereinafter, this will also be the same for a display aspect (refer to FIG. 6B) of a peripheral information retrieval result which will be described later. The user performs an operation of designating and deciding one event or one spot among a plurality of events or spots displayed in the retrieval result display region 504, and can thus cause a display content on the display device 16 to transition to the application screen 510 displaying detail information of the designated event or spot.

As illustrated in FIG. 5B, the application screen 510 displayed on the display device 16 of the portable terminal 10 includes an event/spot detail display region 511, a map display region 512, and a route retrieval execution button 513.

The event/spot detail display region 511 is used to display detail information of an event or a spot designated (selected) through the user's operation from retrieval results on the application screen 500.

In the map display region 512, a map image including an opening place for the event or a location of the spot of which detail information is displayed in the event/spot detail display region 511 is displayed, and an image of a mark indicating the opening place for the event or the location of the spot is displayed to be superimposed on the map image. Consequently, the user can understand geographical information of the periphery including an opening place for an event or a location of a spot.

The route retrieval execution button 513 is used to execute multimodal route retrieval in which the opening place for the event or the location of the spot of which detail information is displayed in the event/spot detail display region 511 is set as a destination. For example, there may be an aspect in which the user performs an operation of designating and deciding the route retrieval execution button 513, and thus a route retrieval request in which the current position of the user, that is, the current position of the portable terminal 10 measured by the GNSS device mounted on the portable terminal 10 is set as a departure place, the opening place for the event or the location of the spot is set as a destination, and the current time is set as the departure time may be transmitted from the portable terminal 10 to the center server 20. There may be an aspect in which the user performs an operation of designating and deciding the route retrieval execution button 513, and thus a display content on the display device 16 transitions to the application screen 400 on which the opening place for the event or the location of the spot has been set in the destination box 403.

As mentioned above, the user can set an opening place for an event or a location of a spot found from an event/spot retrieval result as a destination, and cause the center server 20 to perform multimodal route retrieval, by using the application screens 500 and 510.

Figure 6A:
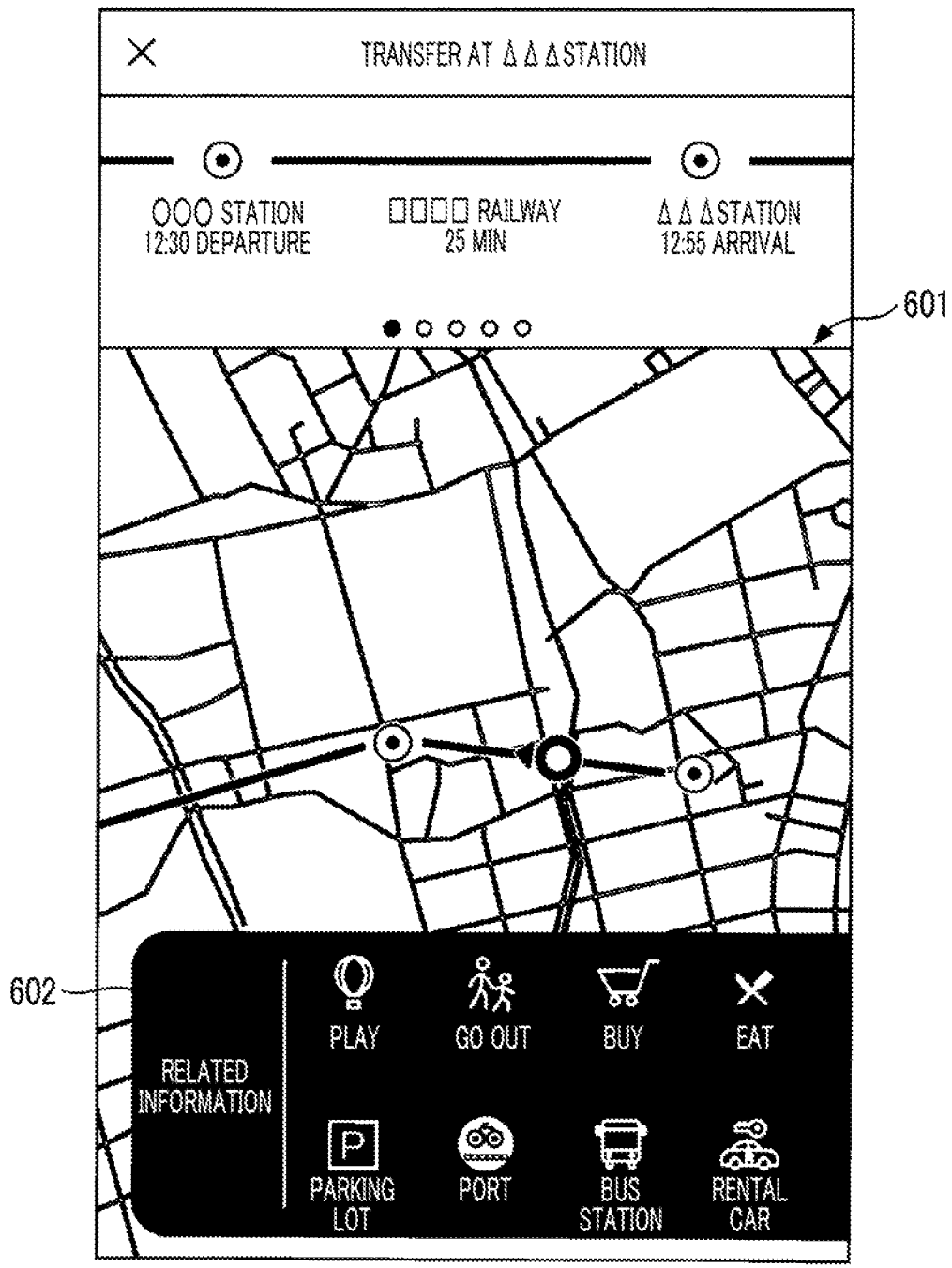
FIG. 6A is a diagram for describing still another example of a user operation method of requesting multimodal route retrieval.
Figure 6B:
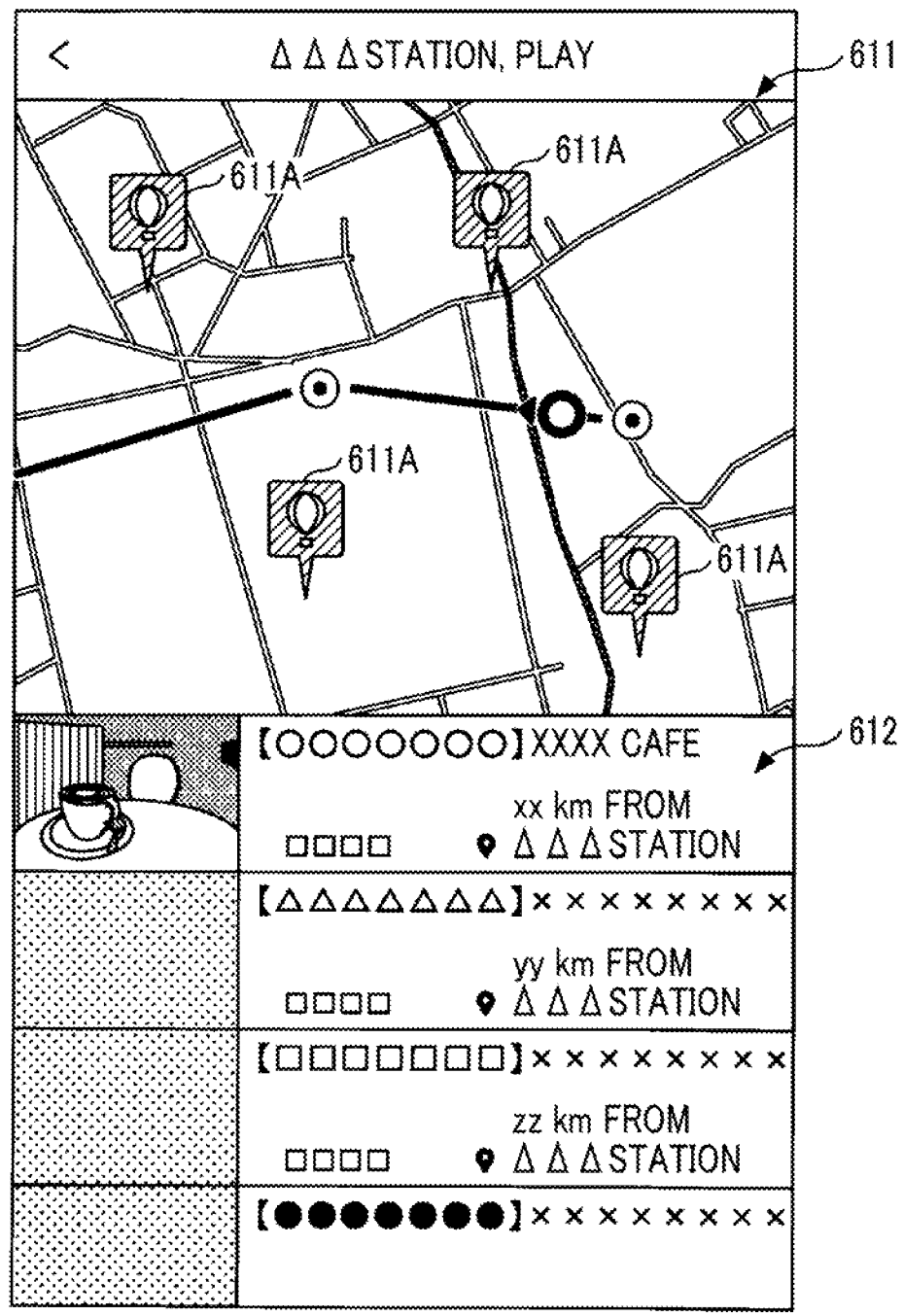
FIG. 6B is a diagram for describing still another example of a user operation method of requesting multimodal route retrieval.
Figure 6C:
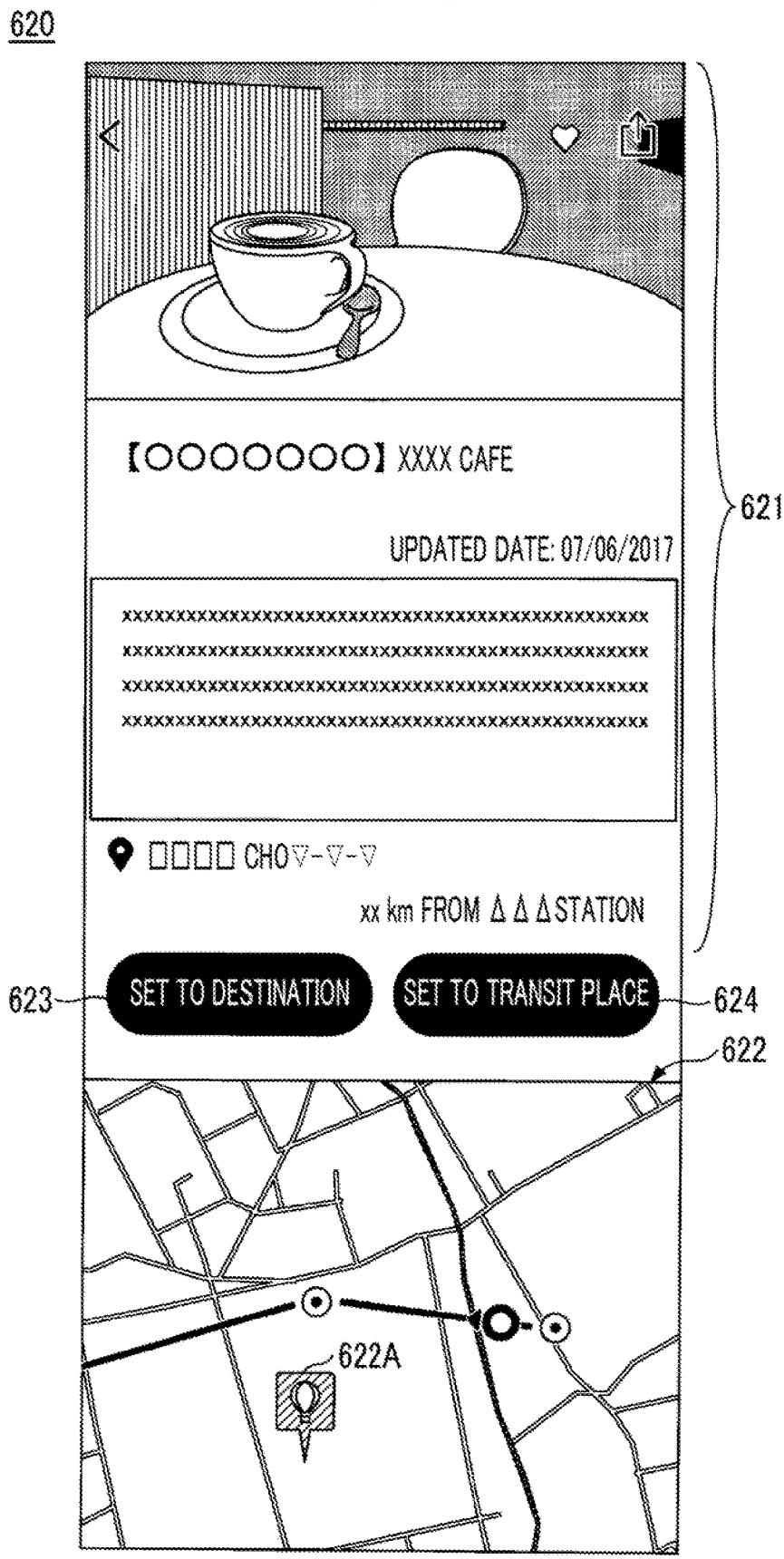
FIG. 6C is a diagram for describing still another example of a user operation method of requesting multimodal route retrieval.

Next, FIGS. 6A to 6C are diagrams for describing still another example of a user operation method of requesting multimodal route retrieval. Specifically, FIG. 6A is a diagram illustrating a specific example (application screen 600) of an application screen on which a map image including some or all places on a route of a route candidate in a multimodal route retrieval result in the route retrieval application. FIG. 6B is a diagram illustrating a specific example (application screen 610) of an application screen on which a retrieval result of peripheral information with a range of the map image displayed on the application screen 600 as a geographical condition is displayed. FIG. 6C is a diagram illustrating a specific example of an application screen displaying details of an event or the like selected from retrieval results of the peripheral information on the application screen 610, and is a diagram illustrating still another example (application screen 620) for transmitting a route retrieval request in the route retrieval application from the portable terminal 10 to the center server 20.

The application screen 600 in FIG. 6A is displayed on the display device 16 in response to the user's predetermined operation on an application screen 810 (refer to FIG. 8B) corresponding to detailed display of a route candidate in a multimodal route retrieval result which will be described later. The application screen 620 in FIG. 6C displays the whole region displayable on the display device 16 through a scroll operation on the input device 17 of the portable terminal 10, but a part of the application screen 620 in the upward-downward direction is displayed on the actual display device 16.

As illustrated in FIG. 6A, the application screen 600 displayed on the display device 16 of the portable terminal 10 includes a map display region 601 and a retrieval category selection button group 602.

The map display region 601 is used to display a map image in a range including some or all places on a route of a single route candidate included in a multimodal route retrieval result. In the example illustrated in FIG. 6A, a map image in a range including a transfer station ("△△△ Station") on a route of a route candidate is displayed in the map display region 601.

The retrieval category selection button group 602 is displayed on a lower end part of the map display region 601 in an overlapping manner, and is used to select a category condition of when retrieval (hereinafter, referred to as "peripheral information retrieval") of peripheral information with a range of the map image displayed in the map display region 601 as a geographical condition is performed. In the example illustrated in FIG. 6A, eight retrieval category selection buttons respectively corresponding to categories such as "play", "go out", "buy", "eat", "parking lot", "port", "bus stop", and "rental car" are provided. The "port" indicates a cycle port for cycle sharing. The user performs an operation of designating and deciding any one of the eight retrieval category selection buttons, and can thus cause the portable terminal 10 to perform peripheral information retrieval according to a geographical condition corresponding to the range of the map image and a category condition corresponding to the operated retrieval category selection button. In this case, the portable terminal 10 may perform the pre-radiation irradiation by using, for example, public bus stops, rental car offices, cycle ports in cycle sharing, and a web API for retrieval of parking lots, respectively published by the public bus-related server 30, the rental car-related server 46, the cycle sharing-related server 48, and the parking lot-related server 56. Consequently, a display content displayed on the display device 16 of the portable terminal 10 transitions from the application screen 600 to the application screen 610.

As illustrated in FIG. 6B, the application screen 610 displayed on the display device 16 of the portable terminal 10 includes a map display region 611 and a retrieval result display region 612.

The map display region 611 is used to display a map image in a range including a facility or the like corresponding to a peripheral information retrieval result. Mark images 611A indicating opening places for events or locations of facilities that are output as a peripheral information retrieval result are displayed to be superimposed on a map image in the map display region 611.

The retrieval result display region 612 is used to display a peripheral information retrieval result. Specifically, summary information of an event or a facility picked up through peripheral information retrieval may be displayed in a list form in the retrieval result display region 612. The user performs an operation of designating and deciding one event or facility among a plurality of events or facilities displayed in the retrieval result display region 612, and can thus cause a display content on the display device 16 to transition to the application screen 620 displaying detail information of the designated event or facility.

As illustrated in FIG. 6C, the application screen 620 displayed on the display device 16 of the portable terminal 10 includes a peripheral information detail display region 621, a map display region 622, a destination setting button 623, and a transit place setting button 624.

The peripheral information detail display region 621 is used to display detail information of an event or a facility designated (selected) through the user's operation from retrieval results on the application screen 610.

In the map display region 622, a map image including an opening place for the event or a location of the facility of which detail information is displayed in the peripheral information detail display region 621 is displayed, and a mark image 622A indicating the opening place for the event or the location of the facility is displayed to be superimposed on the map image. Consequently, the user can understand geographical information of the periphery including an opening place for an event or a location of a spot.

The destination setting button 623 and the transit place setting button 624 are used to set the opening place for the event or the location of the facility of which detail information is displayed in the peripheral information detail display region 621 as a destination and a transit place, and to execute multimodal route retrieval again. For example, there may be an aspect in which the user performs an operation of designating and deciding the destination setting button 623 or the transit place setting button 624, and thus a route retrieval request in a form in which remaining retrieval conditions are the same as those in the original multimodal route retrieval, and a condition for a destination or a transit place is changed an opening place for an event or a location of a facility, is transmitted from the portable terminal 10 to the center server 20. There may be an aspect in which the user performs an operation of designating and deciding the destination setting button 623, and thus a display content on the display device 16 transitions to the application screen 400 in which the opening place for the event or the location of the facility has been set in the destination box 403 or the transit place box 404, and remaining conditions have been set in the original multimodal route retrieval.

As mentioned above, the user can set an opening place for an event or a location of a facility found from a peripheral information retrieval result on a route candidate in a multimodal route retrieval as a destination or a transit place, and cause multimodal route retrieval to be performed, by using the application screen 600, the application screen 610, and the application screen 620.

Details of Multimodal Route Retrieval Method

Next, with reference to FIG. 7, a description will be made of details of multimodal route retrieval in the center server 20 (route retrieval unit 201). Hereinafter, characteristics of a multimodal route retrieval method according to the present embodiment will be focused.

FIG. 7 is a diagram illustrating an application screen (application screen 700) for setting target moving means among a plurality of pieces of moving means which can be set as target moving means in the route retrieval application.

The route retrieval unit 201 performs multimodal route retrieval using one or two or more of a plurality of pieces of target moving means based on retrieval conditions (for example, conditions set on the application screen 400 in FIG. 4) including a departure place and a destination corresponding to a route retrieval request, and outputs one or a plurality of route candidates. In this case, as described above, the target moving means may be selectable by a user from among a plurality of pieces of moving means, and the user may select target moving means on the application screen 700 in FIG. 7. In other words, the user can change a prerequisite in the multimodal route retrieval performed by the route retrieval unit 201.

For example, as illustrated in FIG. 7, a plurality of pieces of moving means ("walking", an "electric train", a "public bus", a "ship/water bus", a "limited-express Shinkansen train", an "express bus", an "airplane", a "taxi", "cycle sharing", a "bicycle", an "automobile", a "rental car", and "car sharing") that are candidates of target moving means are displayed to be arranged in the upward-downward direction on the application screen 700.

Among the candidates of target moving means, the "walking" and the "electric train" are fixed as target moving means. In other words, in the present example, the route retrieval unit 201 performs multimodal route retrieval using one or two combinations among pieces of target moving means including at least the "walking" and the "electric train". With respect to the other candidates of target moving means (the "public bus", the "ship/water bus", the "limited-express Shinkansen train", the "express bus", the "airplane", the "taxi", the "cycle sharing", the "bicycle", the "automobile", the "rental car", and the "car sharing"), setting and unsetting (ON and OFF) are switched as target moving means through the user's operation on a slide switch provided beside the name of the candidate of target moving means on the application screen 700.

The user performs an operation of setting or unsetting for each candidate of target moving means on the application screen 700 and then performs an operation of designating and deciding a "completion" button disposed at an upper right corner of the application screen 700, and can thus transmit a set content on the application screen 700 from the portable terminal 10 to the center server 20 such that the set content can be reflected as a prerequisite (hereinafter, referred to as a "route retrieval prerequisite") for route retrieval in the route retrieval unit 201.

As mentioned above, the route retrieval unit 201 may perform multimodal route retrieval based on retrieval conditions set in a route retrieval request received from the portable terminal 10 or a route retrieval prerequisite reflected in the center server 20 via the application screen 700.

In the present example (FIG. 7), a train is divided into the "electric train" and the "limited-express Shinkansen train", but may be integrated into one. In the present example, the ship and the water bus are integrated into and handled as one, but each of the ship and the water bus may be handled as a separate candidate of target moving means.

In a case where a route candidate including usage of sharing type moving means is retrieved, the route retrieval unit 201 may restrict a usage portion on a movement route from a departure place to a destination. Specifically, the route retrieval unit 201 may perform route retrieval from a departure place to a destination, including usage of sharing type moving means, so as to restrict at least one of usage of the sharing type moving means from the departure place or the departure place periphery and usage thereof for reaching the destination or the destination periphery. In this case, the departure place periphery and the destination periphery respectively indicate ranges within a predetermined distance (for example, two kilometers) from the departure place and the destination.

The sharing type moving means has a relatively high degree of freedom in usage selection in route retrieval. For example, in a case of route retrieval based on movement using an automobile or a bicycle for private use, a car parking lot or a bicycle parking lot is needed to be secured, and, thus, fundamentally, route retrieval for movement consistently using the automobile or the bicycle from a departure place to a destination is frequently performed. On the other hand, in the sharing type moving means, generally, an access point to a vehicle (for example, a rental car office, a station for car sharing, and a cycle port for cycle sharing) is set to various places, or a user can get on and off at a favorite place (for example, a taxi or ride sharing). Thus, such a usage pattern of partially using the sharing type moving means between a departure place and a destination is easily realizable. In the sharing type moving means such as a bus or an electric train of which the riding capacity is relatively large, a movement route is not defined in advance, and the degree of freedom of movement increases. Therefore, in a case where the sharing type moving means is included in moving means that is a route retrieval target in multimodal route retrieval, rotatable may not be completed within a realistic period of time.

In contrast, as described above, in a case where multimodal route retrieval is performed such that a portion using the sharing type moving means as a usage target is restricted on a route from a departure place to a destination, it is possible to suppress an increase in a pattern of a combination including other moving means such as a public transportation. One of a start point and an end point of the sharing type moving means is restricted to a departure place or the departure place periphery, or a distribution or the destination periphery, the degree of freedom of a movement route can be reduced more than in a form in which there is the degree of freedom in both of a start point and an end point. Therefore, the center server 20 (route retrieval unit 201) can suppress an increase in a portion of a combination including other moving means such as a public transportation and can thus perform multimodal route retrieval within a realistic time.

Specifically, the sharing type moving means as target moving means may include at least one of a rental car, car sharing, cycle sharing, ride sharing, and a taxi as described above.

Consequently, the center server 20 (the route retrieval unit 201) can complete multimodal route retrieval including a rental car, car sharing, cycle sharing, ride sharing, or a taxi as specific sharing type moving means within a realistic time.

More specifically, in a case where the sharing type moving means is a rental car, the route retrieval unit 201 may perform multimodal route retrieval from a departure place to a destination, including usage of the rental car such that the rental car is restricted to at least one of usage from a rental car office in the periphery of the departure place and usage to a rental car office in the periphery of the destination. In a case where the sharing type moving means is car sharing, the route retrieval unit 201 may perform multimodal route retrieval from a departure place to a destination, including usage of the car sharing such that the car sharing is restricted to at least one of usage from a car sharing station in the periphery of the departure place and usage to a car sharing station in the periphery of the destination. In a case where the sharing type moving means is cycle sharing, the route retrieval unit 201 may perform multimodal route retrieval from a departure place to a destination, including usage of the cycle sharing such that the cycle sharing is restricted to at least one of usage from a cycle port in the periphery of the departure place and usage to a cycle port in the periphery of the destination. In other words, the route retrieval unit 201 may perform multimodal route retrieval from a departure place to a destination, including usage of the sharing type moving means such that the rental car, the car sharing, and the cycle sharing are restricted to at least one of usage from access points to corresponding vehicles in the periphery of the departure place and usage to access points to the corresponding vehicles in the periphery of the destination.

Consequently, the center server 20 (route retrieval unit 201) can perform multimodal route retrieval including usage of sharing type moving means in accordance with characteristics of the sharing type moving means such as a rental car, car sharing, and cycle sharing which a user is needed to get on and off at access points.

The route retrieval unit 201 may perform multimodal route retrieval from a departure place to a destination, including usage of the sharing type moving means such that the ride sharing and the taxi are restricted to at least one of usage from the departure place and usage to the destination.

Consequently, the center server 20 (route retrieval unit 201) can perform multimodal route retrieval including usage of sharing type moving means in accordance with characteristics of the sharing type moving means such as ride sharing or a taxi for which a user easily accesses a getting-on/off place.

An upper limit (hereinafter, referred to as a "retrieval upper limit distance") of a usage distance in multimodal route retrieval may be set for each piece of target moving means. For example, a retrieval upper limit distance (for example, 100 kilometers) may be set for a taxi. In a case where a taxi usage distance is too long, since a taxi fare exceeds a fare that is allowed to be actually paid by a user, presentation of a route candidate may be meaningless. A retrieval upper limit distance (for example, 10 kilometers) may be set for cycle sharing or walking. The cycle sharing or the walking has a balance with the user's own physical strength, and, in a case where a usage distance thereof is too long, presentation of a route candidate may be meaningless.

Details of Route Retrieval Result Display Method

Next, with reference to FIGS. 8A, 8B, and 9, a description will be made of details of a method of displaying a route retrieval result on the portable terminal 10.

Figure 8B:
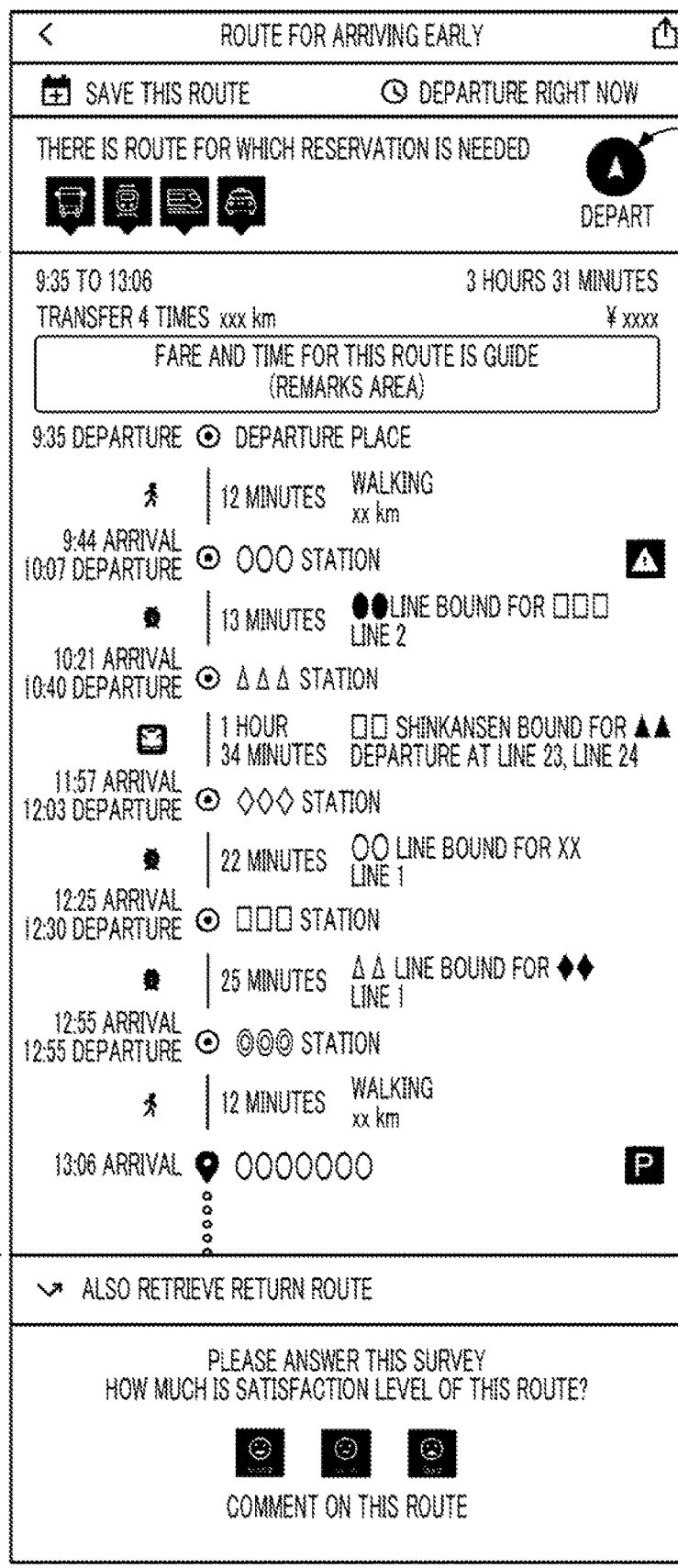
FIG. 8B is a diagram illustrating an example of a display screen for a multimodal route retrieval result.

FIGS. 8A and 8B are diagrams illustrating an example of a display screen for a multimodal route retrieval result. Specifically, FIG. 8A is a diagram illustrating an example (application screen 800) of a display screen on which a plurality of route candidates in a multimodal route retrieval result is displayed in a list form. FIG. 8B is a diagram illustrating an example (application screen 810) of an application screen on which a detailed content of one of the route candidates in the multimodal route retrieval result is displayed. FIG. 9 is a diagram for describing an example of a method of deciding target moving means of which the name is displayed to be correlated with the route candidate.

The application screens 800, 810 in FIGS. 8A and 8B display the whole region displayable on the display device 16 through a scroll operation on the input device 17 of the portable terminal 10, but parts of the application screens 800, 810 in the upward-downward direction are displayed on the actual display device 16. Thus, a user performs a vertical scroll operation on the input device 17 of the portable terminal 10, and can thus view the whole regions of the application screens 800 and 810. Hereinafter, this will also be the same for application screens 1000, 1200, 1300 in FIGS. 10A, 12A, and 13A which will be described later.

As illustrated in FIG. 8A, the application screen 800 displayed on the display device 16 of the portable terminal 10 includes route candidate display regions 801 to 808 that are sequentially set to be arranged from the top and respectively correspond to a plurality of route candidates.

The route candidate display region 801 set in the top displays a route candidate in which, first, a user moves from a departure place to a cycle port for cycle sharing around the departure place, then moves by shared cycle from the cycle port for cycle sharing around the departure place to a cycle port for cycle sharing around a railway getting-on station ("QQ Line, XX Station"), then moves by train from the getting-on station to a predetermined getting-off station by changing two lines, and finally moves on foot from the getting-off station to a destination (refer to a fourth display region 801D which will be described later).

The route candidate display region 802 set second from the top displays a route candidate in which, first, a user moves by taxi from a departure place to a railway getting-on station ("○○ Line, ΔΔ Station"), then moves by train from the getting-on station to a predetermined getting-off station by changing three lines, and finally moves on foot from the getting-off station to a destination (refer to a fourth display region 802D which will be described later).

The route candidate display region 803 set third from the top displays a route candidate in which, first, a user moves on foot from a departure place to a railway getting-on station ("OO Line, XX Station"), then moves by train from the getting-on station to a predetermined getting-off station by changing three lines, and finally moves on foot from the getting-off station to a destination (refer to a fourth display region 803D which will be described later).

The route candidate display region 804 set fourth from the top displays a route candidate in which, first, a user moves on foot from a departure place to a public bus stop ("○○ Route, ΔΔ Stop") around the departure place, then moves by public bus from the stop to a railway getting-on station, then moves by train from the getting-on station to a predetermined getting-off station by changing three lines, and finally moves on foot from the getting-off station to a destination (refer to a fourth display region 804D which will be described later).

The route candidate display region 805 set fifth from the top displays a route candidate in which, first, a user moves on foot from a departure place to a rental car office around the departure place, then moves by rental car from the rental car office to a rental car office around a destination, and finally moves on foot from the rental car office around the destination to the destination (refer to a fourth display region 805D which will be described later).

The route candidate display region 806 set sixth from the top displays a route candidate in which, first, a user moves on foot from a departure place to a car sharing station around the departure place, then moves by shared car from the car sharing station around departure place to a car sharing station around a destination, and finally moves on foot from the car sharing station around the destination to the destination (refer to a fourth display region 806D which will be described later).

The route candidate display region 807 set second from the bottom displays a route candidate in which a user moves by car from a departure place to a destination (refer to a fourth display region 807D which will be described later).

The route candidate display region 808 set in the bottom displays a route candidate in which a user moves by bicycle from a departure place to a destination (refer to a fourth display region 808D which will be described later).

The six route candidates respectively the route candidate display regions 801 to 806 are sorted and displayed in order from the top according to a common condition that are set regardless of a plurality of pieces of target moving means, such as a fast arrival order, a low fare order, or an order in which the number of times of transfer is small. In the example illustrated in FIG. 8A, the six route candidates are sorted and displayed in order from the top in an order of fast arrival to a destination.

On the other hand, the two route candidates respectively route candidate display regions 807, 808 are fixed (in the present example, on the lower side) after the other six route candidates in a display order in the eight route candidates, according to a condition (hereinafter, referred to as a "unique condition") uniquely defined for target moving means used in each route candidate regardless of the content. This is because a probability that a user using multimodal route retrieval preferentially may select a route retrieval result including an automobile or a bicycle for private use is relatively low. More specifically, this is because, when taking into consideration this fact, it is sufficient to provide a user with a route candidate merely using an automobile or a bicycle for private use as a comparison target with other route candidates. In other words, the retrieval result delivery unit 202 may generate route retrieval result delivery data in an aspect in which, among a plurality of route candidates, a specific route candidate merely using an automobile or a bicycle is fixed after the other route candidate except the specific route candidate in a display order, and may deliver the route retrieval result delivery data to the portable terminal 10.

Regarding a display order between a route candidate merely using an automobile and a route candidate merely using a bicycle, the route candidate merely using an automobile may be disposed before the route candidate merely using a bicycle as illustrated in FIG. 8A, and the route candidate merely using an automobile may be disposed after the route candidate merely using a bicycle. A display order between the route candidate merely using an automobile and the route candidate merely using a bicycle may be decided according to the common condition (for example, a fast arrival order or a low fare order).

A display specification of a specific route candidate using specific target moving means may be decided according to a unique condition uniquely defined for the specific target moving means other than an automobile or a bicycle.

For example, with respect to a specific route candidate using a taxi, in a case where a taxi usage distance is relatively short in the specific route candidate, the retrieval result delivery unit 202 displays the specific route candidate as a route retrieval result on the display device 16 of the portable terminal 10. In this case, a display order of the specific route candidate among a plurality of route candidates may be decided based on the common condition. In other words, a display specification of the specific route candidate may be decided by preferentially applying the unique condition and then further applying the common condition. Hereinafter, this will also be the same for other specific route candidates. On the other hand, in a case where a taxi usage distance is relatively long, the retrieval result delivery unit 202 may not display the specific route candidate as a route retrieval result on the display device 16 of the portable terminal 10. Specifically, in a case where a taxi usage distance in the specific route candidate is less than the minimum physical quantity (hereinafter, referred to as the "minimum physical quantity causing a first reaction") (for example, 15 kilometers) causing a predetermined a reaction, the retrieval result delivery unit 202 may display the specific route candidate as a route retrieval result on the display device 16 of the portable terminal 10, and, in a case where a taxi usage distance in the specific route candidate is equal to or more than the minimum physical quantity causing the first reaction, the retrieval result delivery unit 202 may not display the specific route candidate as a route retrieval result on the display device 16 of the portable terminal 10. This is because, in a case where a taxi usage distance is long to some extent, a probability that a user may select the specific route candidate is considerably low due to a balance with a fare or the like. In this case, the specific route candidate may be a route candidate using a combination of a taxi and other moving means, and may be a route candidate merely using a taxi. In the same manner as in a case of a taxi, with respect to a specific route candidate using ride sharing, it may be decided whether or not the specific route candidate is displayed as a route retrieval result on the display device 16 of the portable terminal 10 according to the identical fixed condition (whether or not a usage distance of the ride sharing is equal to or more than the minimum physical quantity causing the first reaction). In other words, in a case where usage distances of a taxi and ride sharing in a specific route candidate using at least one of the taxi and the ride sharing are less than the minimum physical quantity causing the first reaction, the retrieval result delivery unit 202 may display the specific route candidate on the display device 16 of the portable terminal 10, and, in a case where a usage distance of at least one of the taxi and the ride sharing in the specific route candidate is equal to or more than the minimum physical quantity causing the first reaction, the retrieval result delivery unit 202 may not display the specific route candidate on the display device 16 of the portable terminal 10. In a case where a usage distance of at least one of a taxi and ride sharing in a specific route candidate using at least one of the taxi and the ride sharing is relatively long, the retrieval result delivery unit 202 may set a display order thereof to be later than an order decided based on the common condition, instead of not displaying the specific route candidate.

Specifically, with respect to a specific route candidate using walking, in a case where a walking usage distance in the specific route candidate is relatively short, specifically, is less than the minimum physical quantity (hereinafter, referred to as the "minimum physical quantity causing a second reaction") (for example, 1.2 kilometers) causing a predetermined a reaction, the retrieval result delivery unit 202 may display the specific route candidate as a route retrieval result on the display device 16 of the portable terminal 10. On the other hand, in a case where a walking usage distance in the specific route candidate is relatively long, that is, equal to or more than the minimum physical quantity causing a second reaction, the retrieval result delivery unit 202 may not display the specific route candidate as a route retrieval result on the display device 16 of the portable terminal 10. This is because, in a case where a walking usage distance is relatively long in a route candidate using walking, a probability that a user may select the route candidate is considerably low due to a balance with physical consumption, the needed time, or the like. In a case where a walking usage distance in a route candidate using walking is relatively long, the retrieval result delivery unit 202 may set a display order thereof to be later than an order decided based on the common condition, instead of not displaying the route candidate.

For example, in a case where a transfer interval between public transportations of an identical type or public transportations of different types is relatively short, specifically, less than the minimum physical quantity (hereinafter, referred to as the "minimum physical quantity causing a third reaction") causing a predetermined a reaction, in a specific route candidate using target moving means (public transportation) such as a train, a bus, an airplane, or a ship of which an operation plan including an operation route and an operation time is defined in advance, the retrieval result delivery unit 202 displays the specific route candidate as a route retrieval result on the display device 16 of the portable terminal 10.

On the other hand, in a case where a transfer interval between public transportations is relatively long, that is, equal to or more than the minimum physical quantity causing a third reaction, the retrieval result delivery unit 202 may not display the specific route candidate as a route retrieval result on the display device 16 of the portable terminal 10. This is because, in a case where a transfer interval is relatively long, a user's convenience is reduced, and thus a probability that the user may select the specific route candidate is low. In a case where a transfer interval between public transportations in a route candidate using the public transportations is relatively long, the retrieval result delivery unit 202 may set a display order thereof to be later than an order decided based on the common condition, instead of not displaying the route candidate.

As mentioned above, the retrieval result delivery unit 202 displays a specific route candidate using specific target moving means among the route candidates on the display device 16 of the portable terminal 10, based on a display specification including at least one of a display order and the presence or absence of display in the route candidates decided according to a unique condition defined for the specific target moving means among a plurality of pieces of target moving means.

Consequently, a criterion for a user to select a route candidate from among a plurality of route candidates may differ for each piece of target moving means used in each route candidate, and thus the center server 20 can reflect a unique condition for specific target moving means in a display specification of a specific route candidate using the specific target moving means. Therefore, for example, a unique condition for specific target moving means is set in a form of following a criterion for a user to select a specific route candidate including the specific target moving means, and thus the center server 20 can improve the user's convenience when the user selects a single route candidate from among a plurality of route candidates.

The retrieval result delivery unit 202 may display route candidates other than a specific route candidate among a plurality of route candidates on the display device 16 of the portable terminal 10, based on a display specification including a display order in the route candidates, decided according to a common condition defined for the route candidates, and may display the specific route candidate the specific route candidate on the display device 16 of the portable terminal 10, based on a display specification including a display order and the presence or absence of display in the route candidates, decided according to a unique condition.

Consequently, the center server 20 can display a specific route candidate using specific target moving means according to a unique condition on the premise that a plurality of route candidates is displayed according to a common condition such as an order of needed time being short.

The retrieval result delivery unit 202 may a specific route candidate on the display device 16 of the portable terminal 10 based on a display specification including a display order in a plurality of route candidates and the presence or absence of display, decided according to a common condition and a unique condition applied more preferentially than the common condition.

Therefore, the center server 20 may preferentially apply a unique condition to a specific route candidate using specific target moving means, further apply a common condition thereto under a situation in which the common condition is applicable, and display the specific route candidate on a user terminal (portable terminal 10) according to the common condition.

As illustrated in FIG. 8A, the route candidate display regions 801 to 808 respectively include first display regions 801A to 808A, second display regions 801B to 808B, third display regions 801C to 808C, fourth display regions 801D to 808D, and fifth display regions 801E to 808E.

The first display regions 801A to 808A are respectively disposed horizontally on upper end parts (uppermost parts) of the route candidate display regions 801 to 808. The name (including an abbreviation or a nickname) of a single piece of moving means among pieces of target moving means used in the corresponding route candidates is displayed in each of the first display regions 801A to 808A. The name of a single piece of target moving means used solely is naturally displayed in each of the first display regions 807A, 808A corresponding to route candidates using the single piece of target moving means. The name of a single piece of target moving means among two or more pieces of target moving means used in corresponding route candidates is displayed in each of the first display regions 801A to 806A corresponding to the route candidates using the two or more pieces of target moving means. In other words, the retrieval result delivery unit 202 displays, on the display device 16, the name of a single piece of target moving means among two or more pieces of target moving means in correlation with route candidates using the two or more pieces of target moving means, displayed on the display device 16 of the portable terminal 10 and retrieved by the route retrieval unit 201.

In a case where a route candidate using two or more pieces of target moving means is included in a plurality of route candidates, and the route candidates are merely displayed to be arranged, it may be difficult for a user to intuitively understand that each route candidate indicates a route using what kind of target moving means for movement. The names of all pieces of target moving means used in a route candidate may be displayed, but, in a case where the name of individual moving means is long, displayed is actually complicated, and thus it may be difficult to prompt a user's intuitive understanding. A new name may be added to a combination of two or more pieces of target moving means used in a route candidate so as to be displayed, but it may hard to imagine the target moving means used in the route candidate from the new name, and thus it may be difficult to enable a user to intuitively understand the route candidate, depending on naming aspects.

In contrast, the name of a single piece of moving means among the names of two or more pieces of target moving means used in a route candidate is displayed, and thus a user can intuitively understand the target moving means. The user can also intuitively understand to some extent other target moving means used in the route candidate based on the target moving means by using a content or the like of a route retrieval result displayed on the display device 16 of the portable terminal 10. Therefore, the center server 20 enables a user to understand each piece of target moving means in a route candidate using two or more pieces of target moving means.

Figure 9:
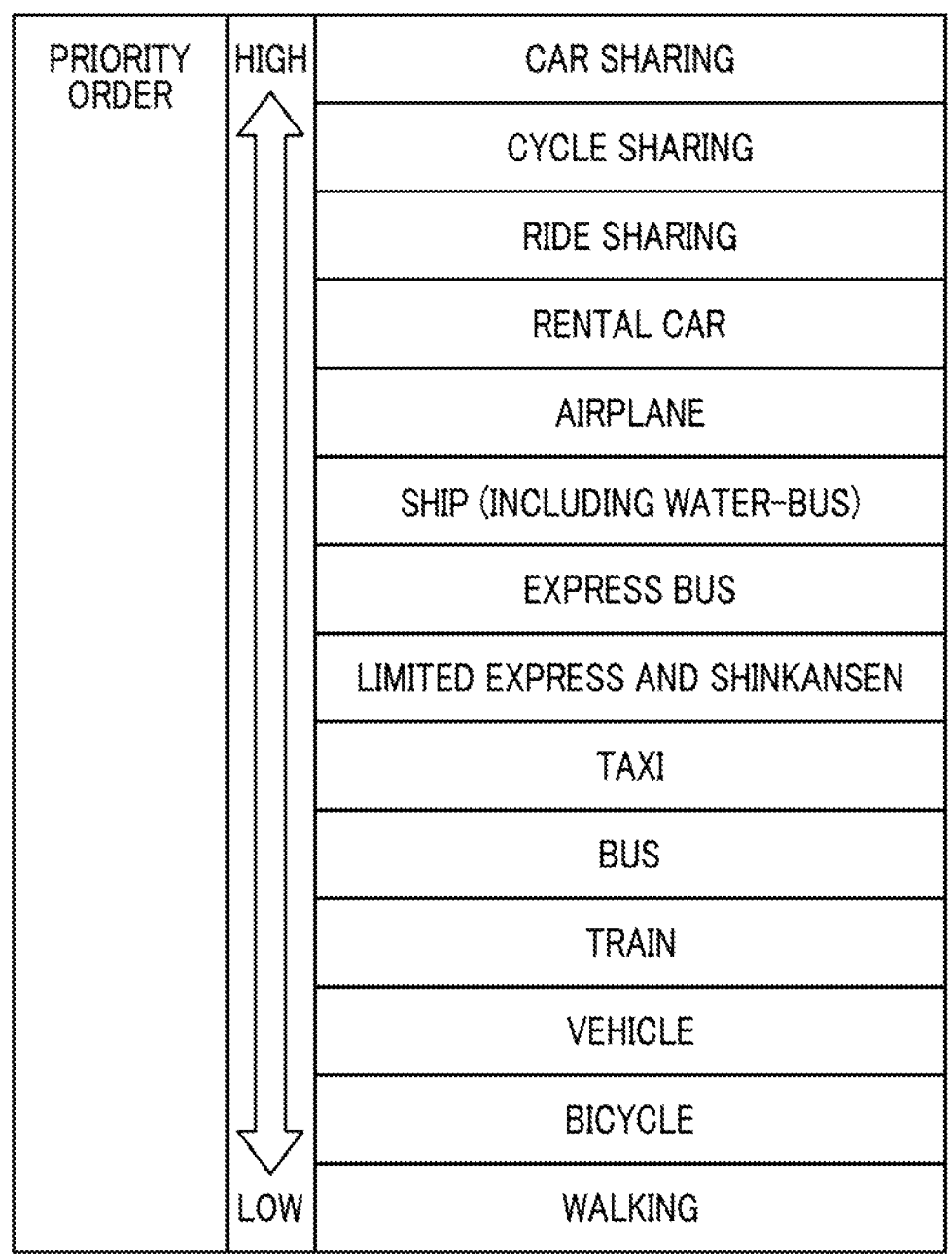
FIG. 9 is a diagram for describing an example of a method of deciding target moving means displayed to be correlated with a route candidate.

For example, as illustrated in FIG. 9, priority orders may be defined in advance for a plurality of pieces of target moving means. With respect to a route candidate using two or more pieces of target moving means, the name of target moving means having the highest priority order among the two or more pieces of target moving means may be displayed to be correlated with the route candidate on the display device 16 of the portable terminal 10.

Consequently, target moving means which a user may highly possibly feel as a target characterizing a route candidate is set to a high priority order, and thus the center server 20 appropriately enables the user to understand each piece of target moving means included in the route candidate.

Specifically, priority orders of car sharing, cycle sharing, ride sharing, and a rental car are set to be higher than priority orders of public transportations such as an airplane, a ship, an express bus, a limited-express Shinkansen train, a bus, and an electric train.

Consequently, the center server 20 can display the name of a rental car, car sharing, cycle sharing, or ride sharing as target moving means characterizing a route candidate on the display device 16 of the portable terminal 10 in correlation with the route candidate using public transportations, and the rental car, the car sharing, the cycle sharing, and the ride sharing. For example, an effect may be supposed in which presenting a rental car, car sharing, cycle sharing, or ride sharing to a user rather than general target moving means such as a public transportation easily leaves an impression on the user. Therefore, the center server 20 enables a user to understand each piece of moving means in a route candidate using, for example, a public transportation, a rental car, car sharing, and cycle sharing.

Priority orders of an automobile, a bicycle, and walking are set to be lower than those of other target moving means.

Consequently, the center server 20 can display the name of other target moving means as target moving means characterizing a route candidate on the display device 16 of the portable terminal 10 in correlation with a movement route using an automobile, a bicycle, walking, and the other target moving means.

In an aspect of being correlated with a route candidate using two or more pieces of target moving means displayed on the display device 16 of the portable terminal 10, the name of target moving means of which a usage distance is longest or a usage time is longest in the route candidate may be displayed.

For example, moving means of which a movement distance is longest or a usage time is longest in a route retrieval result is considered to be one of the most significant interests, to a user, for selecting a route candidate that is actually used. Therefore, the center server 20 enables a user to understand, for example, each piece of moving means included in a route candidate.

In an aspect of being correlated with a route candidate using two or more pieces of target moving means displayed on the display device 16 of the portable terminal 10, the name of target moving means other than walking that is initially used in the route candidate may be displayed.

For example, moving means other than walking that is initially used in a route candidate is considered to be one of the most significant interests to a user for selecting a route candidate that is actually used from among a plurality of route candidates. Therefore, the center server 20 enables a user to understand, for example, each piece of moving means included in a route candidate.

Referring to FIG. 8A again, the second display regions 801B to 808B are respectively disposed horizontally under the first display regions 801A to 808A in the route candidate display regions 801 to 808. The departure time, the arrival time, and a needed time in the corresponding route candidates are displayed in each of the second display regions 801B to 808B.

The third display regions 801C to 808C are respectively disposed horizontally at the center in the upward-downward direction in the route candidate display regions 801 to 808. The name (including an abbreviation or a nickname) of a platform of a public transportation (for example, a railway station, a stop for a public bus or an express bus, an airport for an airplane, or a harbor for a ship) initially used in the corresponding route candidates is displayed in each of the third display regions 801C to 804C among the third display regions 801C to 808C.

Consequently, even though target moving means initially used in a certain route candidate is not a public transportation, the center server 20 can notify a user of a platform of a public transportation initially used or the departure time thereof. Therefore, the center server 20 can improve the user's convenience.

Among the third display regions 801C to 808C, the third display regions 805C to 808C corresponding to the route candidates not using a public transportation are blank.

The fourth display regions 801D to 808D are respectively disposed horizontally under the third display regions in the route candidate display regions 801 to 808. Icons corresponding to pieces of target moving means used in the corresponding route candidate are displayed in a transfer order in each of the fourth display regions 801D to 808D.

The fifth display regions 801E to 808E are respectively disposed horizontally on lower end parts (lowermost parts) of the route candidate display regions 801 to 808. The number of times of transfer (including both of transfer between pieces of target moving means of an identical type and transfer between pieces of target moving means of different types) of pieces of target moving means and a needed fare are displayed in each of fifth display regions 801E to 808E.

A user performs an operation of designating (selecting) and deciding any one of the route candidate display regions 801 to 808 on the application screen 800, and can thus cause the display content on the display device 16 from the application screen 800 to a detail screen for a route candidate corresponding to the designated (selected) one of the route candidate display regions 801 to 808, that is, the application screen 810 in FIG. 8B.

As illustrated in FIG. 8B, the application screen 810 includes a route candidate detail display region 811 and a route guidance start button 812.

A detailed content of a single route candidate selected on the application screen 800 is displayed in the route candidate detail display region 811. Specifically, in the route candidate detail display region 811, pieces of target moving means used in the route candidate and the departure time and the arrival time of each thereof are displayed in order from the top, and, a transfer place between pieces of target moving means of an identical type or pieces of target moving means of different types among the pieces of target moving means is also displayed.

The route guidance start button 812 is disposed over the route candidate detail display region 811, and is used for a user to start route guidance based on the route candidate displayed in the route candidate detail display region 811. The user performs an operation of designating and deciding the route guidance start button 812, and can thus cause the portable terminal 10 to start route guidance. In this case, the portable terminal 10 may perform route guidance through display of predetermined information image on the display device 16 or in voices while comparing position information and time information obtained by the GNSS device and clocking means such as a real time clock (RTC) built into the portable terminal 10, a departure place and an arrival place of each of pieces of target moving means which are sequentially used in the route candidate, and the departure time and the arrival time with each other.

Taxi Usage Method

Next, with reference to FIGS. 10A and 10B, a description will be made of a taxi usage method based on a user's operation on an application screen of the route retrieval application.

Figure 10A:
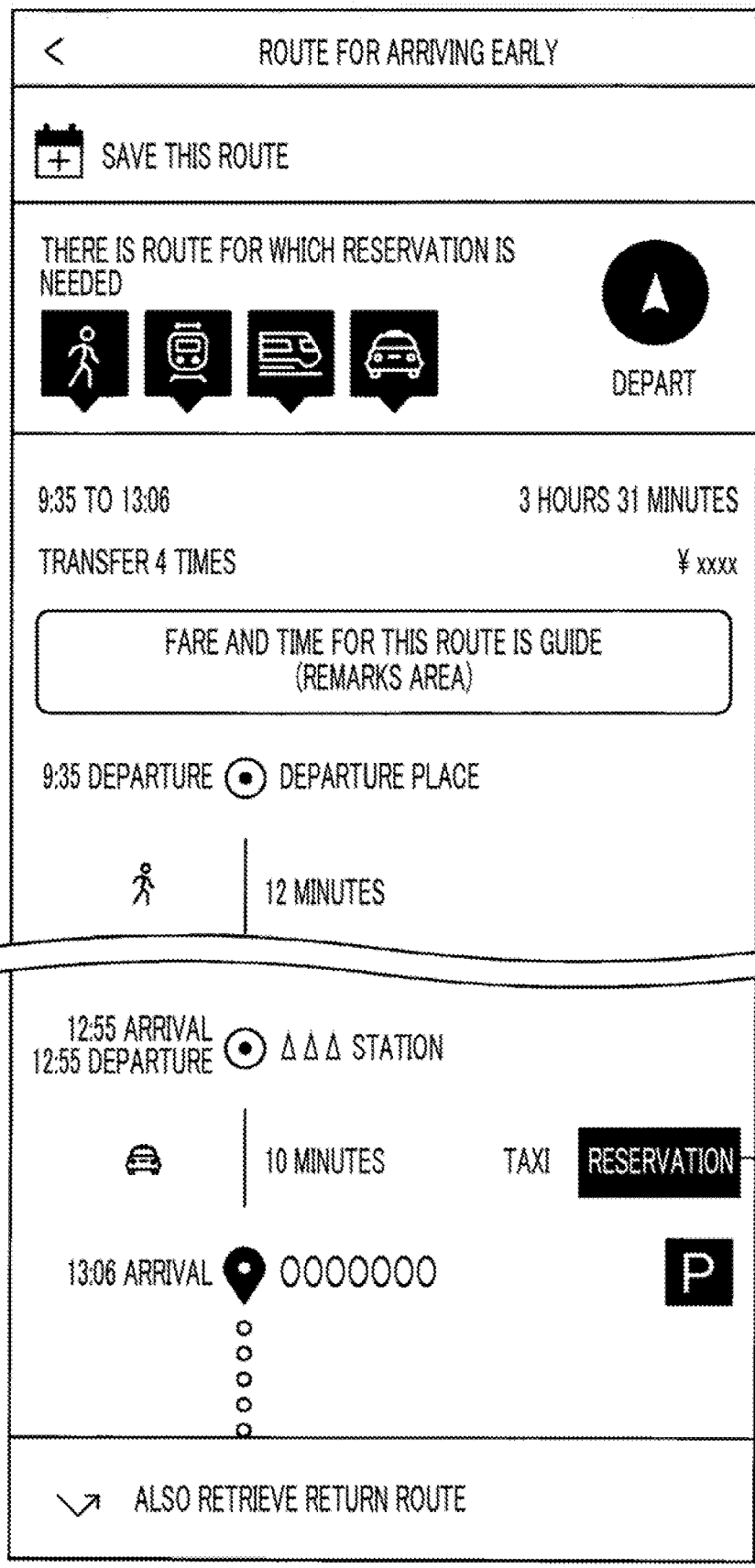
FIG. 10A is a diagram for describing an example of a method of using a taxi based on a multimodal route retrieval result.
Figure 10B:
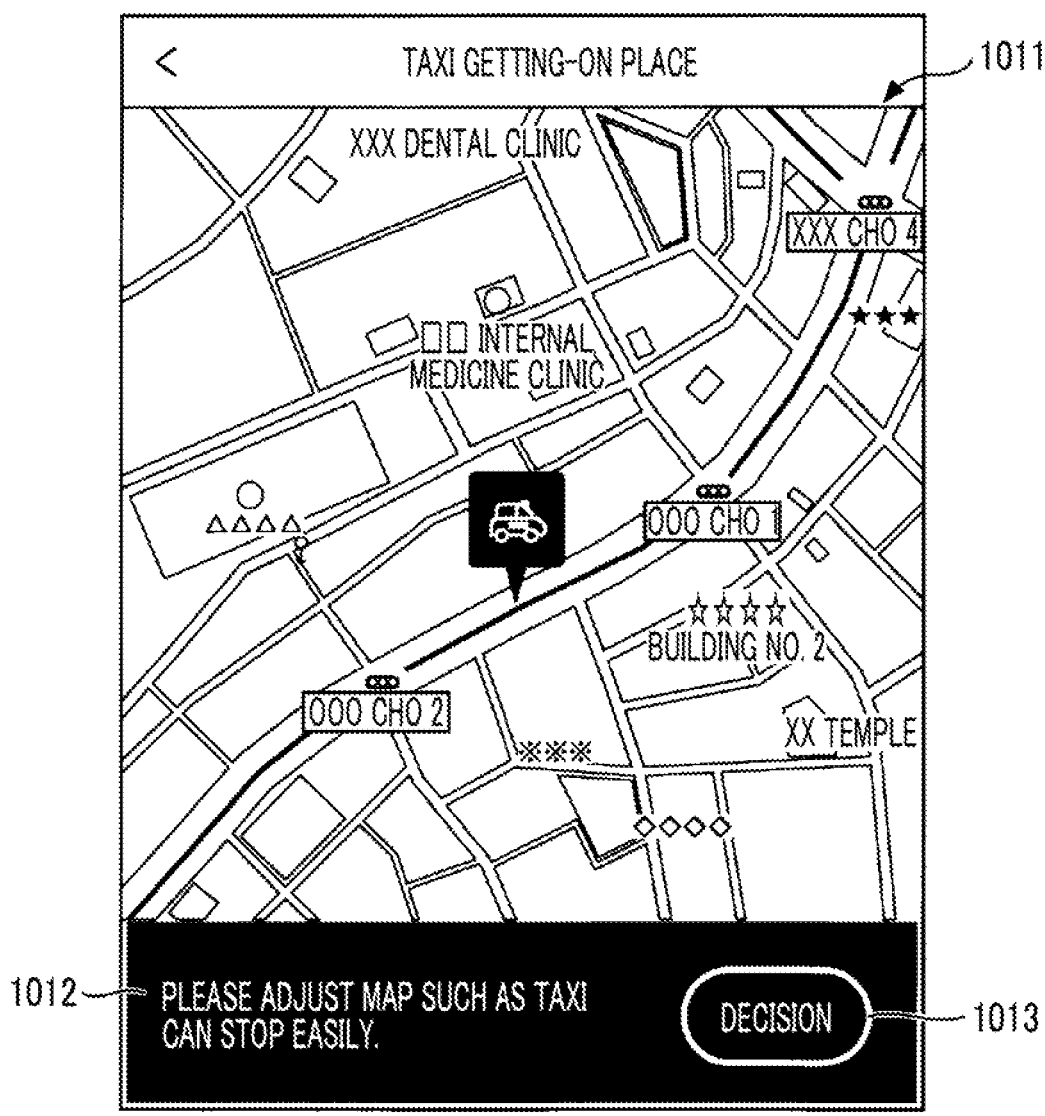
FIG. 10B is a diagram for describing an example of a method of using a taxi based on a multimodal route retrieval result.

FIGS. 10A and 10B are diagrams illustrating an example of a taxi usage method based on a multimodal route retrieval result. Specifically, FIG. 10A is a diagram illustrating an example (application screen 1000) of an application screen displaying a detailed content of a single route candidate using a taxi among a plurality of route candidates in a multimodal route retrieval result. FIG. 10B is a diagram illustrating an example (application screen 1010) of an application screen for a user reserving a taxi.

As illustrated in FIG. 10A, the application screen 1000 includes a route candidate detail display region 1001 in the same manner as the case of the application screen 810 in FIG. 8B.

A detailed content of a route candidate including a taxi usage portion is displayed in the route candidate detail display region 1001, and a taxi reservation button 1002 is disposed in the taxi usage portion. A user performs an operation of designating and deciding the taxi reservation button 1002, and can thus cause a display content on the display device 16 of the portable terminal 10 to transition from the application screen 1000 to the application screen 1010 for reserving a taxi.

As illustrated in FIG. 10B, the application screen 1010 includes a map image display region 1011, a reservation operation guidance region 1012, and a getting-on place decision button 1013.

A map image of the periphery of a taxi departure place in the route candidate displayed on the application screen 1000 is displayed in the map image display region 1011.

The reservation operation guidance region 1012 is disposed to be superimposed on a lower end part of the map image display region 1011. Text information regarding operation guidance to prompt the user to decide a taxi getting-on place on the map image in the map image display region 1011 is displayed in the reservation operation guidance region 1012.

The getting-on place decision button 1013 is disposed on a right end part of the reservation operation guidance region 1012, not superimposed on the text information regarding the operation guidance, and is used for the user to decide (fix) a getting-on place.

The user designates a desired taxi getting-on place on the map image and also performs an operation of designating and deciding the getting-on place decision button 1013 by using the input device 17 of the portable terminal 10, can thus fix the getting-on place so as to transmit, for example, a taxi reservation request corresponding to the taxi departure time defined in the route candidate from the portable terminal 10 to the center server 20.

As mentioned above, for example, the user does not need to make a reservation to a taxi company by starting a browser or a dedicated application on the portable terminal 10, and can complete a taxi reservation on the application screens 1000, 1010 related to display of a route candidate in a multimodal route retrieval result. Therefore, it is possible to improve the user's convenience.

With respect to ride sharing, a rental car, car sharing, and cycle sharing as target moving means, in the same aspect as that in the case of a taxi, a usage reservation may be performed in response to an operation on an application screen related to display of a route candidate in a multimodal route retrieval result.

Parking Lot Information Viewing Method

Next, with reference to FIGS. 11A and 11B, a description will be made of a parking lot information viewing method based on a user's operation on an application screen of the route retrieval application.

Figure 11A:
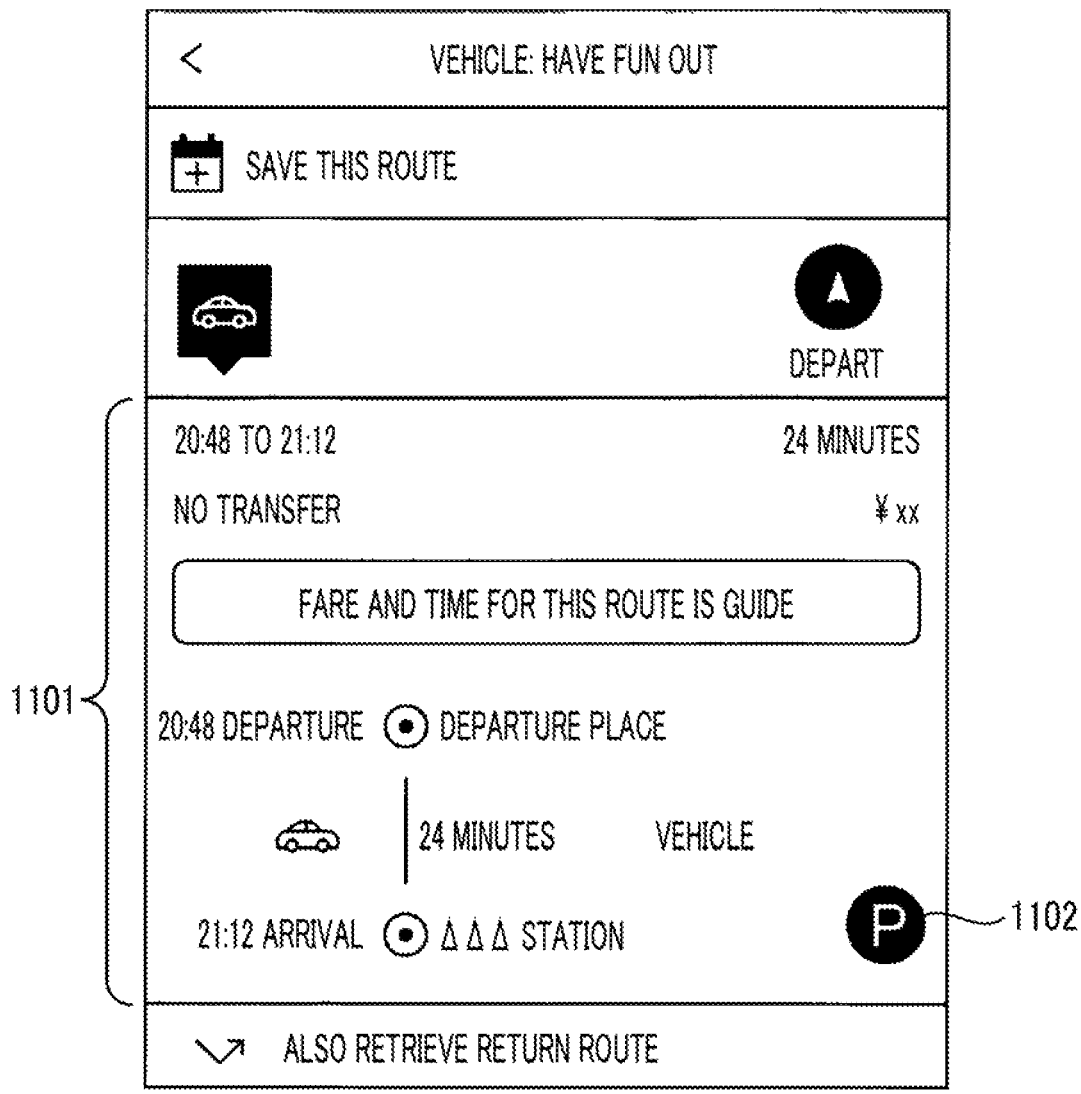
FIG. 11A is a diagram for describing an example of a method of viewing parking lot information based on a multimodal route retrieval result.
Figure 11B:
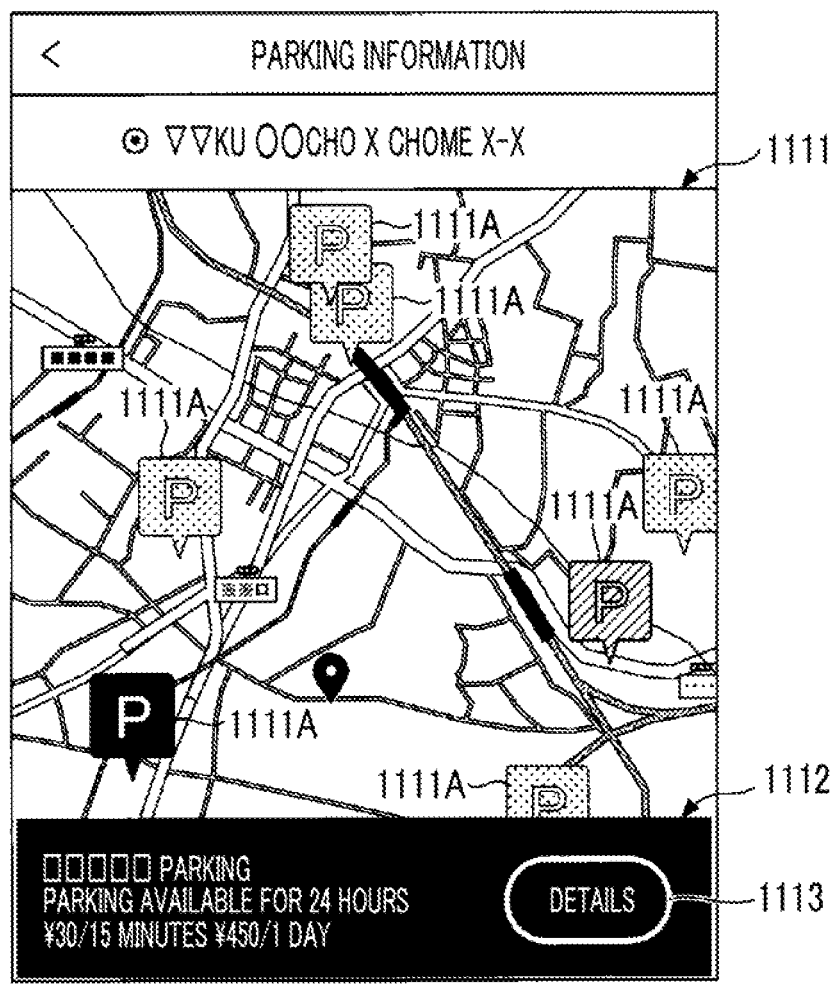
FIG. 11B is a diagram for describing an example of a method of viewing parking lot information based on a multimodal route retrieval result.

FIGS. 11A and 11B are diagrams for describing an example of a parking lot information viewing method based on a multimodal route retrieval result. Specifically, FIG. 11A is a diagram illustrating an example (application screen 1100) of an application screen displaying a detailed content of a single route candidate using an automobile among a plurality of route candidates in a multimodal route retrieval result. FIG. 11B is a diagram illustrating an example (application screen 1110) of an application screen displaying parking lot information.

A route candidate using a combination of an automobile and other target moving means may be displayed in the application screen 1100.

As illustrated in FIG. 11A, the application screen 1100 includes a route candidate detail display region 1101 in the same manner as the case of the application screen 810 in FIG. 8B.

A detailed content of a route candidate including an automobile usage portion is displayed in the route candidate detail display region 1101, and a parking lot information viewing button 1102 is disposed in the automobile usage portion. A user performs an operation of designating and deciding the parking lot information viewing button 1102, and can thus cause a display content on the display device 16 of the portable terminal 10 to transition from the application screen 1100 to the application screen 1110 for viewing parking lot information.

As illustrated in FIG. 11B, the application screen 1110 includes a map image display region 1111, a parking lot summary information display region 1112, and a detail display button 1113.

In the map image display region 1111, a map image of the periphery of an automobile arrival place in the route candidate displayed on the application screen 1100 is displayed, and mark images 1111A indicating positions of parking lots are displayed to be superimposed on the map image.

The parking lot summary information display region 1112 is disposed to be superimposed on a lower end part of the map image display region 1111. A single piece of parking lot summary information (for example, a facility name of a parking lot, an available time period, the maximum parking capacity, and a parking fare) of a single parking lot selected from among the parking lots indicated by the mark images 1111A is displayed in the parking lot summary information display region 1112.

The user performs an operation of designating (selecting) and deciding a single mark image 1111A on the map image by using the input device 17 of the portable terminal 10, and can thus display parking lot summary information corresponding to the selected mark image 1111A in the parking lot summary information display region 1112.

The detail display button 1113 is used to display detail information of the parking lot of which the summary information is displayed in the parking lot summary information display region 1112, on the display device 16 of the portable terminal 10. Consequently, the user performs an operation of designating and deciding the detail display button 1113, and can thus view the detail information of the parking lot.

As mentioned above, for example, the user does not need to access parking lot information for himself/herself by starting a browser or a dedicated application on the portable terminal 10, and can view the parking lot information through an operation on the application screens 1100, 1110 related to display of a route candidate using an automobile in a multimodal route retrieval result. Therefore, it is possible to improve the user's convenience.

The parking lot information viewing button 1102 may also be displayed in a rental car or car sharing usage portion on an application screen displaying a detailed content of a route candidate using a rental car or car sharing. Consequently, the user can view parking lot information through an operation on an application screen related to display of a route candidate using the rental car or the car sharing in a multimodal route retrieval result. Therefore, it is possible to improve the user's convenience.

Cycle Sharing Usage Method

Next, with reference to FIGS. 12A and 12B, a description will be made of a cycle sharing usage method based on a user's operation on an application screen of the route retrieval application.

Figure 12A:
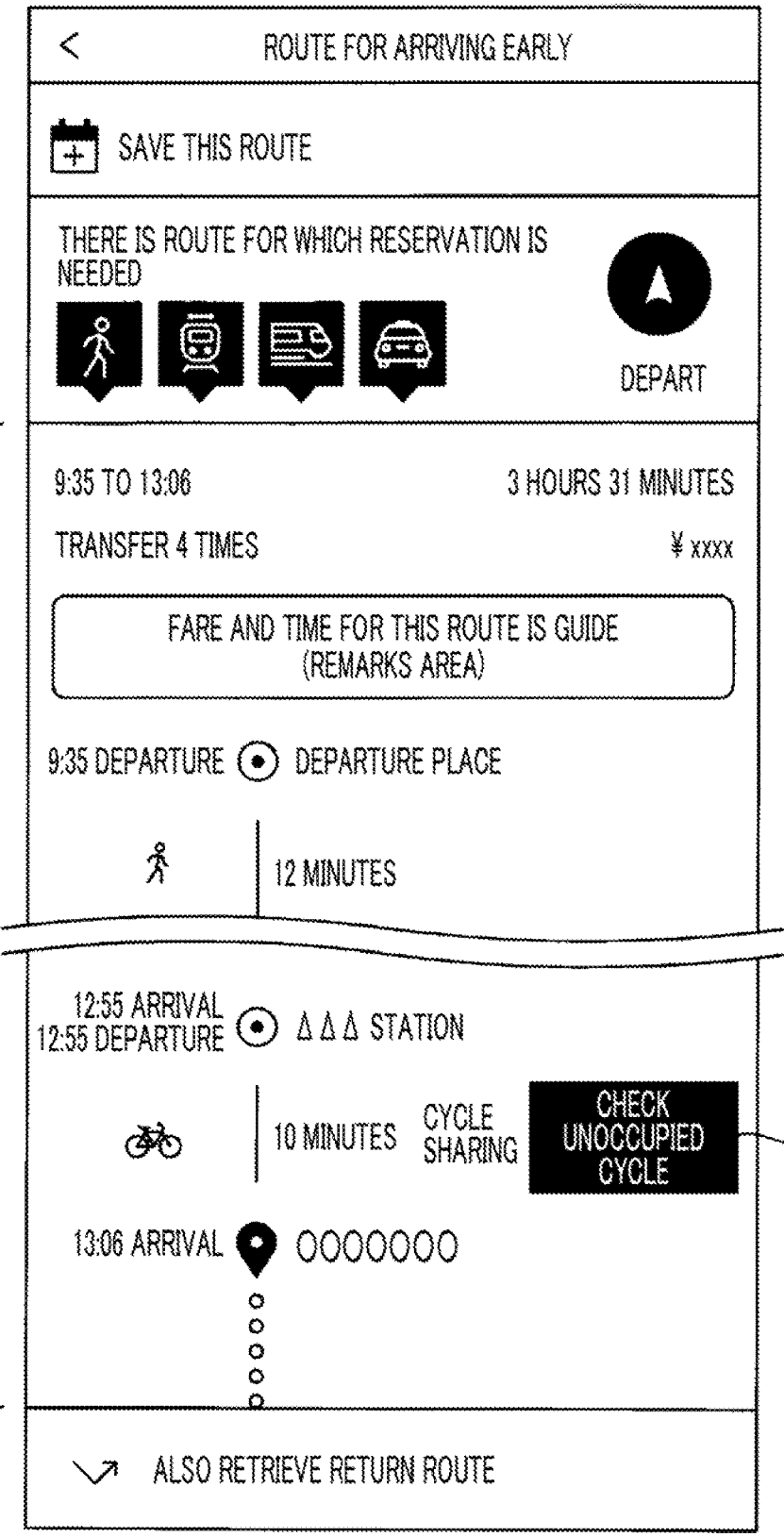
FIG. 12A is a diagram for describing an example of a method of using cycle sharing based on a multimodal route retrieval result.
Figure 12B:
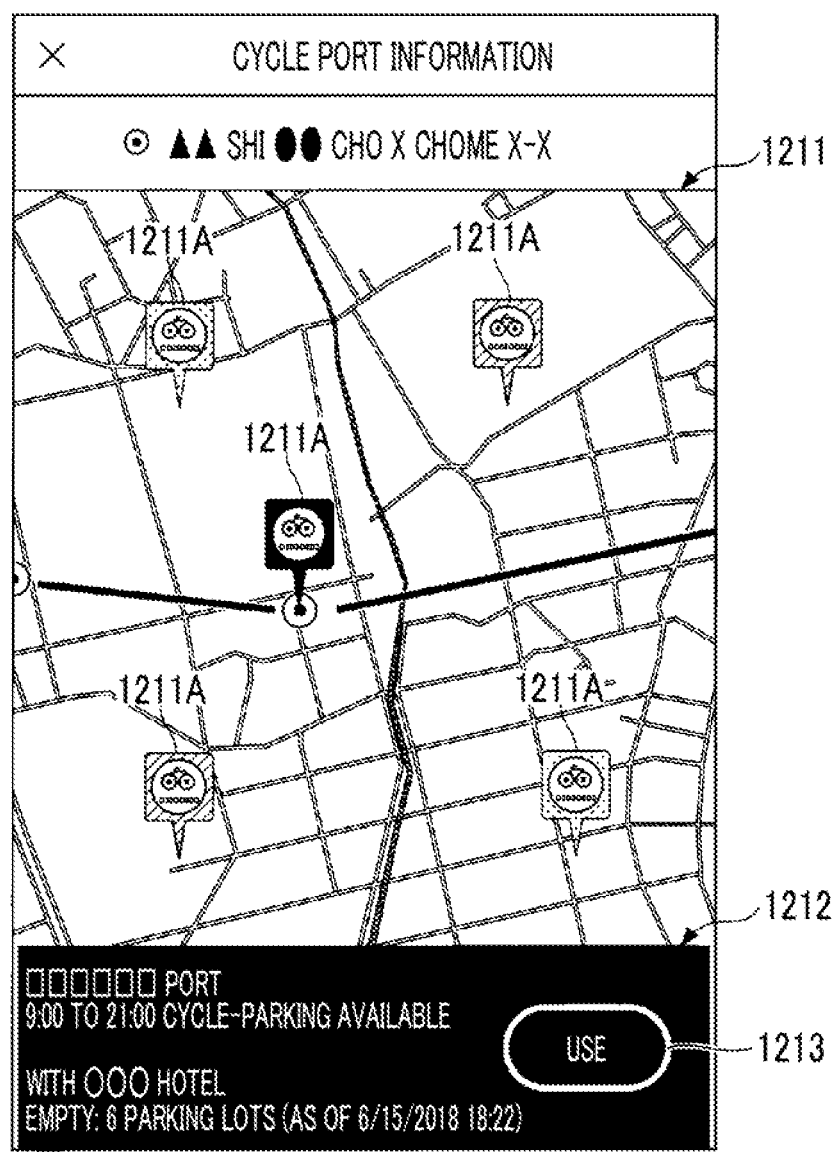
FIG. 12B is a diagram for describing an example of a method of using cycle sharing based on a multimodal route retrieval result.

FIGS. 12A and 12B are diagrams for describing an example of a cycle sharing usage method based on a multimodal route retrieval result. Specifically, FIG. 12A is a diagram illustrating an example (application screen 1200) of an application screen displaying a detailed content of a single route candidate using cycle sharing among a plurality of route candidates in a multimodal route retrieval result. FIG. 12B is a diagram illustrating an example (application screen 1210) of an application screen for a user using cycle sharing.

As illustrated in FIG. 12A, the application screen 1200 includes a route candidate detail display region 1201 in the same manner as the case of the application screen 810 in FIG. 8B.

A detailed content of a route candidate including a cycle sharing usage portion is displayed in the route candidate detail display region 1201, and an unoccupied cycle check button 1202 is disposed in the cycle sharing usage portion. A user performs an operation of designating and deciding the unoccupied cycle check button 1202, and can thus cause a display content on the display device 16 of the portable terminal 10 to transition from the application screen 1200 to the application screen 1210 for checking information (hereinafter, referred to as "unoccupied cycle information") regarding an unoccupied cycle status in a cycle port for the cycle sharing.

As illustrated in FIG. 12B, the application screen 1210 includes a map image display region 1211, a cycle port information display region 1212, and a usage button 1213.

In the map image display region 1211, a map image of the periphery of a cycle sharing departure place in the route candidate displayed on the application screen 1200 is displayed, and mark images 1211A indicating positions of cycle ports are displayed to be superimposed on the map image.

The cycle port information display region 1212 is disposed to be superimposed on a lower end part of the map image display region 1211. Information (hereinafter, referred to as "cycle port information") (for example, the name of a cycle port, an available time period, the nearest facility, and unoccupied cycle information such as the number of unoccupied cycles) of a single cycle port selected from among the cycle ports indicated by the mark images 1211A is displayed in the cycle port information display region 1212.

The user performs an operation of designating (selecting) and deciding a single mark image 1211A on the map image by using the input device 17 of the portable terminal 10, and can thus display cycle port information corresponding to the selected mark image 1211A in the cycle port information display region 1212.

The usage button 1213 is used to actually use a shared cycle in the cycle port of which the cycle port information is displayed in the cycle port information display region 1212. Specifically, in a case where the user performs an operation of designating and deciding the usage button 1213, the portable terminal 10 starts an application (hereinafter, referred to as "cycle sharing application") for using cycle sharing, installed in the auxiliary storage device 12 or starts a browser, and also accesses a home page for the cycle sharing. The portable terminal 10 takes over information regarding a cycle port desired to be used by the user to the cycle sharing application or the like. Consequently, the user can use the cycle sharing through an operation on the cycle sharing application or the home page for the cycle sharing.

As mentioned above, for example, the user does not need to access information regarding cycle sharing for himself/herself by starting a browser or a dedicated application on the portable terminal 10. Therefore, the multimodal route providing system 1 (the route retrieval application of the portable terminal 10) can support the user's usage of cycle sharing in response to an operation on the application screens 1200, 1210 related to display of a route using the cycle sharing in a multimodal route retrieval result.

In the same manner as in the case of cycle sharing, with respect to a taxi, ride sharing, a rental car, and car sharing, the multimodal route providing system 1 (the route retrieval application of the portable terminal 10) may support usage thereof in response to operations on application screens related to display of a route candidate in a multimodal route retrieval result.

Method of Viewing Public Bus Position Information and Method of Purchasing and Using Public Bus Ticket Next, with reference to FIGS. 13A and 13B, a description will be made of a method of viewing public bus position information and a method of purchasing and using a public bus ticket based on a user's operation on an application screen of the route retrieval application.

Figure 13A:
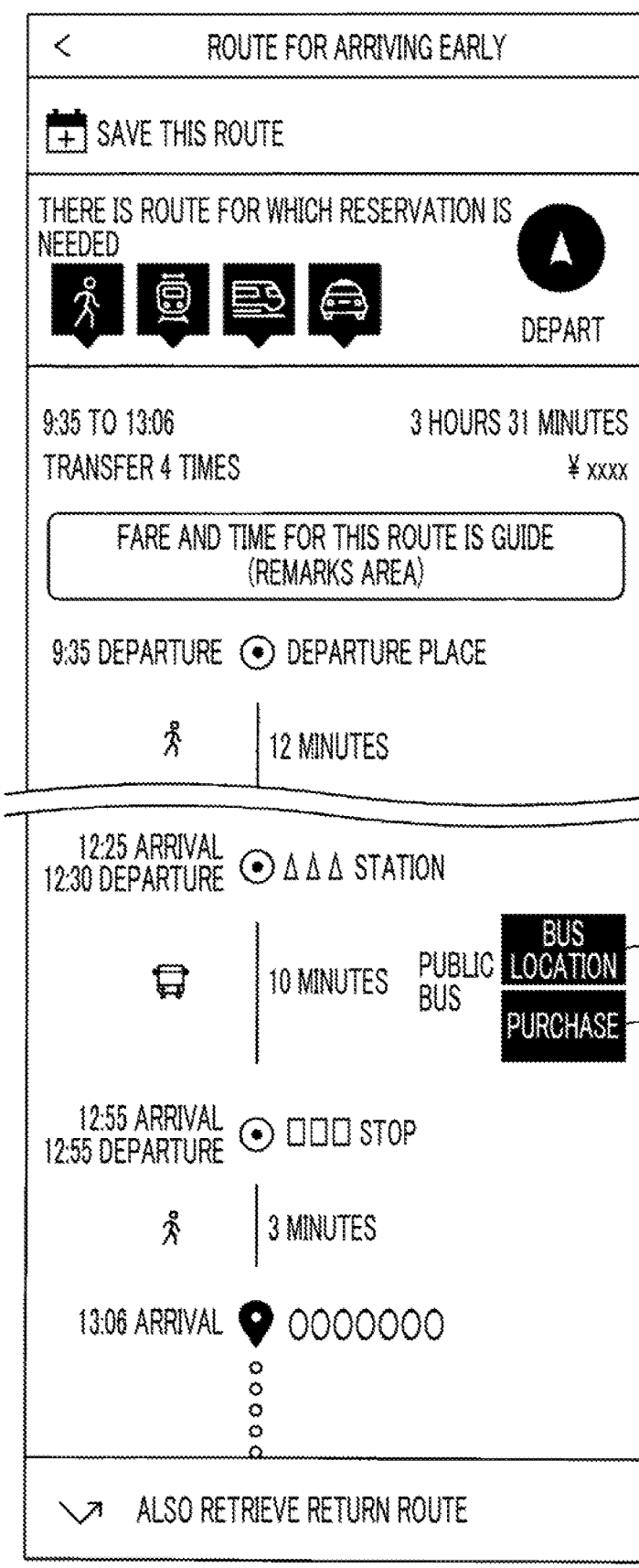
FIG. 13A is a diagram for describing an example of each of a method of viewing public bus position information and a method of purchasing and using a public bus ticket based on a multimodal route retrieval result.
Figure 13B:
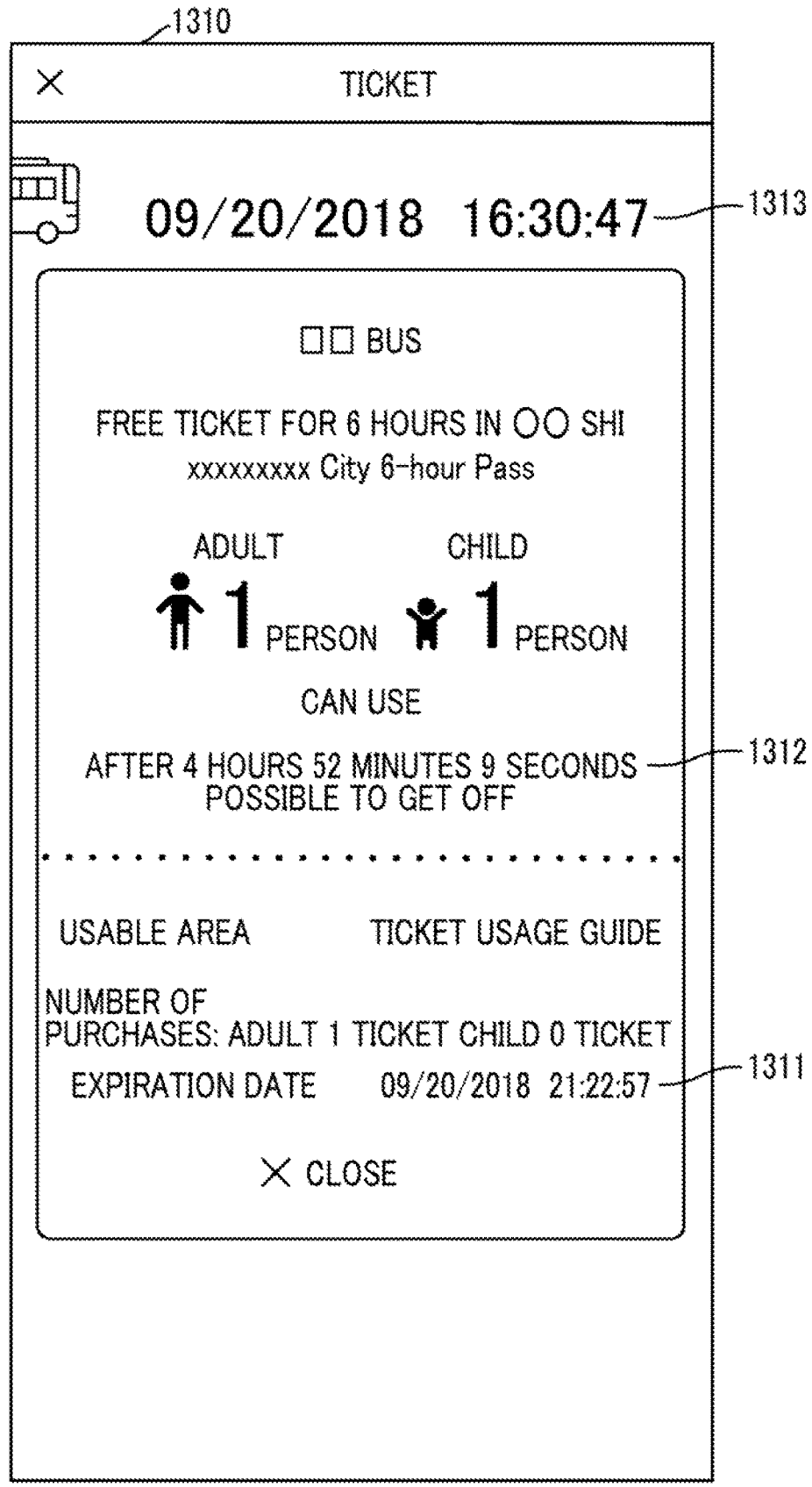
FIG. 13B is a diagram for describing an example of each of a method of viewing public bus position information and a method of purchasing and using a public bus ticket based on a multimodal route retrieval result.

FIGS. 13A and 13B are diagrams for describing an example of a method of viewing public bus position information and a method of purchasing and using a public bus ticket based on a multimodal route retrieval result. Specifically, FIG. 13A is a diagram illustrating an example (application screen 1300) of an application screen displaying a detailed content of a single route candidate using a public bus among a plurality of route candidates in a multimodal route retrieval result. FIG. 13B is a diagram illustrating an example (public bus six-hour free ticket image information 1310) of public bus ticket information displayed on the display device 16 of the portable terminal 10.

As illustrated in FIG. 13A, the application screen 1300 includes a route candidate detail display region 1301 in the same manner as the case of the application screen 810 in FIG. 8B.

A detailed content of a route candidate including a public bus usage portion is displayed in the route candidate detail display region 1301, and a public bus position information viewing button 1302 and a public bus ticket purchase button 1303 are disposed in the public bus usage portion.

A user performs an operation of designating and deciding the public bus position information viewing button 1302, and can thus cause a display content on the display device 16 of the portable terminal 10 to transition from the application screen 1300 to an application screen (public bus position information screen) displaying position information of a public bus used in a route candidate.

The public bus position information screen displays, for example, a map image in a range of a route of a public bus used in the route candidate displayed on the application screen 1300. A line route corresponding to a line, getting-on stops for the public bus on the route candidate, and the current position information and expected position information of the public bus may be displayed to be superimposed on the map image. Information (for example, "operated as expected" or "delayed by XX minutes more than expected") regarding a delay status of the public bus may be displayed to be superimposed on the map image in an aspect of being correlated with the current position information of the public bus. Consequently, for example, the user does not need to access public bus position information for himself/herself by starting a browser on the portable terminal 10, and can view the public bus position information through an operation on the application screen 1300 related to display of a route candidate using a public bus in a multimodal route retrieval result. The user checks the current position information, expected position information, and information regarding a delay status of a public bus, can thus understand whether a public bus arrives or is delayed according to the departure time presented in a route candidate, and can use this for determination such as selection of the route candidate.

The user performs an operation of designating and deciding the public bus ticket purchase button 1303, and can thus cause a display content on the display device 16 of the portable terminal 10 to transition from the application screen 1300 to an application screen (public bus ticket purchase screen) for purchasing a predetermined ticket for a public bus, for example, a public bus 6-hour free ticket. The public bus six-hour free ticket is, for example, a specific time-limited ticket that allows the route bus to be freely used for six hours in a predetermined geographical range (for example, within a specific municipality). Consequently, the user performs a predetermined operation on the public bus ticket purchase screen by using the input device 17 of the portable terminal 10, and can thus purchase a six-hour free ticket by transmitting a bus ticket purchase request from the portable terminal 10 to the center server 20. The user displays, on the display device 16 of the portable terminal 10, public bus ticket information (public bus six-hour free ticket image information 1310) corresponding to the six-hour free ticket that is delivered from the center server 20 to the portable terminal 10 and is stored into the public bus ticket information storage unit 105 in response to an predetermined operation on a predetermined application screen of the route retrieval application, and can thus use the public bus by showing the public bus ticket information to a crew of the public bus.

As illustrated in FIG. 13B, validity period information 1311, remaining time information 1312, and current time information 1313 are displayed to be superimposed on the public bus six-hour free ticket image information 1310 displayed on the display device 16.

The validity period information 1311 represents a validity period of the public bus six-hour free ticket as a specific time-limit ticket.

The remaining time information 1312 represents a remaining time until the validity period (expiration date) of the six-hour free ticket. The remaining time information 1312 is dynamically displayed in a countdown form, and switches to information indicating the expiration date when the expiration date comes. Consequently, a time left until the expiration date is dynamically displayed on the application screen displayed on the display device 16 of the portable terminal 10 in addition to public bus ticket information, and thus illegal use of the public bus ticket information corresponding to a specific time-limit ticket can be suppressed by capturing an image of the application screen.

The current time information 1313 represents the current time, and is dynamically displayed in a count-up form. Consequently, the current time is dynamically displayed on the application screen displayed on the display device 16 of the portable terminal 10 in addition to the public bus ticket information, and thus illegal use of the public bus ticket information corresponding to a specific time-limit ticket can be suppressed by capturing an image of the application screen.

As mentioned above, the user can purchase and use a predetermined ticket (for example, a six-hour free ticket) for a public bus on the portable terminal 10 according to the route retrieval application. Therefore, it is possible to improve the user's convenience.

The portable terminal 10 may perform a process regarding purchase of a predetermined ticket for a public bus or a process of displaying public bus ticket information on the display device 16, in response to a user's operation on others than an application screen of the route retrieval application.

For example, the portable terminal 10 starts an application (hereinafter, referred to as a "public bus application") provided from the public bus-related server 30, and transmits a bus ticket purchase request to the public bus-related server 30 in response to a predetermined operation on a predetermined application screen of the public bus application. The portable terminal 10 may display public bus ticket information delivered from the public bus-related server 30 on the display device 16 in response to a predetermined on a predetermined application screen of the public bus application. For example, in response to a user's predetermined operation on a home page (hereinafter, referred to as a "public bus page") regarding public buses operated by the public bus-related server 30 and accessed via a browser, the portable terminal 10 performs a process regarding purchase of a predetermined ticket for a public bus on the public bus page. The portable terminal 10 may display public bus ticket information transmitted as a web resource from the public bus-related server 30 on the browser in response to a predetermined operation on the public bus page accessed via the browser. In this case, the user may access the public bus page via the browser installed in the portable terminal 10, and may purchase a predetermined ticket for a public bus via the browser of the portable terminal 10 or display public bus ticket information corresponding to the purchased ticket on the browser under the control of the public bus-related server 30. The portable terminal 10 may realize a user's purchase and use of a ticket in the same manner as in the case of a public bus with respect to a predetermined transportation (a public transportation such as an electric train, an express bus, a ship, or an airplane) of which an operation plan including an operation route and an operation time is defined in advance.

Public Bus Ticket Information Display Process

Next, with reference to FIGS. 14A and 14B, a description will be made of a process (hereinafter, referred to as a "public bus ticket information display process") regarding display of public bus ticket information corresponding to a specific time-limit ticket on the display device 16 of the portable terminal 10, performed by the portable terminal 10 (public bus ticket usage support processing unit 104).

Figure 14A:
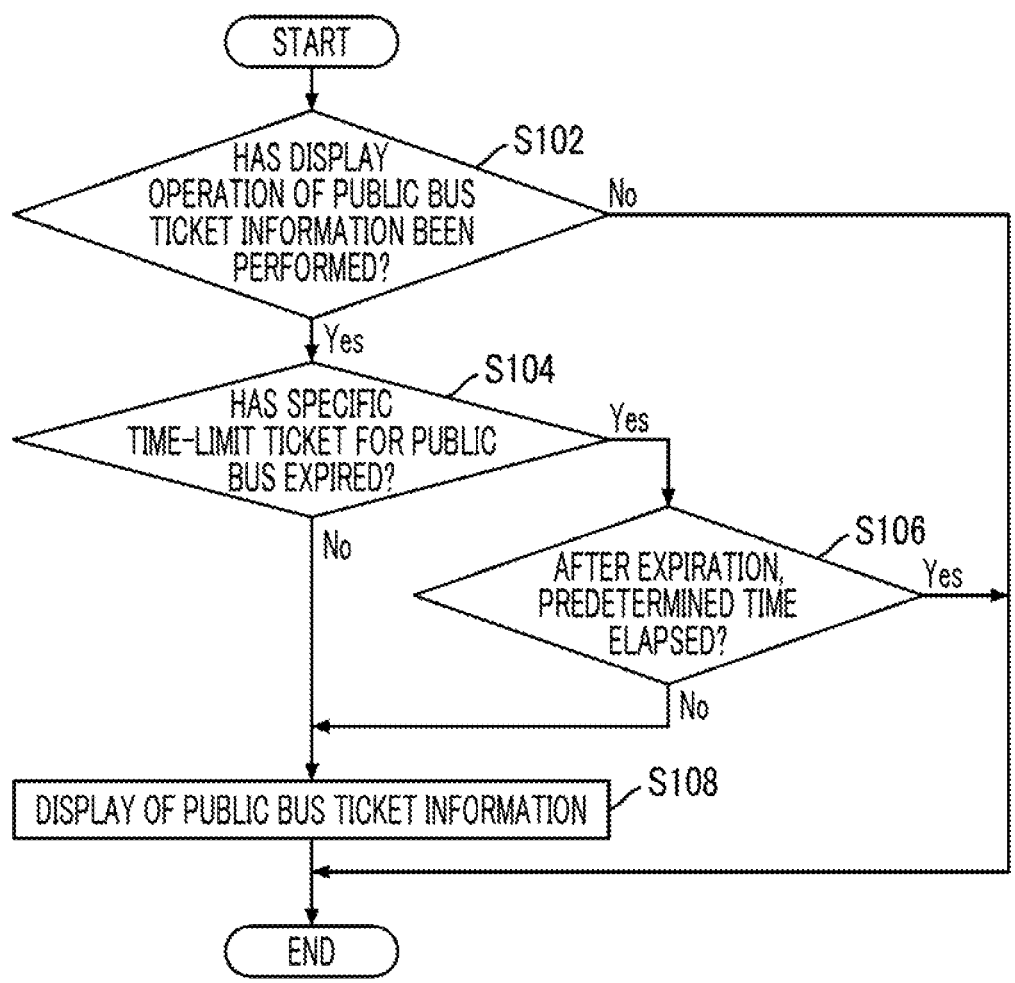
FIG. 14A is a flowchart schematically illustrating an example of a public bus ticket information display process performed by the portable terminal (public bus ticket usage support processing unit)

FIGS. 14A and 14B are flowcharts schematically illustrating an example of a public bus ticket information display process performed by the portable terminal 10 (public bus ticket usage support processing unit 104). The flowchart of FIG. 14A is executed every predetermined control cycle, for example, in a state in which the route retrieval application of the portable terminal 10 is started, and specific time-limit ticket information (for example, the public bus six-hour free ticket image information 1310 in FIG. 13B) for a public bus is not displayed. The flowchart of the FIG. 14B is executed every predetermined control cycle, for example, in a state in which the route retrieval application of the portable terminal 10 is started, and the specific time-limit ticket information for a public bus is not displayed.

First, as illustrated in FIG. 14A, in step S102, the public bus ticket usage support processing unit 104 determines whether or not an operation for displaying public bus ticket information corresponding to a specific time-limit ticket for a public bus has been performed by using the input device 17. The public bus ticket usage support processing unit 104 proceeds to step S104 in a case where the operation has been performed, and finishes the present process in a case where the operation has not been performed.

In step S104, the public bus ticket usage support processing unit 104 determines whether or not the specific time-limit ticket for a public bus has expired. The public bus ticket usage support processing unit 104 proceeds to step S106 in a case where the specific time-limit ticket for a public bus has expired, and proceeds to step S108 in a case where the specific time-limit ticket for a public bus has not expired.

In step S106, the public bus ticket usage support processing unit 104 determines whether or not predetermined time T1 has elapsed from the expiration of the specific time-limit ticket for a public bus. The public bus ticket usage support processing unit 104 proceeds to step S108 in a case where predetermined time T1 has not elapsed from the expiration of the specific time-limit ticket for a public bus, and finishes the present process in a case where predetermined time T1 has elapsed.

In step S108, the public bus ticket usage support processing unit 104 displays public bus ticket information corresponding to the specific time-limit ticket on the display device 16, and finishes the present process.

Next, as illustrated in FIG. 14B, in step S202, the public bus ticket usage support processing unit 104 determines whether or not the public bus ticket information corresponding to the specific time-limit ticket is being displayed on the display device 16. The public bus ticket usage support processing unit 104 proceeds to step S204 in a case where the public bus ticket information corresponding to the specific time-limit ticket is being displayed on the display device 16, and finishes the present process in a case where the public bus ticket information is not being displayed.

In step S204, the public bus ticket usage support processing unit 104 determines whether or not an operation for finishing the display of the public bus ticket information has been performed by using the input device 17. The public bus ticket usage support processing unit 104 proceeds to step S206 in a case where the operation has not been performed, and proceeds to step S210 in a case where the operation has been performed.

In step S206, the public bus ticket usage support processing unit 104 determines whether or not the specific time-limit ticket for a public bus has expired. The public bus ticket usage support processing unit 104 proceeds to step S208 in a case where the specific time-limit ticket for a public bus has expired, and finishes the present process in a case where the specific time-limit ticket for a public bus has not expired.

In step S208, the public bus ticket usage support processing unit 104 determines whether or not predetermined time T1 has elapsed from the expiration of the specific time-limit ticket for a public bus. The public bus ticket usage support processing unit 104 proceeds to step S210 in a case where T1 has elapsed from the expiration of the specific time-limit ticket for a public bus, and finishes the present process in a case where predetermined time T1 has not elapsed.

In step S210, the public bus ticket usage support processing unit 104 stops (finishes) the display of the public bus ticket information corresponding to the specific time-limit ticket for a public bus on the display device 16, and finishes the present process.

As mentioned above, in the present example, the public bus ticket usage support processing unit 104 permits the public bus ticket information corresponding to the specific time-limit ticket for a public bus to be displayed on the display device 16 until predetermined time T1 elapses, and prohibits the public bus ticket information from being displayed on the display device 16 after predetermined time T1 elapses.

Specifically, in a case where predetermined time T1 does not elapse from expiration of the specific time-limit ticket, the public bus ticket usage support processing unit 104 displays the public bus ticket information corresponding to the specific time-limit ticket on the display device 16 in response to a user's predetermined operation, and continuously displays the public bus ticket information displayed on the display device 16. On the other hand, in a case where predetermined time T1 has elapsed from expiration of the specific time-limit ticket, the public bus ticket usage support processing unit 104 does not display the public bus ticket information on the display device 16 even though there is a user's predetermined operation, and stops to display the public bus ticket information displayed on the display device 16.

Consequently, the portable terminal 10 can give a grace period before corresponding public bus ticket information cannot be displayed on the display device 16 after expiration of a specific time-limit ticket assuming that the public bus ticket information cannot be displayed after expiration of the specific time-limit ticket. Thus, for example, even in a case where a specific time-limit ticket has expired due to delayed arrival at a public bus destination stop, a user can verify a purchaser of the specific time-limit ticket, and can thus negotiate getting-off with no additional fare due to the delay. Therefore, the portable terminal 10 can improve a user's convenience during use of a time-limit ticket while suppressing illegal use of a specific time-limit ticket issued to the portable terminal 10 of the user.

Predetermined time T1 may be a predefined constant time such as 30 minutes.

Predetermined time T1 may be varied depending on, for example, an actual operation status of a public bus on which a user is actually riding, or a predicted operation status. Specifically, predetermined time T1 may be defined to be increased as an actual delay time of a public bus for an operation plan or a predicted delay time is increased in a case where a user is riding on the public bus at an expiration timing of a specific time-limit ticket.

Consequently, the portable terminal 10 can give a grace period before ticket information cannot be displayed on the display device 16 after expiration of a specific time-limit ticket in accordance with an actual delay status or a predicted delay status of a vehicle (certain public bus) on which a user is actually riding. Therefore, the portable terminal 10 can more appropriately realize both of suppression of illegal use of a time-limit ticket and improvement of a user's convenience during use of the time-limit ticket.

In this case, the portable terminal 10 may access the public bus-related server 30 directly or via the center server 20, and may acquire information regarding a delay status of a public bus or public bus position information. The portable terminal 10 compares position measurement history information in the GNSS device mounted thereon with the current position information of the public bus, so as to specify the public bus on which a user is riding, and can thus recognize a delay status of the public bus on which the user is actually riding. The portable terminal 10 may specify a public bus on which a user is riding based on a single route candidate (for example, a route candidate for which route guidance is executed, or a route candidate of which a detailed content is repeatedly displayed by the user) selected by the user among a plurality of route candidates in a multimodal route retrieval. Pairing may be performed between communication apparatuses mounted on both of the portable terminal 10 and a public bus through predetermined short-range communication (for example, WiFi (registered trademark) or Bluetooth (registered trademark)), and pairing information may be transmitted to the portable terminal 10 via the public bus-related server 30 such that the portable terminal 10 specifies a public bus on which a user is riding. The portable terminal 10 may predict a delay time based on history information regarding the past operation status of a public bus, acquired from the public bus-related server 30.

As described above, the public bus ticket usage support processing unit 104 displays may display a remaining time until the expiration date of a specific time-limit ticket with a countdown form in a case where the specific time-limit ticket has not expired along with corresponding public bus ticket information on the display device 16, and may display information indicating that the specific time-limit ticket has expired along with the corresponding public bus ticket information instead of the remaining time with the countdown form in a case where the specific time-limit ticket has expired.

Consequently, the remaining time until the expiration date is dynamically displayed in addition to the public bus ticket information on a screen of the portable terminal 10, and thus a predetermined person such as a crew of the public bus can easily understand whether or not the public bus ticket information corresponds to an expired time-limit ticket. Therefore, for example, it is possible to prevent illegal use such as getting off a public bus by showing the screen of the portable terminal 10 on which expired ticket information is displayed to a crew despite the public bus not being delayed.

In addition to a public bus, with respect to a predetermined transportation (a public transportation such as an electric train, an express bus, a ship, or an airplane) of which an operation plan including an operation route and an operation time is defined in advance, in a case where a similar specific time-limit ticket is issued (delivered) to the portable terminal 10, a process regarding display of ticket information corresponding to the specific time-limit ticket may be performed in the same form as in the case of a public bus. Consequently, the same effect as in the case of a public bus can also be achieved in a case of a predetermined transportation other than the public bus. For example, a display content of public bus ticket information on an application screen of the public bus application or the public bus page of the browser in the portable terminal 10 may be controlled by the center server 20. Thus, in this case, the public bus ticket information display process may be executed by the center server 20 side.

Macro Data Generation Method

Next, with reference to FIGS. 15A, 15B, and 16A to 16D, a description will be made of a macro data generation method based on history data of a multimodal route retrieval result.

First, FIGS. 15A and 15B are diagrams illustrating an example history data of multimodal route retrieval results accumulated in the route retrieval result history storage unit 207, that is, a record group of the past multimodal route retrieval results.

As illustrated in FIGS. 15A and 15B, each record of multimodal route retrieval results includes data corresponding to a route retrieval request, such as, a user ID, a departure place, a transit place, a destination, whether or not the route retrieval request is a route retrieval request using event information or spot information based on event/spot retrieval (in FIG. 15A, "event spot information use"), information regarding an output (proposed) route candidate, information regarding a selected route candidate (hereinafter, referred to as a "selected route"), and information regarding the presence or absence of usage/precheck.

The information regarding an output route candidate indicates whether or not a route candidate using each piece of target moving means is included in route candidates that are output as a multimodal route retrieval result.

The information regarding an output route candidate includes information (in FIG. 15A, "convenience high") indicating whether or not a route candidate in which convenience of using each piece of target moving means is relatively high is included, and information (in FIG. 15A, "no convenience condition") regarding whether or not a route candidate using each piece of target moving means is included regardless of a convenience condition.

Conditions for determining whether or not convenience is relatively high may include, for example, that a transfer waiting time is relatively short (specifically, shorter than the minimum physical quantity causing a predetermined reaction), a walking usage time is relatively short (specifically, shorter than the minimum physical quantity causing a predetermined reaction), and a needed fare is relatively low (specifically, shorter than the minimum physical quantity causing a predetermined reaction).

The information regarding a selected route indicates whether or not each piece of target moving means is used in a single route candidate selected from among route candidates.

A route candidate selected by a user from a plurality of route candidates in a multimodal route retrieval result may be, for example, a route candidate of which the route guidance is executed, or a route candidate in which the number of times of display or a display time of detail information is equal to or more than the minimum physical quantity causing a predetermined reaction among a plurality of route candidates in a multimodal route retrieval result.

The information regarding usage/precheck indicates the presence or absence of usage of various support services (for example, viewing of the public bus position information, purchase of a predetermined ticket for a public bus, a taxi reservation, support of usage of cycle sharing, and viewing of parking lot information) based on a multimodal route retrieval result.

The macro data generation unit 206 generates macro data based on a corresponding record group in the route retrieval result history storage unit 207.

Figure 16A:
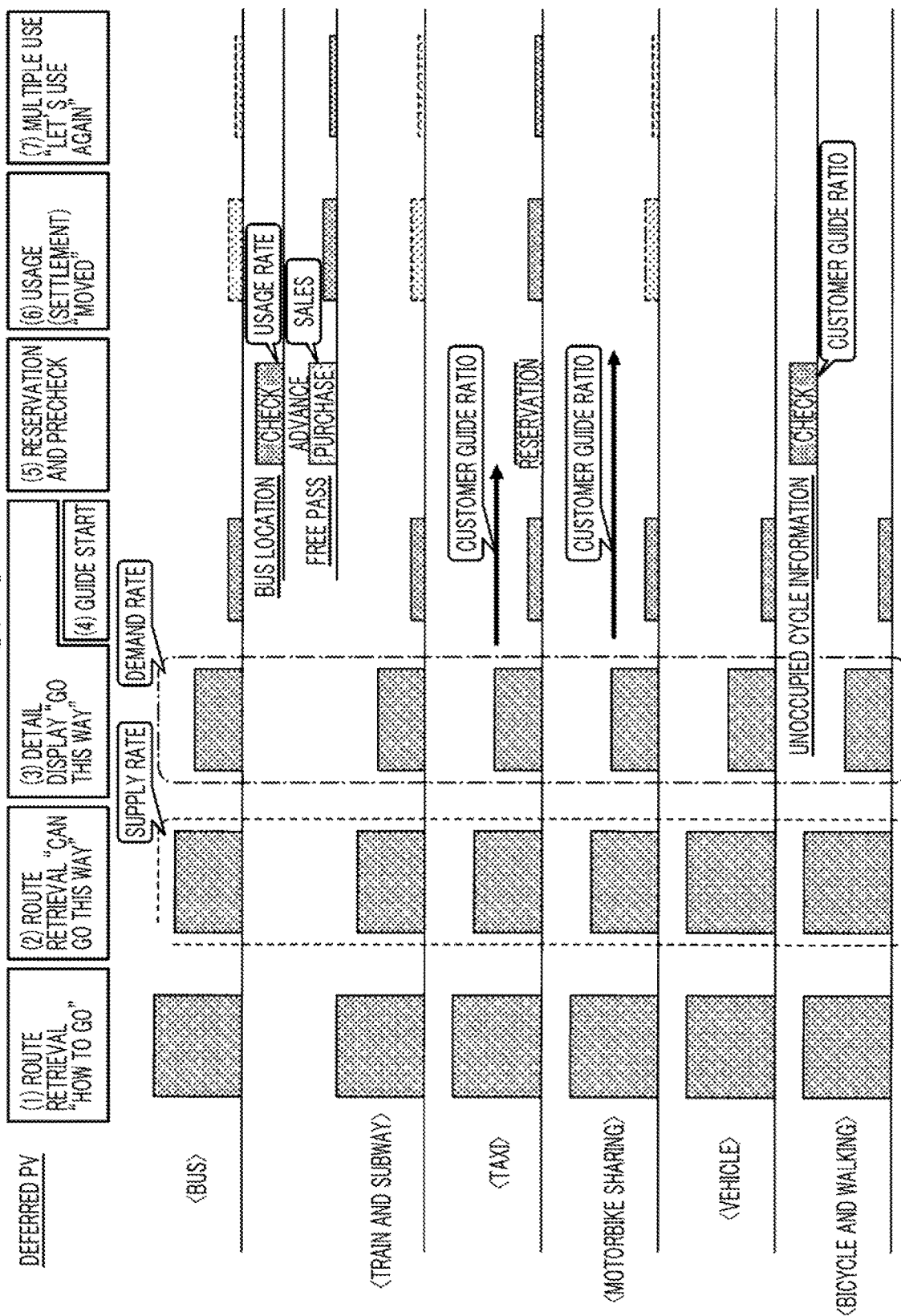
FIG. 16A is a diagram for describing a macro data generation method.
Figure 16B:
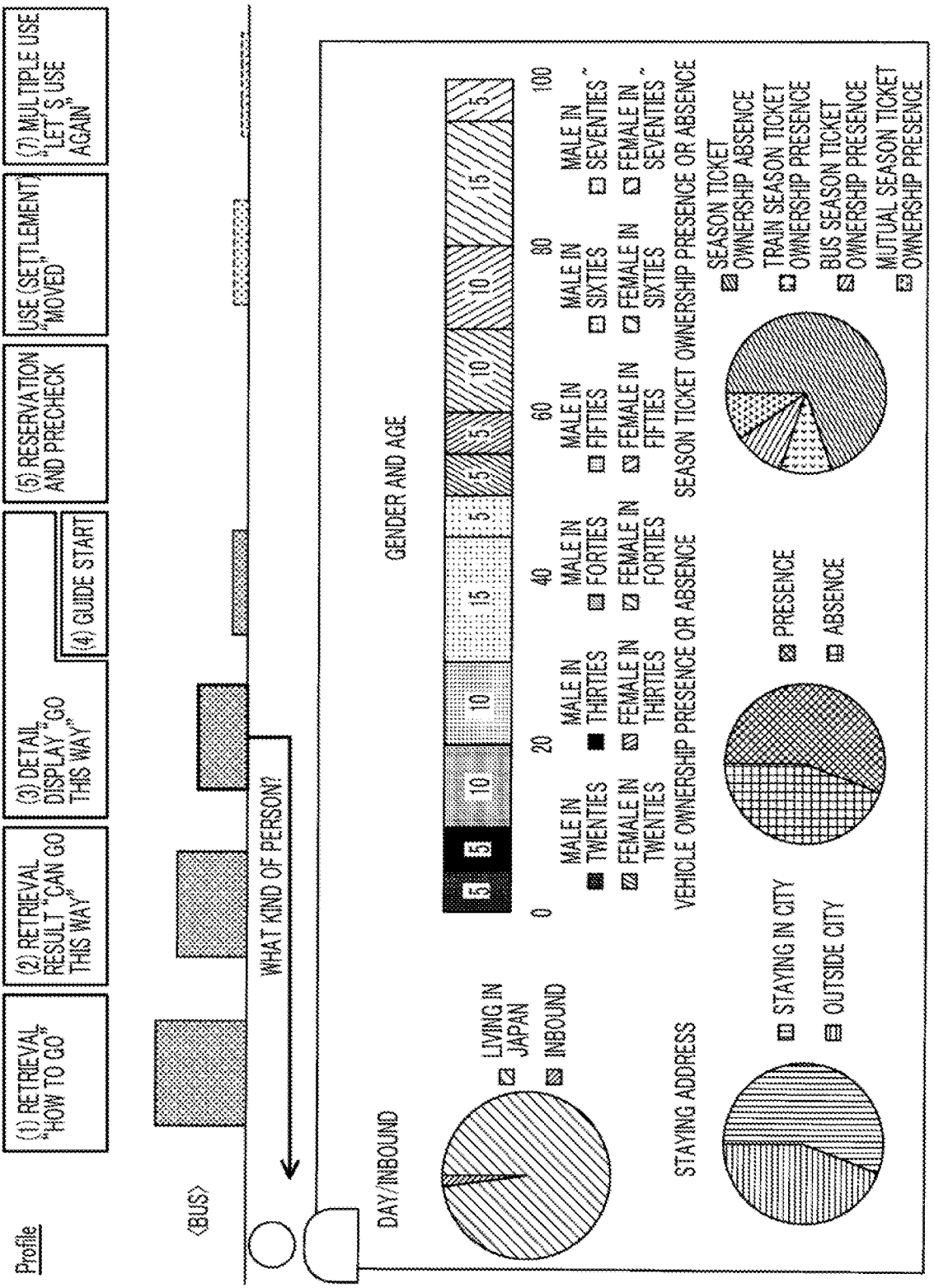
FIG. 16B is a diagram for describing the macro data generation method.
Figure 16C:
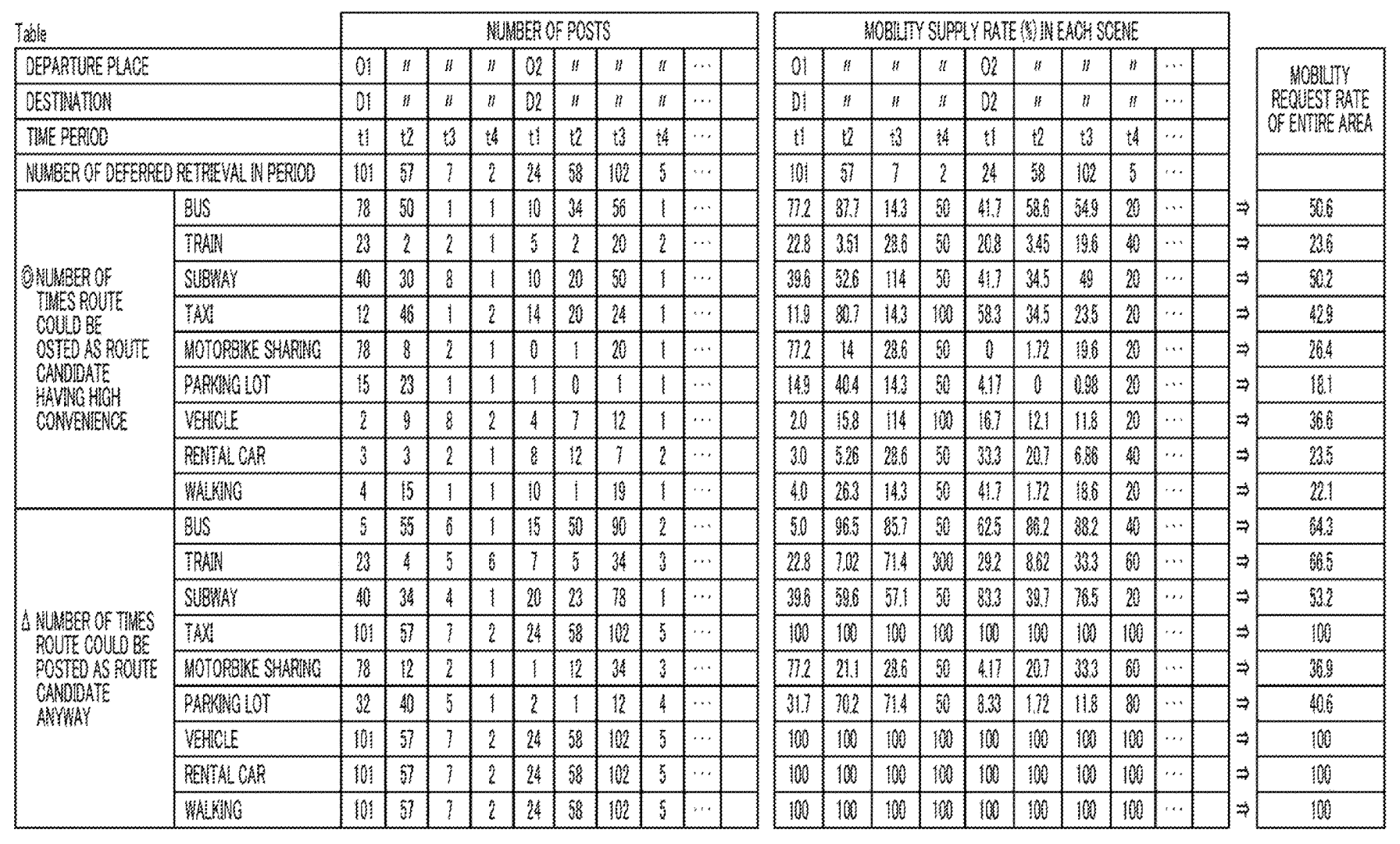
Figure 16D:
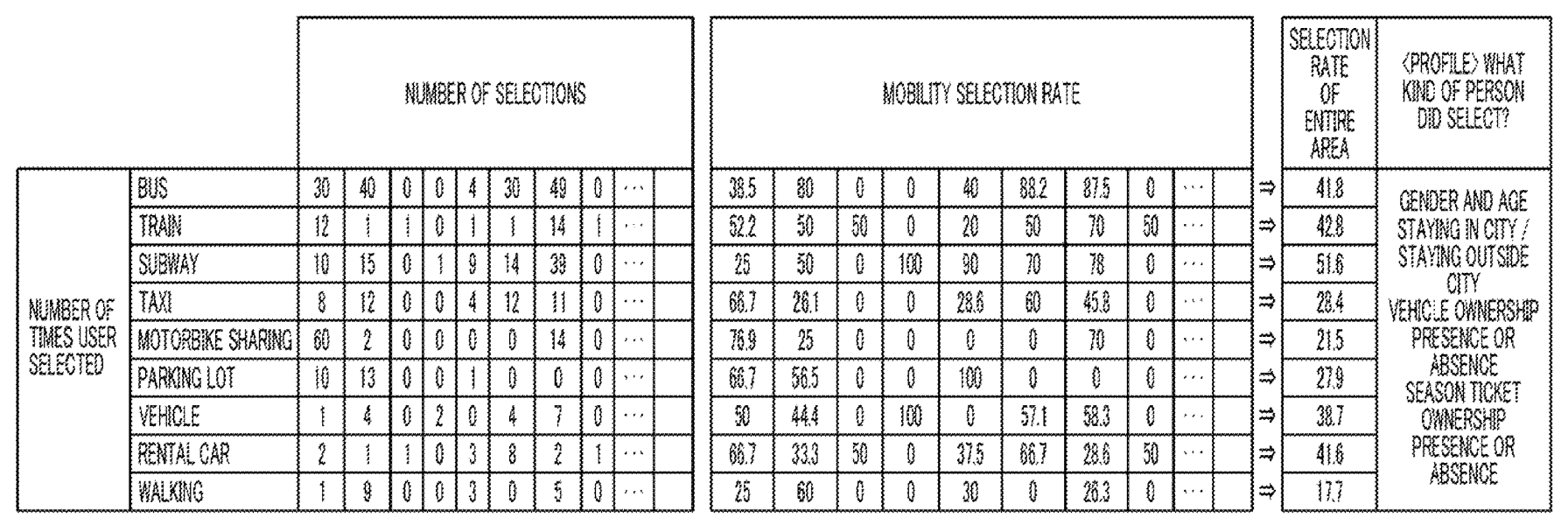

Next, FIGS. 16A to 16D are diagrams for describing macro data. Specifically, FIGS. 16A and 16B are diagrams for conceptually describing macro data, and FIGS. 16C and 16D are diagrams illustrating an example of macro data.

Specifically, a bar graph of each piece of target moving means corresponding to "(1) route retrieval "how to go"" in FIGS. 16A and 16B schematically represents a total number of route retrieval requests (hereinafter, referred to as the "route retrieval request total number") satisfying a predetermined condition. A bar graph of each piece of target moving means corresponding to "(2) route retrieval "go this way"" in FIGS. 16A and 16B schematically represents the number of each piece of target moving means used in a route candidate in a multimodal route retrieval result (hereinafter, referred to as the "route candidate usage number") in the route retrieval request total number. A bar graph of each piece of target moving means corresponding to "(3) detailed display "go with this"" in FIGS. 16A and 16B schematically represents the number of each piece of target moving means used in a selected route in a multimodal route retrieval result (hereinafter, referred to as the "selected route usage number") in the route retrieval request total number. A bar graph of each piece of target moving means corresponding to "(4) guidance start" in FIGS. 16A and 16B schematically represents the number of times of having performed route guidance in a selected route including usage of each piece of target moving means (hereinafter, referred to as the "number of times of route guidance") in the route retrieval request total number. A bar graph of each piece of target moving means corresponding to "(5) reservation/precheck" in FIGS. 16A and 16B schematically represents the number of used various support services (for example, viewing of the public bus position information, purchase of a predetermined ticket for a public bus, a taxi reservation, support of usage of cycle sharing, and viewing of parking lot information) based on a multimodal route retrieval result (hereinafter, referred to as the "reservation/precheck usage number") in the route retrieval request total number. A bar graph of each piece of target moving means corresponding to "(6) usage (settlement) "moved"" in FIGS. 16A and 16B schematically represents the number of times of actual movement using each piece of target moving means (hereinafter, referred to as the "number of times of movement") in the route retrieval request total number. A bar graph of each piece of target moving means corresponding to "(7) repetitive usage "use again"" in FIGS. 16A and 16B schematically represents the number of users having moved a plurality of times by using each piece of target moving means (hereinafter, referred to as the "number of users having moved a plurality of times") in the route retrieval request total number.

Among the bar graphs in FIGS. 16A and 16B, in order to calculate a dotted bar graph, data is needed to be acquired from the outside of the multimodal route providing system 1.

For example, as illustrated in FIG. 16A, a proportion of each piece of target moving means used in a presented route candidate to a route retrieval request group (that is, a proportion of the route candidate usage number of each piece of target moving means to the route retrieval request total number) is considered to represent to what degree each piece of target moving means has a potential (in FIG. 16A, a "supply proportion" of target moving means) of being capable of contributing to a movement request from a user. Therefore, the macro data generation unit 206 may calculate a supply proportion of corresponding target moving means through division into combinations of a plurality of departure areas and destination areas, and may generate macro data including a calculation result (refer to FIG. 16C).

Consequently, a manager or a worker (hereinafter, referred to as a "manager or the like") of the center server 20 can understand a supply proportion of each piece of target moving means for each combination of a departure area and a destination area. For example, an analysis target area included in a retrieval target area may be divided in a lattice shape every predetermined distance (for example, 500 meters), the separate latticed regions (hereinafter, referred to as "separate areas") may be set as a departure area and a destination area such that the combinations of the departure areas and the destination areas are defined.

Similarly, a proportion of each piece of target moving means used in a selected route candidate to a route retrieval request group (that is, a proportion of the selected route usage number of each piece of target moving means to the route retrieval request total number) is considered to represent to what degree each piece of target moving means has a demand (in FIG. 16A, a "demand proportion" of target moving means) with respect to a movement request from a user. Therefore, the macro data generation unit 206 may calculate a demand proportion of corresponding target moving means through division into combinations of a plurality of departure areas and destination areas, and may generate macro data including a calculation result (refer to FIG. 16D).

Consequently, a manager or the like of the center server 20 can understand a demand proportion of each piece of target moving means for each combination of a departure area and a destination area.

A ratio of a used viewing service for public bus position information with respect to a route retrieval request in which a route candidate including a public bus is selected by a user from a route retrieval request group (that is, a ratio of the reservation/precheck usage number of a viewing service for public bus position information to the selected route usage number for a public bus) is considered to represent a usage ratio of the viewing service for the public bus position information. Therefore, the macro data generation unit 206 may calculate a ratio of a used viewing service for public bus position information with respect to a route retrieval request in which a route candidate including a public bus is selected by a user from a route retrieval request group, and may generate macro data including a calculation result. Consequently, the manager or the like of the center server 20 can understand a usage ratio of viewing services for public bus position information.

A ratio of a used public bus ticket purchase service with respect to a route retrieval request in which a route candidate including a public bus is selected by a user from a route retrieval request group (that is, a ratio of the reservation/precheck usage number of a public bus ticket purchase service to the selected route usage number for the public bus) or the actual number is considered to represent a usage ratio or sales of public bus tickets using the route retrieval application. Therefore, the macro data generation unit 206 may calculate a ratio or the actual number of a used public bus ticket purchase service with respect to a route retrieval request in which a route candidate including a public bus is selected by a user from a route retrieval request group, and may generate macro data including a calculation result. Consequently, the manager or the like of the center server 20 can understand a usage ratio or sales of public bus tickets using the route retrieval application.

A ratio of a used taxi reservation service with respect to a route retrieval request in which a route candidate including a taxi is selected by a user from a route retrieval request group (that is, a ratio of the reservation/precheck usage number of a taxi reservation service to the selected route usage number for a taxi) is considered to represent a customer guide ratio in which a taxi reservation service guides a user to usage of a taxi. Therefore, the macro data generation unit 206 may calculate a ratio of a used taxi reservation service with respect to a route retrieval request in which a route candidate including a taxi is selected by a user, and may generate macro data including a calculation result. Consequently, the manager or the like of the center server 20 can understand a customer guide ratio in which a taxi reservation service guides a user to usage of a taxi.

A ratio of a used cycle sharing usage support service with respect to a route retrieval request in which a route candidate including usage of cycle sharing is selected by a user from a route retrieval request group (that is, a ratio of the reservation/precheck usage number of cycle sharing usage support service to the selected route usage number for cycle sharing) is considered to represent a customer guide ratio in which a cycle sharing usage support service guides a user to usage of cycle sharing. Therefore, the macro data generation unit 206 may calculate a ratio of a used taxi reservation service with respect to a route retrieval request in which a route candidate including usage of cycle sharing is selected by a user from a route retrieval request group, and may generate macro data including a calculation result. Consequently, the manager or the like of the center server 20 can understand a customer guide ratio in which a cycle sharing usage support service guides a user to usage of cycle sharing based on the macro data.

A ratio of a used viewing service for parking lot information with respect to a route retrieval request in which a route candidate including usage of an automobile is selected by a user from a route retrieval request group (that is, a ratio of the reservation/precheck usage number of a viewing service for parking lot information to the selected route usage number for an automobile) is considered to represent a customer guide ratio in which a viewing service for parking lot information guides a user to usage of a parking lot. Therefore, the macro data generation unit 206 may calculate a ratio of a used viewing service for parking lot information with respect to a route retrieval request in which a route candidate including usage of an automobile is selected by a user from a route retrieval request group, and may generate macro data including a calculation result. Consequently, the manager or the like of the center server 20 can understand a customer guide ratio in which a viewing service for parking lot information guides a user to usage of a parking lot.

For example, as illustrated in FIG. 16B, an attribute of a user selecting a route candidate including certain target moving means (in FIG. 16B, a public bus) is sorted, and thus it is possible to understand what kind of attribute the user selecting the route candidate including the target moving means has.

Specifically, the macro data generation unit 206 may calculate a percentage by gender and age, a percentage by residential region such as by living in Japan and inbound or by living inside and outside a predetermined city, a percentage by car ownership, and a percentage by commutation ticket ownership, and may generate macro data including a calculation result. In this case, the macro data generation unit 206 may calculate such a percentage through division into combinations of a plurality of departure areas and destination areas in the same as in the case of a supply proportion and a demand proportion. Consequently, the manager or the like of the center server 20 can understand a sorted attribute (attribute percentage) of each piece of target moving means for each combination of a departure area and a destination area.

As mentioned above, the macro data generation unit 206 calculates at least one of a first proportion (that is, a supply proportion) in which each of a plurality of pieces of target moving means is used in a route candidate proposed in a route retrieval result and a second proportion (that is, a demand ratio) in which each piece of target moving means is used in a route candidate (that is, a selected route) selected by a user from a route retrieval result, with respect to a route retrieval request group corresponding to a combination of a departure area and a destination area, for each of a plurality of combinations of departure areas and destination areas, based on history data of multimodal route retrieval results. The macro data generation unit 206 generates macro data in which a departure area and a destination area are correlated with at least one of the first proportion (supply proportion) and the second proportion (demand proportion) for each of a plurality of combinations of departure areas and destination areas.

Consequently, the center server 20 can generate macro data indicating to what degree each piece of target moving means can support a plurality of users' movement requests from departure areas to destination areas. The center server 20 can generate macro data indicating a tendency of a user selecting moving means with respect to a plurality of users' movement requests from departure areas to destination areas. Therefore, the center server 20 can generate output data (macro data) for understanding various tendencies regarding movement of a user at the macro time based on history data of multimodal route retrieval results corresponding to requests from a plurality of users.

The macro data generation unit 206 may generate macro data in which a departure area and a destination area are correlated with information regarding an attribute of a user selecting a route candidate including usage of target moving means from a route retrieval result for a route retrieval request group corresponding to a combination of the departure area and the destination area for each of the pieces of target moving means with respect to each of a plurality of combinations of departure areas and destination areas.

Consequently, the center server 20 can generate macro data indicating an attribute of a user and target moving means selected by the user with respect to a plurality of movement requests from a departure area to a destination area.

The information regarding a user's attribute may include information regarding at least one of a percentage by gender and age, a percentage by residential region, a percentage by car ownership, and a percentage by commutation ticket ownership between a departure area and a destination area of target moving means, of a user selecting a route candidate including usage of the target moving means from a route retrieval result for a route retrieval request group corresponding to a combination of the departure area and the destination area.

Consequently, the center server 20 can generate data indicating an attribute of a user and target moving means selected by the user with respect to a plurality of movement requests from a departure area to a destination area for each specific sorted attribute of the user.

As mentioned above, the embodiment has been described, but the present disclosure is not limited to the specific embodiment, and various modifications and alterations may occur within the scope of the spirit of the present disclosure disclosed in the claims.

What is claimed is:

1. A route retrieval apparatus comprising a processor programmed to:
    perform route retrieval from a departure place to a destination by:
        retrieving a route using two or more forms of transportation from among a plurality of forms of transportation, at least one of the two or more forms of transportation including a sharing vehicle that is i) not a bus, train, plane, or ship, and ii) designated for sharing by unspecified people; and
        restricting usage of the sharing vehicle to at least one of usage from the departure place or a periphery of the departure place and usage for reaching the destination or a periphery of the destination;
    store the retrieved route in a route retrieval result history storage unit;
    access history data of past route retrieval results from the route retrieval result history storage unit;
    based on the accessed history data, generate macro data that reflects user tendencies regarding movement using two or more forms of transportation; and
    output the generated macro data.

2. The route retrieval apparatus according to claim 1 wherein the processor is programmed to cause a display to display a result of the route retrieval.

3. The route retrieval apparatus according to claim 1, wherein the sharing vehicle is one of a rental car, car sharing, cycle sharing, ride sharing, and a taxi.

4. The route retrieval apparatus according to claim 3, wherein the processor is programmed to perform the route retrieval by retrieving the route including the usage of the sharing vehicle such that usage of the rental car, the car sharing, and the cycle sharing is restricted to at least one of usage from an access point to a corresponding vehicle in the periphery of the departure place and usage to the access point in the periphery of the destination.

5. The route retrieval apparatus according to claim 3, wherein the processor is programmed to perform the route retrieval by retrieving the route including the usage of the sharing vehicle to at least one of usage from the departure place and usage to the destination.

6. The route retrieval apparatus according to claim 4, wherein the processor is programmed to perform the route retrieval by retrieving the route including the usage of the sharing vehicle to at least one of usage from the departure place and usage to the destination.

7. A route retrieval method executed by a route retrieval apparatus, the route retrieval method comprising:
    performing route retrieval from a departure place to a destination by:
        retrieving a route using two or more forms of transportation from among a plurality of forms of transportation, at least one of the two or more forms of transportation including a sharing vehicle that is i) not a bus, train, plane, or ship, and ii) designated for sharing by unspecified people; and
        restricting usage of the sharing vehicle to at least one of usage from the departure place or a periphery of the departure place and usage for reaching the destination or a periphery of the destination;
    storing the retrieved route in a route retrieval result history storage unit;
    accessing history data of past rout retrieval results from the route retrieval result history storage unit;
    based on the accessed history data, generating macro data that reflects user tendencies regarding movement using two or more forms of transportation; and
    outputting the generated macro data.

8. The route retrieval method according to claim 7, further comprising causing a display to display a result of the route retrieval.

9. The route retrieval method according to claim 7, wherein the sharing vehicle is one of a rental car, car sharing, cycle sharing, ride sharing, and a taxi.

10. The route retrieval method according to claim 9, further comprising performing the route retrieval by retrieving the route including the usage of the sharing vehicle such that usage of the rental car, the car sharing, and the cycle sharing is restricted to at least one of usage from an access point to a corresponding vehicle in the periphery of the departure place and usage to the access point in the periphery of the destination.

11. The route retrieval method according to claim 9, further comprising performing the route retrieval by retrieving the route including the usage of the sharing being restricted to at least one of usage from the departure place and usage to the destination.

12. The route retrieval method according to claim 10, further comprising performing the route retrieval by retrieving the route including the usage of the sharing vehicle being restricted to at least one of usage from the departure place and usage to the destination.

13. A non-transitory storage medium storing a route retrieval program causing a computer to execute functions comprising:

performing route retrieval from a departure place to a destination by:

retrieving a route using two or more forms of transportation from among a plurality of forms of transportation, at least one of the two or more forms of transportation including a sharing vehicle that is i) not a bus, train, plane, or ship, and ii) designated for sharing by unspecified people; and restricting usage of the sharing vehicle to at least one of usage from the departure place or a periphery of the departure place and usage for reaching the destination or a periphery of the destination;

storing the retrieved route in a route retrieval result history storage unit;

generating macro data by:

accessing history data of past rout retrieval results from the route retrieval result history storage unit;

based on the accessed history data, generating macro data that reflects user tendencies regarding movement using two or more forms of transportation; and outputting the generated macro data.

14. The non-transitory storage medium according to claim 13, wherein the route retrieval program causes the computer to execute a function of causing a display to display a result of the route retrieval.

15. The non-transitory storage medium according to claim 13, wherein the sharing vehicle is one of a rental car, car sharing, cycle sharing, ride sharing, and a taxi.

16. The non-transitory storage medium according to claim 15, wherein the performing of the route retrieval includes retrieving the route including the usage of the sharing vehicle such that usage of the rental car, the car sharing, and the cycle sharing is restricted to at least one of usage from an access point to a corresponding vehicle in the periphery of the departure place and usage to the access point in the periphery of the destination.

17. The non-transitory storage medium according to claim 15, wherein the performing of the route retrieval includes retrieving the route including the usage of the sharing vehicle being restricted to at least one of usage from the departure place and usage to the destination.

18. The non-transitory storage medium according to claim 16, wherein the performing of the route retrieval includes retrieving the route including the usage of the sharing vehicle being restricted to at least one of usage from the departure place and usage to the destination.

\* \* \* \* \*